United States Patent
Shimotani et al.

(10) Patent No.: US 12,238,459 B2
(45) Date of Patent: Feb. 25, 2025

(54) RENDEZVOUS ASSISTANCE APPARATUS, RENDEZVOUS ASSISTANCE SYSTEM, AND RENDEZVOUS ASSISTANCE METHOD

(71) Applicant: MITSUBISHI ELECTRIC CORPORATION, Tokyo (JP)

(72) Inventors: Mitsuo Shimotani, Tokyo (JP); Tadashi Miyahara, Tokyo (JP); Yoshinori Ueno, Tokyo (JP); Yusuke Arai, Tokyo (JP); Keisaku Fukuda, Tokyo (JP); Kuniyo Ieda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 20 days.

(21) Appl. No.: 17/636,643

(22) PCT Filed: Nov. 22, 2019

(86) PCT No.: PCT/JP2019/045734
§ 371 (c)(1),
(2) Date: Feb. 18, 2022

(87) PCT Pub. No.: WO2021/100190
PCT Pub. Date: May 27, 2021

(65) Prior Publication Data
US 2022/0295017 A1    Sep. 15, 2022

(51) Int. Cl.
*H04N 23/66*     (2023.01)
*H04N 7/18*     (2006.01)

(52) U.S. Cl.
CPC ............. *H04N 7/183* (2013.01); *H04N 23/66* (2023.01)

(58) Field of Classification Search
CPC ............... G06F 16/435; G06F 16/5854; G06F 3/04812; G06F 16/176; G06F 16/3334;
(Continued)

(56) References Cited

U.S. PATENT DOCUMENTS

2017/0274771 A1*  9/2017  Sisbot .................... B60K 35/00
2018/0196416 A1*  7/2018  Iagnemma ........... G05D 1/0027
(Continued)

FOREIGN PATENT DOCUMENTS

JP    2019-53547 A    4/2019
JP    2019053547 A  *  4/2019

OTHER PUBLICATIONS

International Search Report for PCT/JP2019/045734 mailed on Feb. 25, 2020.
(Continued)

*Primary Examiner* — Masum Billah
(74) *Attorney, Agent, or Firm* — Birch, Stewart, Kolasch & Birch, LLP

(57) ABSTRACT

An object is to provide a technique that allows a first mobile unit to provide an appropriate display that makes it possible to easily identify a second mobile unit in a rendezvous of the first mobile unit and the second mobile unit. A For the rendezvous of the first mobile unit and the second mobile unit, a rendezvous assistance apparatus includes a first controller that performs control to cause a first display of the first mobile unit to display a first display object on the basis of the first receive information received by the first mobile unit, the first display object indicating the position of at least part of the second mobile unit accompanied with the first image or a landscape of the outside of the first mobile unit corresponding to the first image.

20 Claims, 39 Drawing Sheets

(58) Field of Classification Search
CPC ...... G06N 20/00; G06V 10/141; G06V 10/60;
G06V 20/63; G06V 20/64; G06Q 50/40;
G06Q 10/02; G06Q 10/00; G06Q 10/063;
G06Q 10/08; G06Q 30/0201; G06Q
30/0275; G06Q 30/0645; G06Q 50/14
USPC ........................................................ 348/148
See application file for complete search history.

(56) References Cited

U.S. PATENT DOCUMENTS

| | | | |
|---|---|---|---|
| 2019/0387060 A1* | 12/2019 | Kentley-Klay | G05D 1/024 |
| 2020/0065930 A1* | 2/2020 | Engle | H04W 4/029 |
| 2020/0132481 A1* | 4/2020 | Majima | G01C 21/3694 |

OTHER PUBLICATIONS

Written Opinion of the International Searching Authority for PCT/JP2019/045734 (PCT/ISA/237) mailed on Feb. 25, 2020.

* cited by examiner

F I G. 3 1
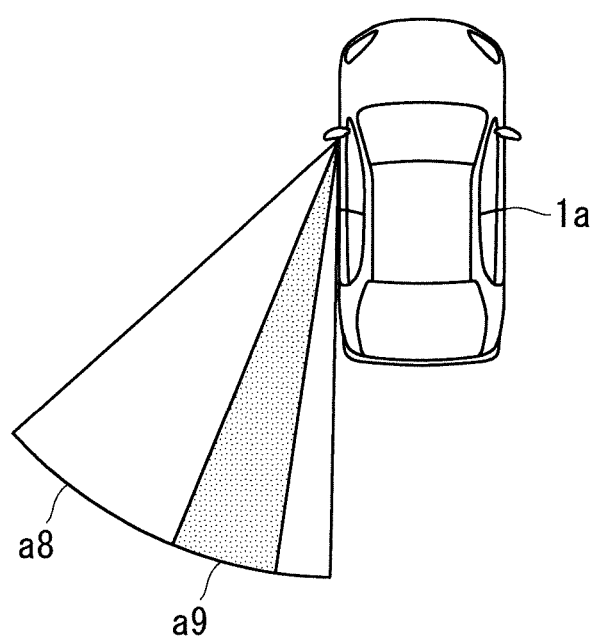

F I G. 3 3
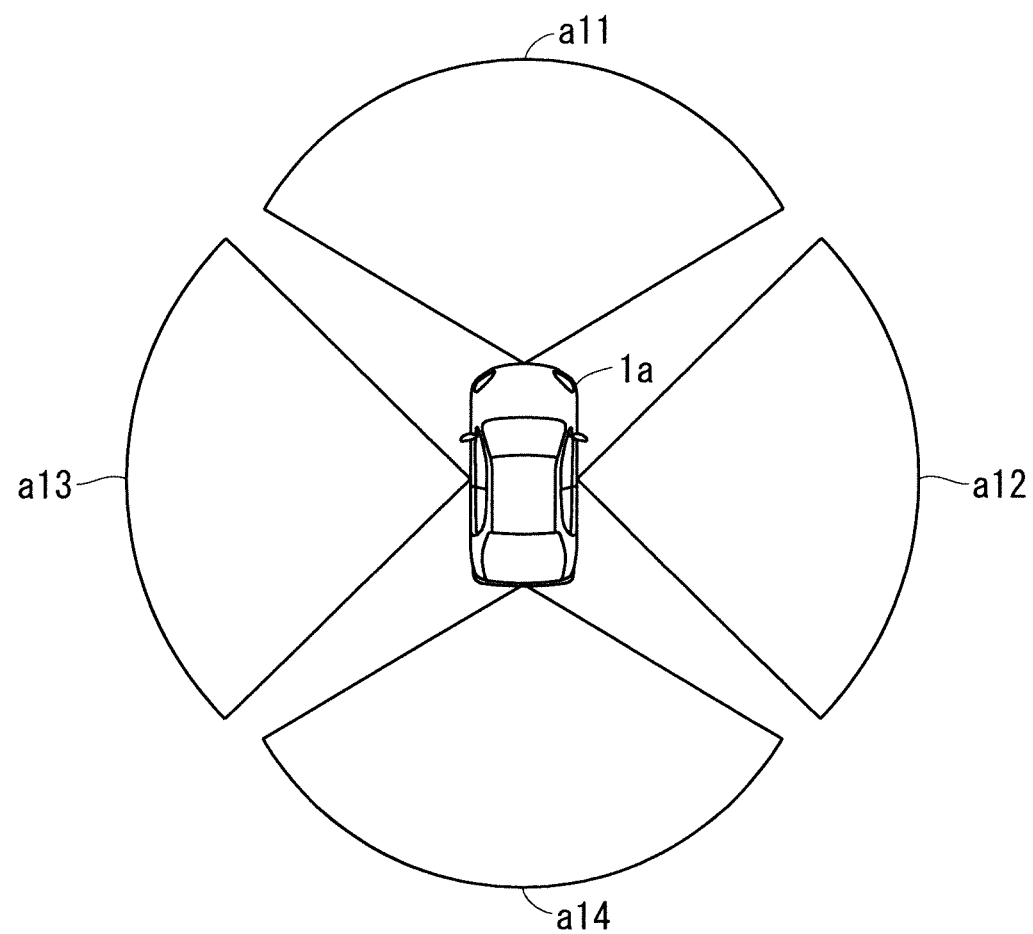

F I G. 3 5
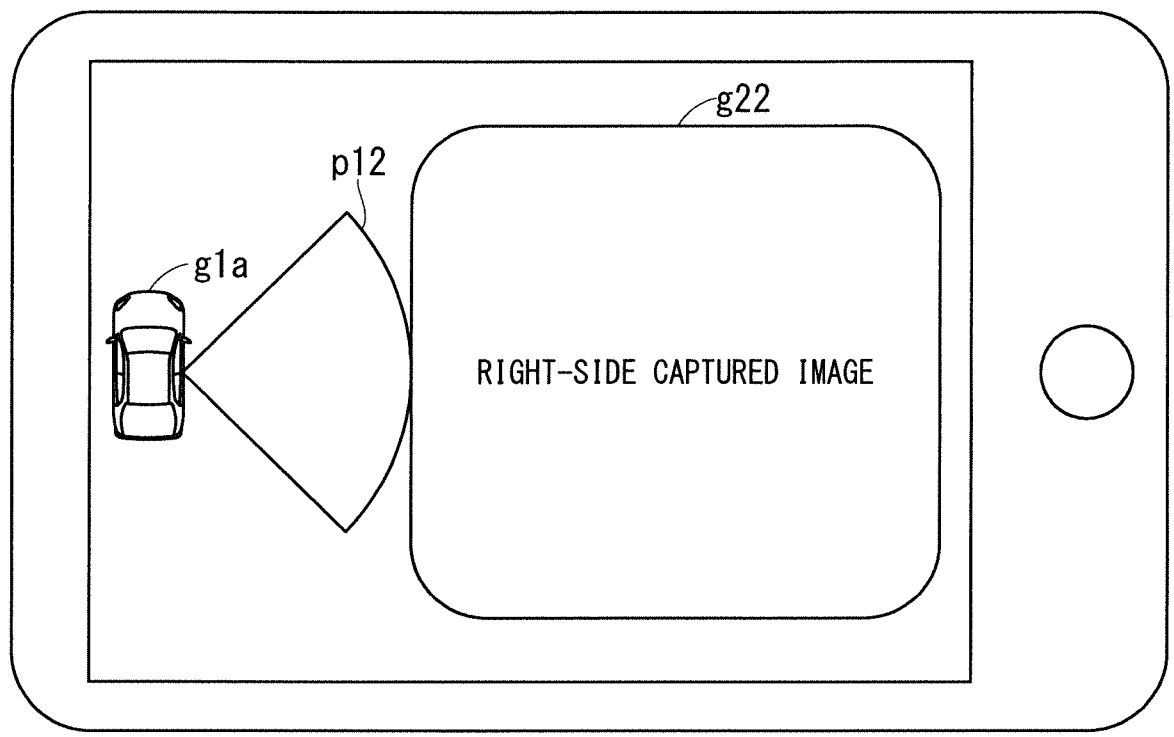

F I G. 3 8
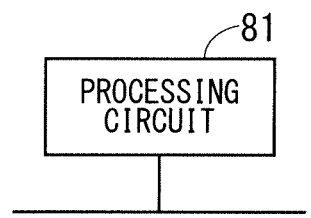

F I G. 3 9
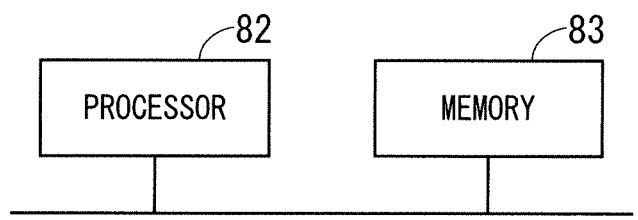

RENDEZVOUS ASSISTANCE APPARATUS, RENDEZVOUS ASSISTANCE SYSTEM, AND RENDEZVOUS ASSISTANCE METHOD

TECHNICAL FIELD

The present invention relates to a rendezvous assistance apparatus that assists a rendezvous of a first mobile unit and a second mobile unit, a rendezvous assistance system, and a rendezvous assistance method.

BACKGROUND ART

Various carsharing services have been put to practical use, or various technologies for carsharing have been developed. For example, services for enabling users who do not subject vehicles themselves to use vehicles as necessary have been proposed, such as ride hailing, ride sharing, and dynamic shuttle services. In these services, it is important that the user who tries to use a vehicle can smoothly rendezvous with the vehicle. To achieve such a rendezvous, for example, Patent Document 1 proposes a technique for setting a rendezvous point as a virtual place of rendezvous and displaying the rendezvous point on a map of an on-vehicle information system.

PRIOR ART DOCUMENTS

Patent Document

Patent Document 1: Japanese Patent Application Laid-Open No. 2019-053547

SUMMARY

Problem to be Solved by the Invention

In some cases, however, matching between a real world and a map world may be insufficient and it may take effort and time to achieve a rendezvous by just displaying the rendezvous point on the map. Besides, if there are a large number of vehicles or a larger number of people in the rendezvous point, it becomes difficult to identify the party at the other end from among those vehicles or peoples. In order to solve this problem, it is conceivable to employ a method of transmitting in advance a face image to the party at the other end, but the face in the face image may differ from the corresponding face in the actual landscape and in this case it is still difficult to identify the party at the other end.

The present invention has been made in light of problems as described above, and it is an object of the present invention to provide a technique that allows a first mobile unit to provide an appropriate display that makes it possible to easily identify a second mobile unit in a rendezvous of the first mobile unit with the second mobile unit.

Means to Solve the Problem

A rendezvous assistance apparatus according to the present invention is a rendezvous assistance apparatus that assists a rendezvous of a first mobile unit and a second mobile unit. The rendezvous assistance apparatus includes a first acquisition unit that acquires a first image of an outside of the first mobile unit, a first communication controller that performs control to cause the first mobile unit to transmit first transmit information to the second mobile unit, the first transmit information including the first image acquired by the first acquisition unit, and performs control to cause the first mobile unit to receive first receive information from the second mobile unit, the first receive information including a position of at least part of the second mobile unit in the first image, and a first controller that performs control to cause a first display of the first mobile unit to display a first display object on the basis of the first receive information received by the first mobile unit, the first display object indicating the position of at least part of the second mobile unit accompanied with the first image or a landscape of the outside of the first mobile unit corresponding to the first image.

Effects of the Invention

According to the present invention, control is performed so as to cause the first display of the first mobile unit to display the first display object on the basis of the first receive information received by the first mobile unit, the first display object indicating the position of at least part of the second mobile unit accompanied with the first image or the landscape of the outside of the first mobile unit corresponding to the first image. With this configuration, the first mobile unit can provide an appropriate display that makes it possible to easily identify the second mobile unit when rendezvousing with the second mobile unit.

These and other objects, features, aspects and advantages of the present invention will become more apparent from the following detailed description of the present invention when taken in conjunction with the accompanying drawings.

BRIEF DESCRIPTION OF DRAWINGS

FIG. 31 is a diagram illustrating operations of a rendezvous assistance apparatus according to Variation 5 of Embodiment 6.

FIG. 33 is a diagram illustrating an image capturing region of a rendezvous assistance apparatus according to Variation 6 of Embodiment 6.

FIG. 35 is a diagram illustrating the operations of the mobile terminal according to Variation 7 of Embodiment 6.

FIG. 38 is a block diagram illustrating a hardware configuration of a rendezvous assistance apparatus according to another variation.

FIG. 39 is a block diagram illustrating a hardware configuration of a rendezvous assistance apparatus according to yet another variation.

DESCRIPTION OF EMBODIMENTS

Embodiment 1

A rendezvous assistance apparatus according to Embodiment 1 of the present invention is an apparatus that assists a rendezvous of a first mobile unit 1 and a second mobile unit 2. Each of the first mobile unit 1 and the second mobile unit 2 may, for example, be a vehicle or a person and a mobile terminal moving together. Hereinafter, an example in which the first mobile unit 1 is subject vehicle 1*a*, i.e., a vehicle, is described, but as will be described later as variations, the first mobile unit 1 may also be a person and a mobile terminal moving together.

Figure 1:
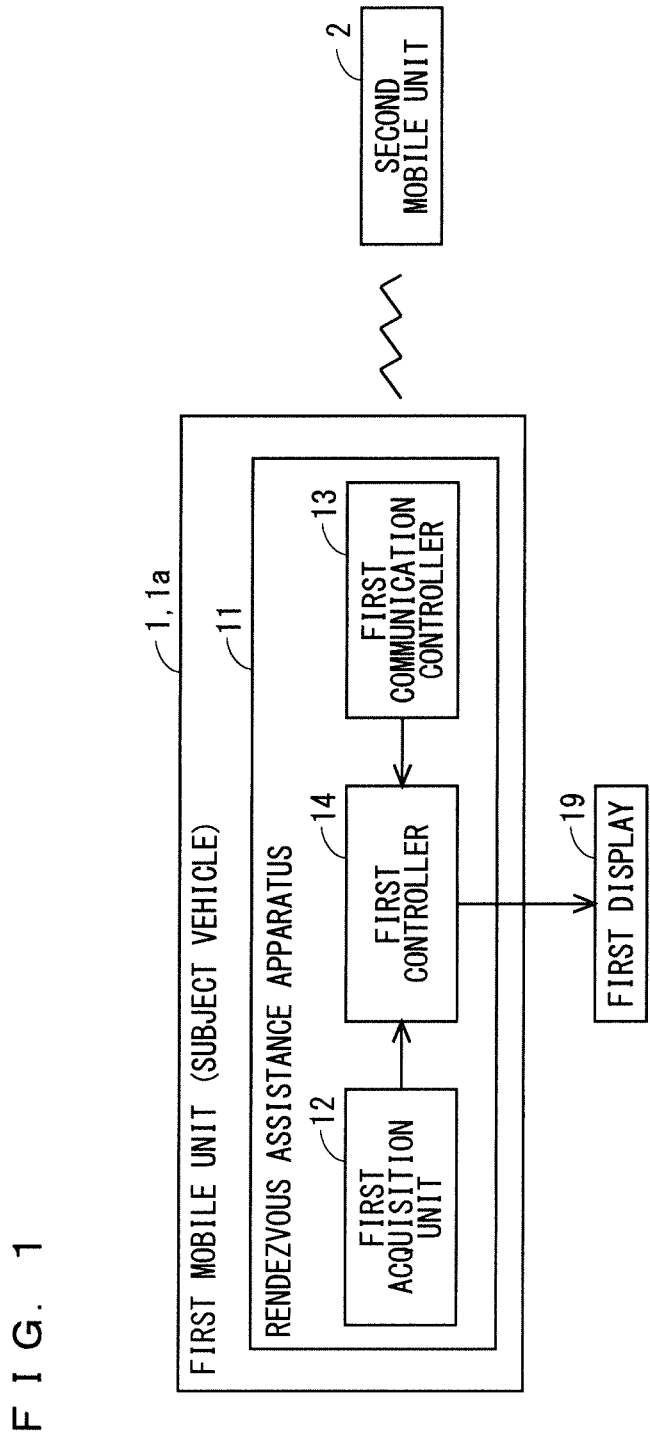
FIG. 1 is a block diagram illustrating a configuration of a rendezvous assistance apparatus according to Embodiment 1.

FIG. 1 is a block diagram illustrating a configuration of a rendezvous assistance apparatus 11 according to Embodiment 1 of the present invention. Hereinafter, a configuration of the rendezvous assistance apparatus 11 mounted on subject vehicle 1*a* is mainly described, but as will be described later as variations, the present Embodiment 1 is not limited to this example.

The rendezvous assistance apparatus 11 illustrated in FIG. 1 is connected to a first display 19 that is configured to display various types of information such as graphics, characters, and images. The first display 19 may also be a display that includes a display screen and that is configured to display a display object on the display screen. The first display 19 may also be a head up display (HUD) that displays a display object accompanied with a landscape of the outside of the subject vehicle 1*a*, or may be a transmission liquid crystal display for use in windows of the subject vehicle 1*a*. The first display 19 illustrated in FIG. 1 is provided separately from the rendezvous assistance apparatus 11, but it may be included in the rendezvous assistance apparatus 11. The first display 19 may also be a display that is fixedly attached to the subject vehicle 1*a*, or may be a display that is carried into the subject vehicle 1*a*.

The rendezvous assistance apparatus 11 illustrated in FIG. 1 includes a first acquisition unit 12, a first communication controller 13, and a first controller 14.

The first acquisition unit 12 acquires a first image of the outside of the subject vehicle 1*a*. For example, the first acquisition unit 12 may be a vehicle image capturing device that is mounted on the subject vehicle 1*a* and captures an image of the surroundings of the subject vehicle 1*a* as a first image, or may be an interface or the like of the vehicle image capturing device. In the following description, the first image of the outside of the subject vehicle 1*a* is referred to as the "vehicle peripheral image."

The first communication controller 13 performs transmission control and reception control.

In the transmission control, the first communication controller 13 controls the subject vehicle 1*a* to transmit first transmit information to the second mobile unit 2, the first transmit information including the vehicle peripheral image acquired by the first acquisition unit 12. In the following description, the first transmit information including the vehicle peripheral image may also be referred to as the "vehicle transmit information."

In the reception control, the first communication controller 13 controls the subject vehicle 1*a* to receive first receive information from the second mobile unit 2, the first receive information including the position of at least part of the second mobile unit 2 in the vehicle peripheral image. In the following description, the first receive information that includes the position of at least part of the second mobile unit 2 in the vehicle peripheral image may also be referred to as the "vehicle receive information."

For example, when the second mobile unit 2 is a person and a mobile terminal moving together, the subject vehicle 1*a* receives vehicle receive information including the position of the person (part of the second mobile unit 2) in the vehicle peripheral image from the mobile terminal under the reception control described above. For example, when the second mobile unit 2 is non-subject vehicle (vehicle different from the subject vehicle 1a), the subject vehicle 1a receives vehicle receive information including the position of the other vehicle (second mobile unit 2) in the vehicle peripheral image from the other vehicle under the reception control described above.

The first communication controller 13 as described above may, for example, be a communication device, or may be an interface of a communication device.

The first controller 14 performs control to cause the first display 19 of the subject vehicle 1a to display a first display object on the basis of the vehicle receive information received by the subject vehicle 1a. The first display object as used herein is a display object that indicates the position of at least part of the second mobile unit 2, accompanied with the vehicle peripheral image or a landscape of the outside of the subject vehicle 1a corresponding to the vehicle peripheral image. This example will be described hereinafter.

For example, when the second mobile unit 2 is a person and a mobile terminal and the first display 19 is a display including a display screen, the vehicle peripheral image and a first display object that indicates the position of the person accompanied with the vehicle peripheral image are displayed on the display screen.

For example, when the second mobile unit 2 is a person and a mobile terminal and the first display 19 is an HUD or a transmission liquid crystal display for use in windows of the subject vehicle 1a, a first display object that indicates the position of the person accompanied with the landscape of the outside of the subject vehicle 1a corresponding to the vehicle peripheral image is displayed.

For example, when the second mobile unit 2 is non-subject vehicle and the first display 19 is a display that includes a display screen, the vehicle peripheral image and a first display object that indicates the position of the other vehicle accompanied with the vehicle peripheral image are displayed on the display screen.

For example, when the second mobile unit 2 is non-subject vehicle and the first display 19 is an HUD or a transmission liquid crystal display for use in windows of the subject vehicle 1a, a first display object that indicates the position of the other vehicle accompanied with the landscape of the outside of the subject vehicle 1a corresponding to the vehicle peripheral image is displayed.

Summary of Embodiment 1

The rendezvous assistance apparatus 11 according to Embodiment 1 described above displays the first display object that indicates the position of at least part of the second mobile unit 2, accompanied with the vehicle peripheral image or the landscape of the outside of the subject vehicle 1a corresponding to the vehicle peripheral image. This configuration enables a user in the vehicle, such as the driver of the subject vehicle 1a, to easily identify the second mobile unit 2 because the position of the second mobile unit 2 is indicated relative to the image or the landscape that can be viewed by the user in the vehicle. That is, it is possible for the subject vehicle 1a to provide an appropriate display that allows easy identification of the second mobile unit 2.

Embodiment 2

Figure 2:
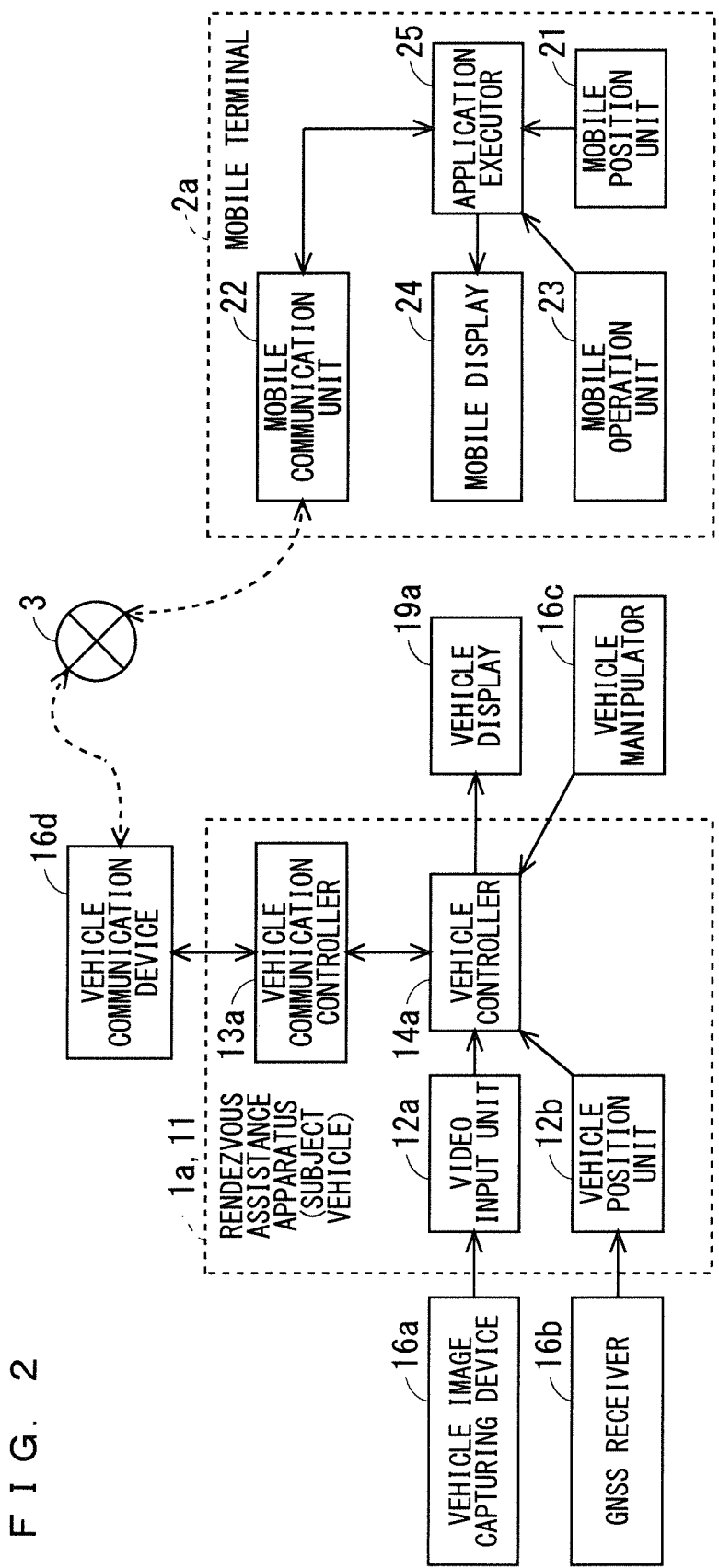
FIG. 2 is a block diagram illustrating a configuration of a rendezvous assistance apparatus according to Embodiment 2.

FIG. 2 is a block diagram illustrating a configuration of a rendezvous assistance apparatus 11 according to Embodiment 2 of the present invention. Among constituent elements according to Embodiment 2 of the present invention, those that are identical or similar to constituent elements described above are hereinafter given identical or similar reference signs, and the following description mainly focuses on different constituent elements.

According to Embodiment 2 of the present invention, the first mobile unit 1 is subject vehicle 1a as in Embodiment 1, and the rendezvous assistance apparatus 11 is mounted on the subject vehicle 1a as in Embodiment 1.

According to Embodiment 2 of the present invention, the second mobile unit 2 is a person and a mobile terminal 2a moving together. For example, the mobile terminal 2a may be a mobile phone, a smartphone, or a tablet and is capable of wireless communication with the rendezvous assistance apparatus 11 via a communication network 3. In the following description, the person moving with the mobile terminal 2a may also be referred to as a "terminal holder."

External Configuration of Rendezvous Assistance Apparatus 11

The rendezvous assistance apparatus 11 illustrated in FIG. 2 is connected to an vehicle image capturing device 16a, a global navigation satellite system (GNSS) receiver 16b, an vehicle manipulator 16c, an vehicle communication device 16d, and an vehicle display 19a. Embodiment 2 is, however, not limited to the configuration illustrated in FIG. 2, and at least one of the vehicle image capturing device 16a, the GNSS receiver 16b, the vehicle manipulator 16c, the vehicle communication device 16d, and the vehicle display 19a may be included in the rendezvous assistance apparatus 11.

The vehicle image capturing device 16a is an image capturing device that is mounted on the subject vehicle 1a and captures an image of the front of the subject vehicle 1a as a vehicle peripheral image.

The GNSS receiver 16b receives a signal from a GNSS and obtains positional information about the rendezvous assistance apparatus 11 and accordingly positional information about the subject vehicle 1a on the basis of the received signal.

The vehicle manipulator 16c accepts operations from a user in the vehicle such as the driver of the subject vehicle 1a. For example, the vehicle manipulator 16c may correspond to a touch panel and operation switches that accept a touch operation from the user in the vehicle, an image recognition device that accepts a gesture operation in the space from the user in the vehicle, or a voice recognition device that accepts a voice operation from the user in the vehicle. Note that a predetermined operation as used in the following description includes, for example, at least one of the touch operation, the gesture operation, and the voice operation. For the sake of convenience, the acceptance of operations by the vehicle manipulator 16c may also be simply referred to as the acceptance of operations by the subject vehicle 1a.

The vehicle communication device 16d establishes wireless communication with an external device of the subject vehicle 1a.

The vehicle display 19a is a display that includes a display screen and that is configured to display various types of information such as a display object on the display screen. The vehicle display 19a is included in the concept of the first display 19 illustrated in FIG. 1. Examples of the vehicle display 19a include a liquid crystal display and an organic electroluminescence (EL) display.

Internal Configuration of Rendezvous Assistance Apparatus 11

The rendezvous assistance apparatus 11 illustrated in FIG. 2 includes a video input unit 12a, an vehicle position unit 12b, an vehicle communication controller 13a, and an vehicle controller 14a. The video input unit 12a and the vehicle position unit 12b illustrated in FIG. 2 are included in the concept of the first acquisition unit 12 illustrated in FIG. 1, and the vehicle communication controller 13a and the vehicle controller 14a illustrated in FIG. 2 are respectively included in the concepts of the first communication controller 13 and the first controller 14 illustrated in FIG. 1.

The video input unit 12a acquires a vehicle peripheral image captured by the vehicle image capturing device 16a.

The vehicle position unit 12b detects (acquires) the position of the subject vehicle 1a from positional information obtained by the GNSS receiver 16b.

The vehicle communication controller 13a controls transmission and reception of the vehicle communication device 16d. According to Embodiment 2 of the present invention, the vehicle communication controller 13a performs control to cause the vehicle communication device 16d to transmit vehicle transmit information including a vehicle peripheral image to the mobile terminal 2a, and performs control to cause the vehicle communication device 16d to receive vehicle receive information including the position of the terminal holder in the vehicle peripheral image from the mobile terminal 2a. The vehicle communication controller 13a also performs control to the vehicle communication device 16d to receive the position of the mobile terminal 2a from the mobile terminal 2a. For the sake of convenience, the transmission and reception of the vehicle communication device 16d conducted under the control of the vehicle communication controller 13a may be simply referred to as the transmission and reception of the vehicle communication device 16d, or as the transmission and reception of the subject vehicle 1a in the following description.

The vehicle controller 14a controls the constituent elements of the rendezvous assistance apparatus 11. According to Embodiment 2 of the present invention, the vehicle controller 14a performs control to cause the vehicle display 19a to display the relationship between the relative positions of the subject vehicle 1a and the mobile terminal 2a, on the basis of the position of the subject vehicle 1a detected by the vehicle position unit 12b and the position of the mobile terminal 2a received by the vehicle communication device 16d.

The vehicle controller 14a also performs control to cause the vehicle display 19a to display a first display object, for example when the vehicle manipulator 16c has accepted a prescribed operation from a user in the vehicle. Like the first display object described in Embodiment 1, the first display object as used herein is a display object that indicates the position of the terminal holder accompanied with the vehicle peripheral image displayed on the vehicle display 19a.

Internal Configuration of Mobile Terminal 2a

The mobile terminal 2a illustrated in FIG. 2 includes a mobile position unit 21, a mobile communication unit 22, a mobile operation unit 23, a mobile display 24, and an application executor 25.

The mobile position unit 21 corresponds to the GNSS receiver 16b and the vehicle position unit 12b of the subject vehicle 1a and detects (acquires) the position of the mobile terminal 2a.

The mobile communication unit 22 corresponds to the vehicle communication device 16d and the vehicle communication controller 13a of the subject vehicle 1a and communicates with the subject vehicle 1a using, for example, a mobile communication network, a near field communication (NFC), or a wireless local area network (LAN). According to Embodiment 2 of the present invention, the mobile communication unit 22 receives vehicle transmit information including the vehicle peripheral image from the subject vehicle 1a. The mobile communication unit 22 also transmits vehicle receive information including the position of the terminal holder in the vehicle peripheral image, and the position of the mobile terminal 2a obtained by the mobile position unit 21 to the subject vehicle 1a. For the sake of convenience, the transmission and reception of the mobile communication unit 22 may also be referred to simply as the transmission and reception of the mobile terminal 2a in the following description.

The mobile operation unit 23 corresponds to the vehicle manipulator 16c of the subject vehicle 1a and accepts operations from the terminal holder. For example, the mobile operation unit 23 may be a touch panel and operation switches that accept operations from the terminal holder, an image recognition device that accepts a gesture operation in the space from the terminal holder, and a voice recognition device that accepts a voice operation from the terminal holder. For the sake of convenience, the acceptance of operations by the mobile operation unit 23 may also be simply referred to as the acceptance of operations by the mobile terminal 2a in the following description.

The mobile display 24 corresponds to the vehicle display 19a of the subject vehicle 1a, and is a display that displays various types of information such as a display object on the display screen. For example, the mobile display 24 may be a liquid crystal display or an organic EL display.

The application executor 25 corresponds to the vehicle controller 14a of the subject vehicle 1a and controls the constituent elements of the mobile terminal 2a. According to Embodiment 2 of the present invention, when the mobile communication unit 22 has received vehicle transmit information, the application executor 25 displays the vehicle peripheral image included in the vehicle transmit information on the mobile display 24.

When the mobile operation unit 23 has accepted from the terminal holder a predetermined operation made to the vehicle peripheral image being displayed, the application executor 25 determines the position of the terminal holder in the vehicle peripheral image on the basis of the predetermined operation. In the following description, a predetermined operation for determining the position may also be referred to as the "positioning operation." The application executor 25 causes the information including the position of the terminal holder determined in the vehicle peripheral image to be transmitted as vehicle receive information from the mobile communication unit 22 and also causes that position to be displayed on the mobile display 24.

Operations

Hereinafter, the operations of the subject vehicle 1a (of the rendezvous assistance apparatus 11) and operations of the mobile terminal 2a will be described. In the operations described below, it is assumed that the mobile terminal 2a has already activated a rendezvous assistance application. It is also assumed that each of the subject vehicle 1a and the terminal holder has already been determined as the party at the other end by a predetermined procedure and has recognized parties that are to rendezvous with each other so as to be capable of mutual communication with each other.

Operations of Subject Vehicle 1a

Figure 3:
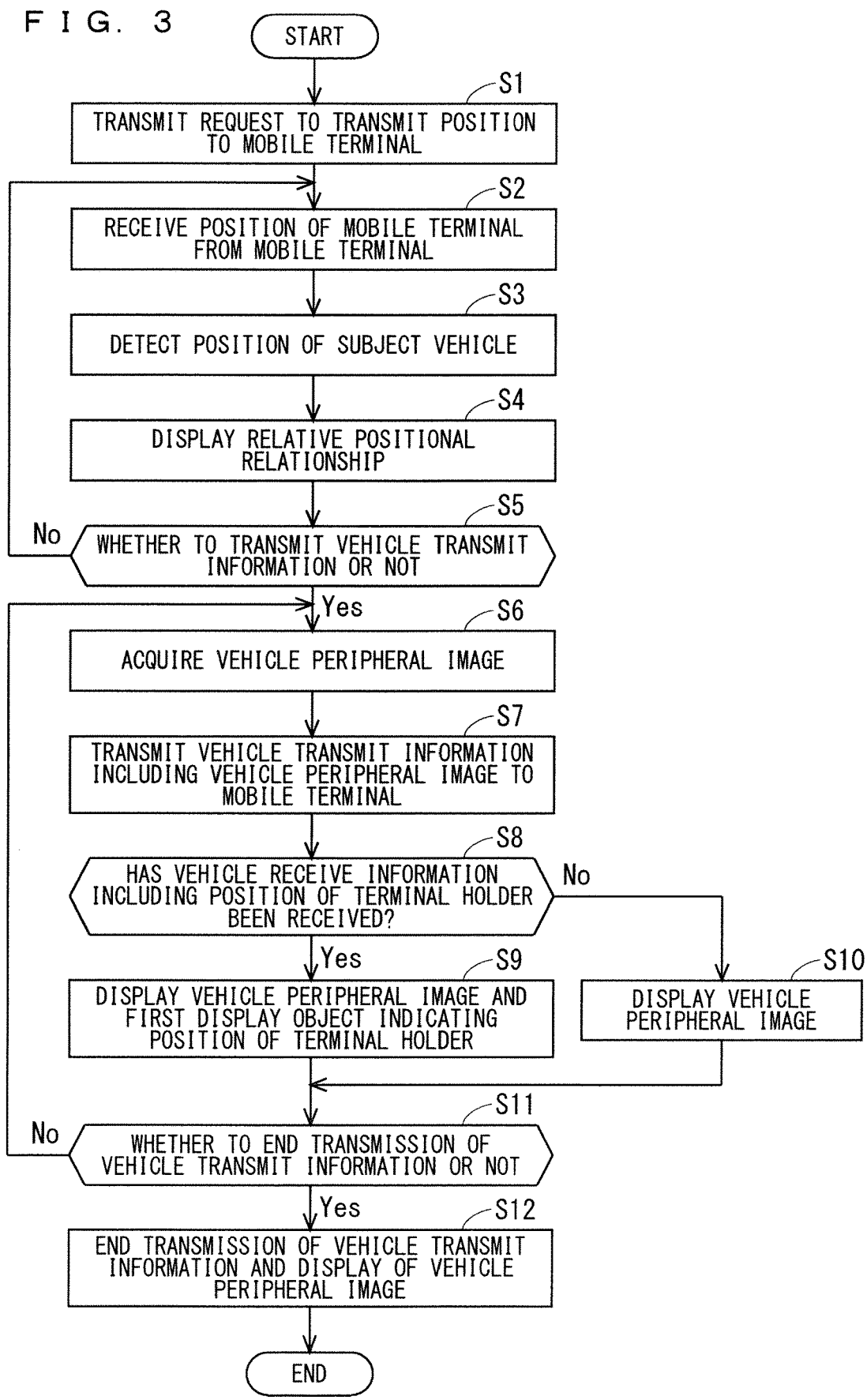
FIG. 3 is a flowchart illustrating operations of subject vehicle according to Embodiment 2.

FIG. 3 is a flowchart illustrating the operations of the subject vehicle 1a according to Embodiment 2 of the present invention.

First, in step S1, when the vehicle manipulator 16c has accepted an operation from a user in the vehicle such as the driver, the vehicle communication device 16d transmits a request to transmit the position of the mobile terminal 2a to the mobile terminal 2a. As will be described later, upon receipt of the transmission request, the mobile terminal 2a transmits the position of the mobile terminal 2a detected by the mobile position unit 21 to the subject vehicle 1a.

In step S2, the vehicle communication device 16d receives the position of the mobile terminal 2a from the mobile terminal 2a.

In step S3, the vehicle position unit 12b detects the position of the subject vehicle 1a.

In step S4, the vehicle controller 14a performs control to cause the vehicle display 19 to display the relationship between the relative positions of the subject vehicle 1a and the mobile terminal 2a on the basis of the position of the subject vehicle 1a detected by the vehicle position unit 12b and the position of the mobile terminal 2a received by the vehicle communication device 16d.

Figure 4:
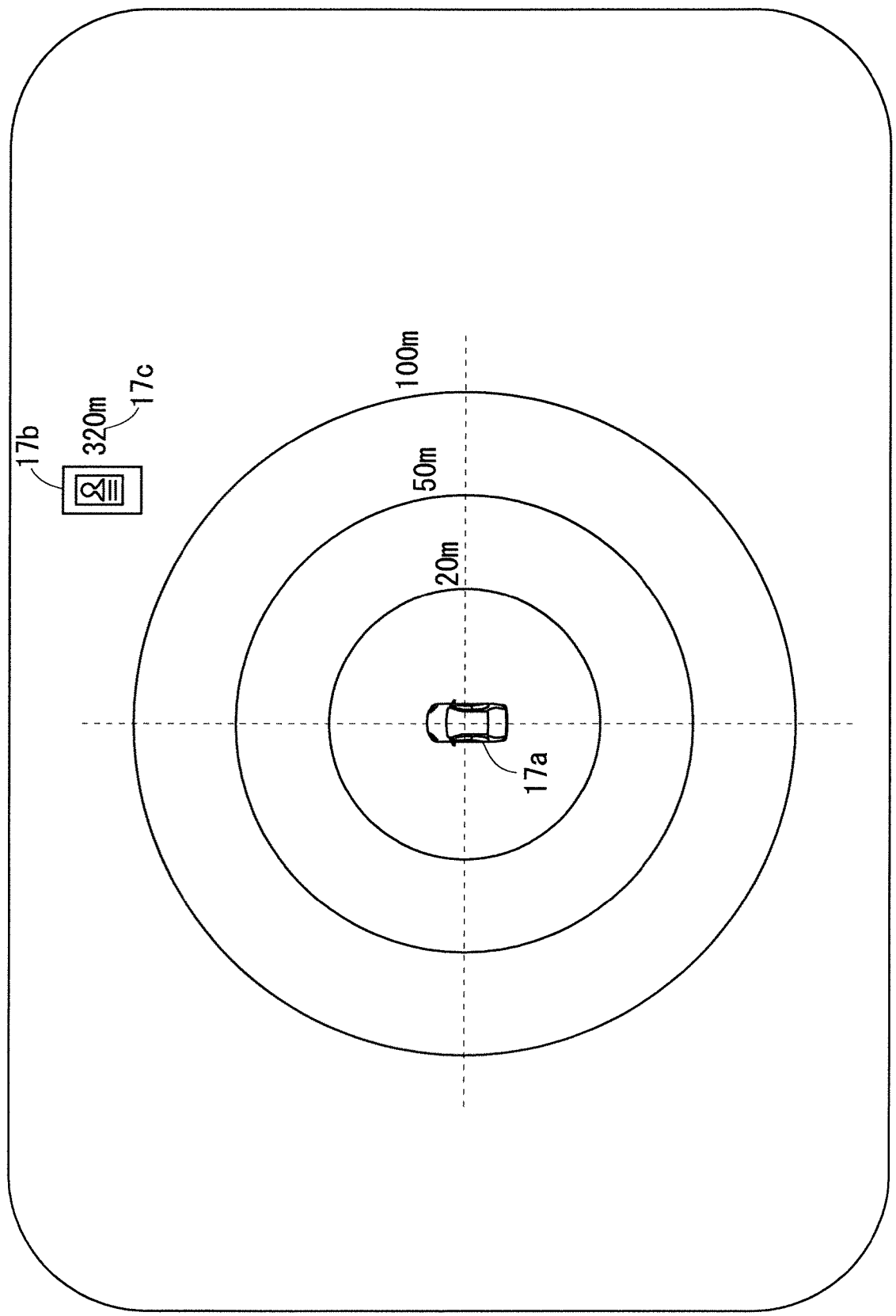
FIG. 4 is a diagram illustrating operations of the rendezvous assistance apparatus according to Embodiment 2.
Figure 5:
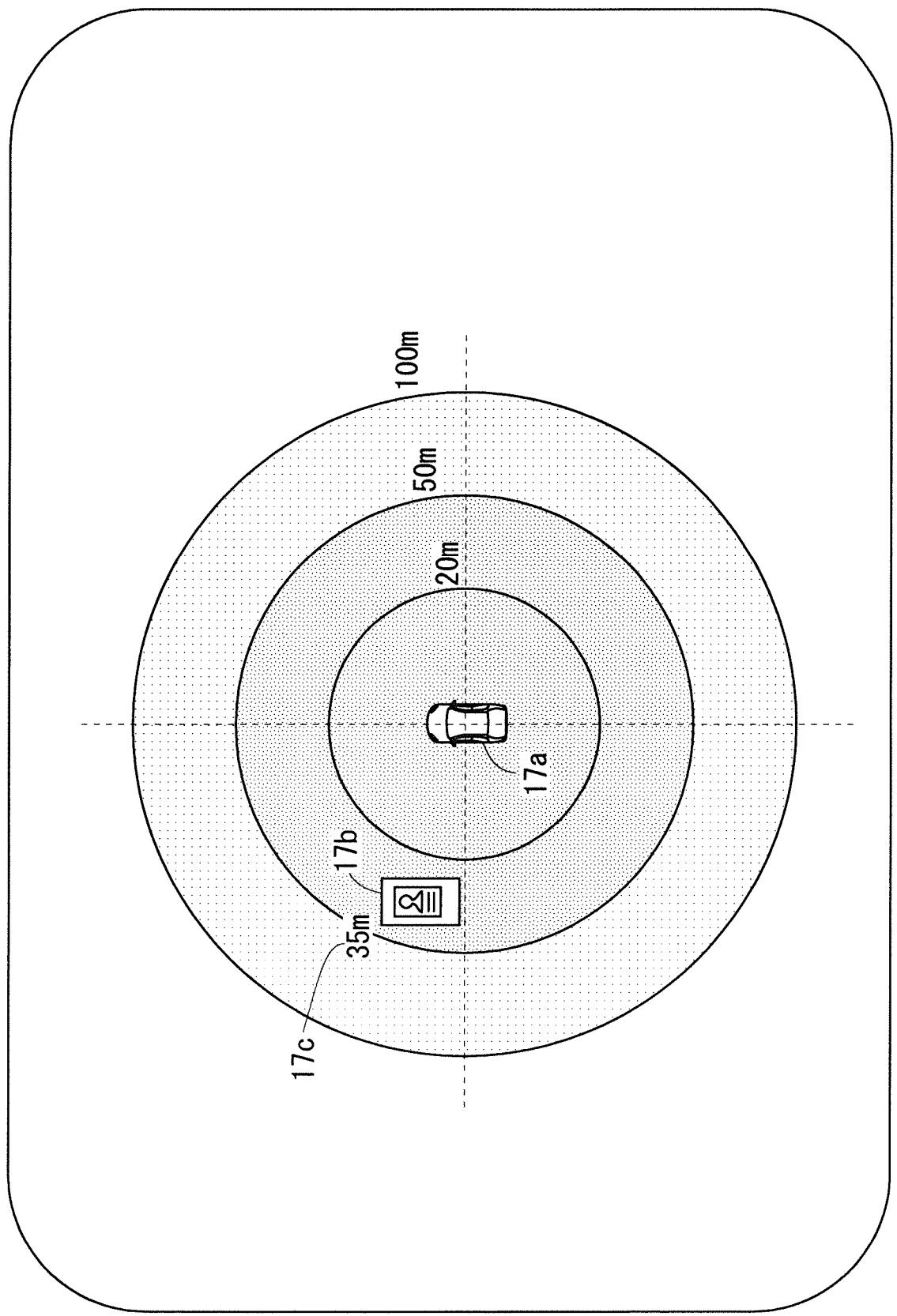
FIG. 5 is a diagram illustrating operations of the rendezvous assistance apparatus according to Embodiment 2.
Figure 6:
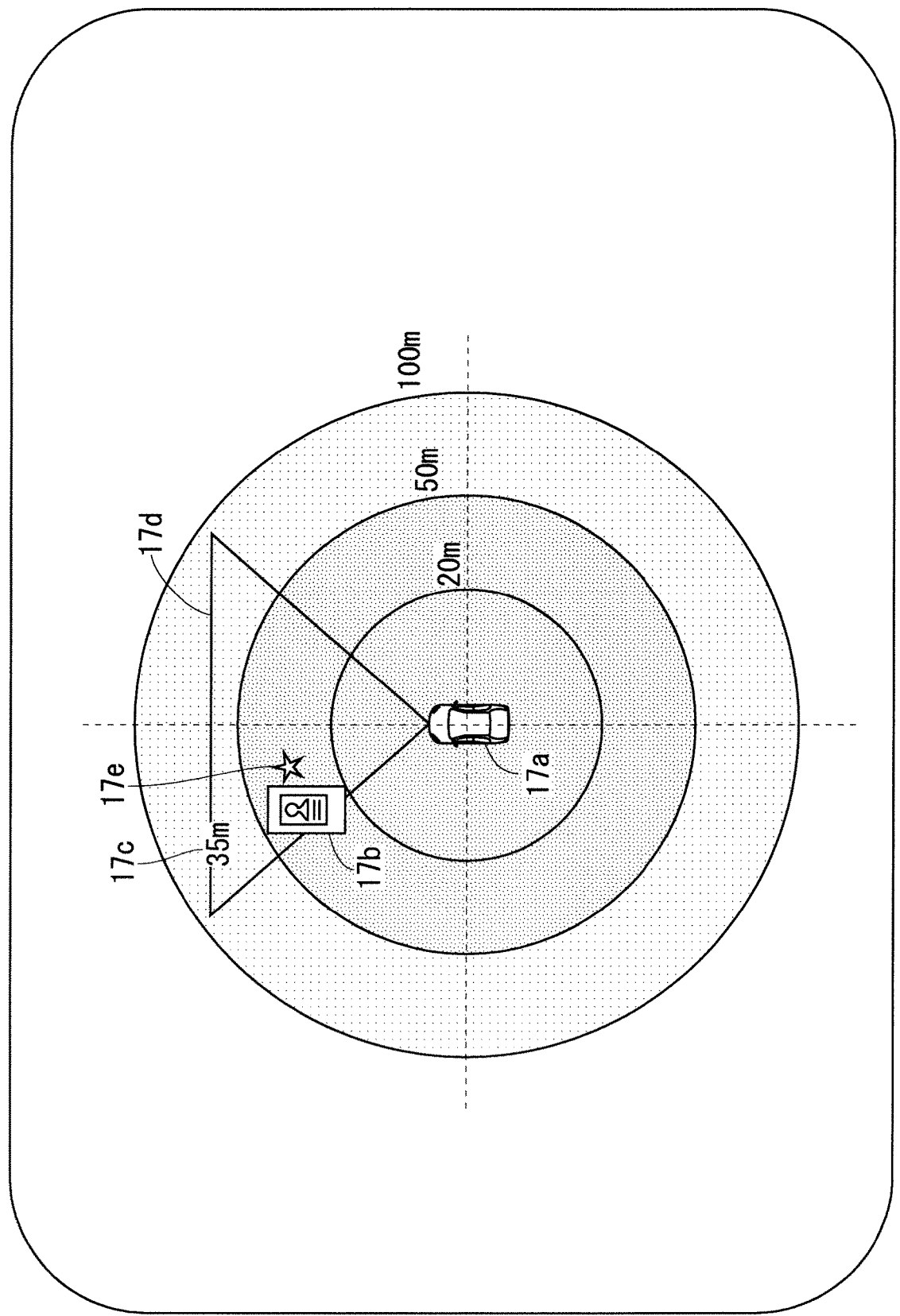
FIG. 6 is a diagram illustrating operations of the rendezvous assistance apparatus according to Embodiment 2.

FIGS. 4 to 6 are diagrams illustrating the operation performed in step S4. In FIGS. 4 to 6, display objects 17a, 17b, and 17c and circle scales with the display object 17a as their center and radii of 20 m, 50 m, and 100 m are displayed, the display object 17a indicating the subject vehicle 1a, the display object 17b indicating the mobile terminal 2a, and the display object 17c indicating the distance between the subject vehicle 1a and the mobile terminal 2a by characters.

The mobile terminal 2a is located outside the circle scales in FIG. 4 and located inside the circle scales in FIG. 5. In the case of FIG. 5, the insides of the circle scales are lightly colored.

In FIG. 6, the mobile terminal 2a is located inside the circle scales and within an image capturing region of the vehicle image capturing device 16a. In the case of FIG. 6, a triangular translucent display object 17d that indicates the image capturing region of the vehicle image capturing device 16a and a star display object 17e are displayed. Note that the display object 17b indicating the mobile terminal 2a in FIG. 6 may blink on the display.

In step S5 in FIG. 3, the vehicle controller 14a determines whether or not to transmit vehicle transmit information. According to Embodiment 2 of the present invention, when the vehicle manipulator 16c has accepted an operation of transmitting vehicle transmit information from a user in the vehicle, the vehicle controller 14a determines to transmit the vehicle transmit information, and the processing proceeds to step S6. On the other hand, when the vehicle manipulator 16c does not receive an operation of transmitting vehicle transmit information from a user in the vehicle, the vehicle controller 14a determines not to transmit vehicle transmit information, and the processing returns to step S2.

Note that the loop of processing from step S2 to step S5 in FIG. 3 may further include a step of accepting a break request from a user in the vehicle, the break request being a request to return the processing back to step S1 by causing the vehicle communication device 16d to discontinue the processing for receiving the position of the mobile terminal 2a from the mobile terminal 2a.

Figure 7:
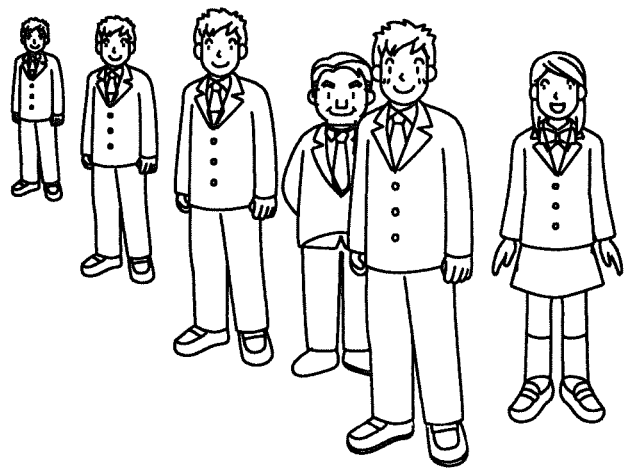
FIG. 7 is a diagram showing one example of a vehicle peripheral image according to Embodiment 2.

When the processing has proceeded from step S5 to step S6, the vehicle image capturing device 16a captures a vehicle peripheral image, and the video input unit 12a acquires the vehicle peripheral image captured by the vehicle image capturing device 16a. FIG. 7 shows one example of the vehicle peripheral image. As illustrated in FIG. 7, when the vehicle peripheral image contains a large number of persons, it is difficult for the user in the vehicle to identify which person is the terminal holder who is to rendezvous with the user.

In step S7, the vehicle communication controller 13a performs transmission control. This causes the vehicle communication device 16d to transmit the vehicle transmit information that includes the vehicle peripheral image to the mobile terminal 2a.

Figure 8:
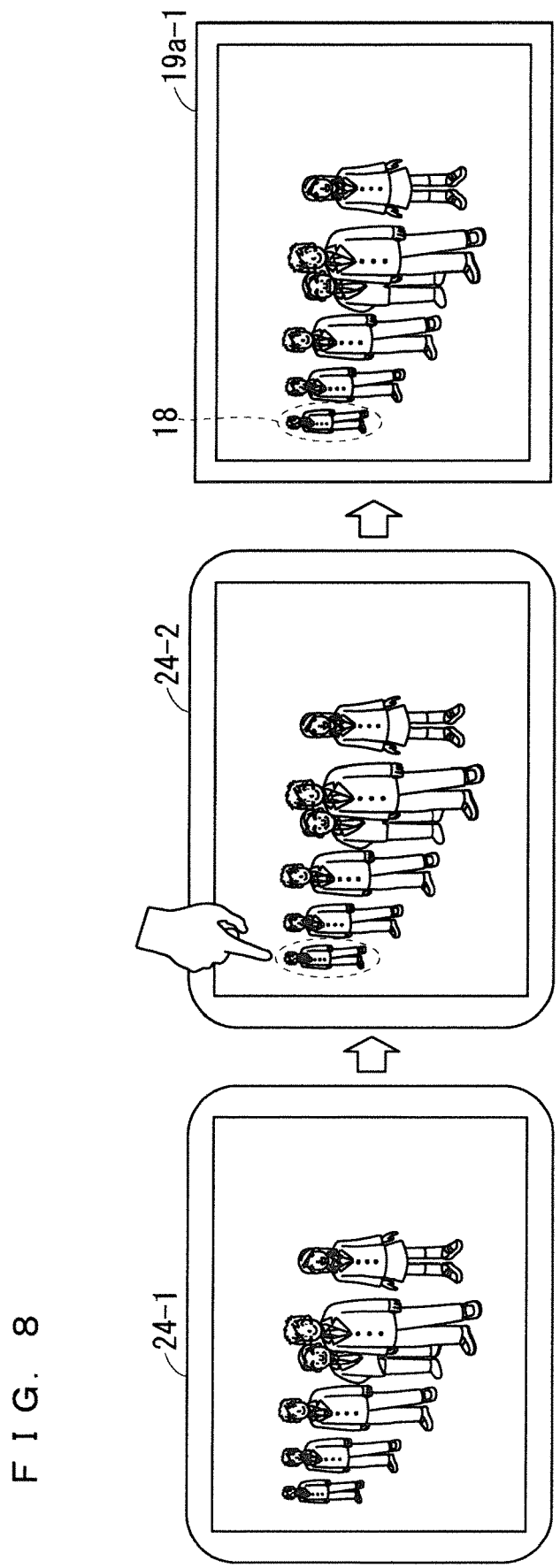
FIG. 8 is a diagram illustrating operations of the rendezvous assistance apparatus according to Embodiment 2.

Although the details of the operations of the mobile terminal 2a will be described later, upon receipt of the vehicle transmit information, the mobile terminal 2a displays the vehicle peripheral image included in the vehicle transmit information on the mobile display 24 (mobile display 24-1 in FIG. 8).

When having accepted a positioning operation made through the vehicle peripheral image that is being displayed, the mobile terminal 2a determines the position of the terminal holder in the vehicle peripheral image on the basis of the positioning operation. Then, the mobile terminal 2a transmits vehicle receive information that includes the determined position of the terminal holder from the mobile communication unit 22 and displays the determined position on the mobile display 24 (mobile display 24-2 in FIG. 8). The operation in FIG. 8 shows an example in which the position of the terminal holder in the vehicle peripheral image is determined through a touch operation, and an ellipsoidal display object that indicates this position is displayed with a broken line on the mobile display 24.

After step S7 in FIG. 3, in step S8, the vehicle controller 14a determines whether the vehicle communication controller 13a has performed reception control. That is, the vehicle controller 14a determines whether the vehicle communication device 16d has received the vehicle receive information including the position of the terminal holder in the vehicle peripheral image from the mobile terminal 2a. When it is determined that the vehicle receive information has been received, the processing proceeds to step S9, and when it is determined that the vehicle receive information has not been received, the processing proceeds to step S10.

In step S9, the vehicle controller 14a performs control to cause the vehicle display 19a to display a first display object on the basis of the vehicle receive information, the first display object indicating the position of the terminal holder, accompanied with the vehicle peripheral image displayed on the vehicle display 19a. The operation at this time is displayed on the vehicle display 19a-1 in FIG. 8, on which an ellipsoidal first display object 18 indicating the position of the terminal holder is displayed. Thereafter, the processing proceeds to step S11.

In step S10, the vehicle controller 14a performs control to cause the vehicle display 19a to display the vehicle peripheral image. Note that the vehicle peripheral image displayed at this time may be the same as the vehicle peripheral image transmitted in step S7, or may be the one captured after step S7. Thereafter, the processing proceeds to step S11.

In step S11, the vehicle controller 14a determines whether or not to end the transmission of the vehicle transmit information. According to Embodiment 2 of the present invention, when the vehicle manipulator 16c has received an operation of ending the transmission of the vehicle transmit information from the user in the vehicle, the vehicle controller 14a determines to end the transmission of the vehicle transmit information, and the processing proceeds to step S12. On the other hand, when the vehicle manipulator 16c has not accepted an operation of ending the transmission of the vehicle transmit information from the user in the vehicle, the vehicle controller 14a determines not to end the transmission of the vehicle transmit information, and the processing proceeds to step S6.

In step S12, the vehicle controller 14a ends transmission of the vehicle transmit information and also causes the vehicle display 19a to end the display of the vehicle peripheral image. After that, the operations in FIG. 3 end.

Operations of Mobile Terminal 2a

Figure 9:
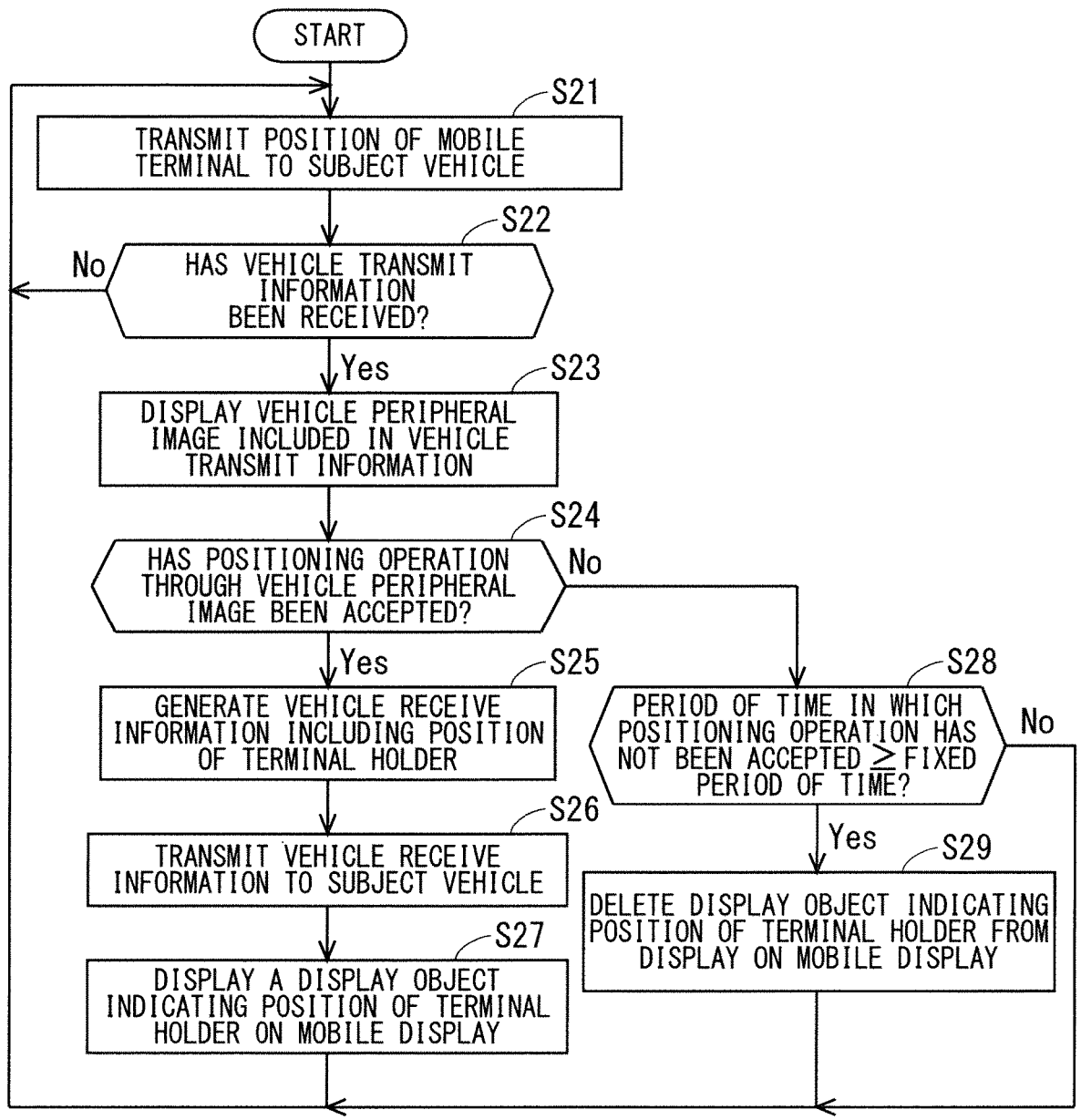
FIG. 9 is a flowchart illustrating operations of a mobile terminal according to Embodiment 2.

FIG. 9 is a flowchart illustrating the operations of the mobile terminal 2a according to Embodiment 2 of the present invention. Note that these operations are performed, for example when the mobile communication unit 22 has received the transmission request transmitted in step S1 in FIG. 3.

First, in step S21, the mobile communication unit 22 transmits the position of the mobile terminal 2a detected by the mobile position unit 21 to the subject vehicle 1a that has transmitted the transmission request.

In step S22, the application executor 25 determines whether the mobile communication unit 22 has received the vehicle transmit information including the vehicle peripheral image. When it is determined that the vehicle transmit information has been received, the processing proceeds to step S23, and when it is determined that the vehicle transmit information has not been received, the processing proceeds to step S21. Note that the loop of processing in steps S21 and S22 may be performed at regular intervals so that the transmission in step S21 is performed regularly such as every ten seconds.

In step S23, the application executor 25 performs control to cause the mobile display 24 to display the vehicle peripheral image included in the vehicle transmit information. This provides a display as shown on the mobile display 24-1 in FIG. 8.

In step S24, the application executor 25 determines whether the mobile operation unit 23 has accepted a positioning operation through the vehicle peripheral image. According to Embodiment 2 of the present invention, examples of the positioning operation include an operation of circling the terminal holder and an operation of indicating the terminal holder. When it is been determined that the positioning operation has been accepted, the processing proceeds to step S25, and when it is determined that the positioning operation has not been accepted, the processing proceeds to step S28.

In step S25, the application executor 25 determines the position of the terminal holder in the vehicle peripheral image on the basis of the positioning operation and generates vehicle receive information that includes the position of the terminal holder. For example, when the positioning operation corresponds to a dragging operation, the position of the terminal holder included in the vehicle receive information may be information about the path of dragging, and when the positioning operation corresponds to a touch operation, the position of the terminal holder may be information about a circle that surrounds the touched location. As another alternative, for example, when the positioning operation corresponds to a touch operation and the mobile terminal 2a has the image recognition function of recognizing a person from an image, the position of the terminal holder included in the vehicle receive information may be information about a circle that surrounds the touched person.

In step S26, the mobile communication unit 22 transmits the vehicle receive information generated by the application executor 25 to the subject vehicle 1a.

In step S27, the application executor 25 performs control to cause the mobile display 24 to display a display object that indicates the position of the terminal holder, on the basis of the positioning operation of the vehicle receive information. This provides a display as shown on the mobile display 24-2 in FIG. 8. After that, the processing returns to step S21.

In step S28, the application executor 25 determines whether the period of time during which the mobile operation unit 23 has not accepted a positioning operation made through the vehicle peripheral image is longer than or equal to a fixed period of time. When it is determined that this period of time is longer than or equal to the fixed period of time, the processing proceeds to step S29, and when it is determined that the period of time is less than the fixed period of time, the processing returns to step S21. Accordingly, when the display object has already been displayed on the mobile display 24 and the period of time during which the positioning operation has not been accepted is less than the fixed period of time (e.g., five seconds), the display object continues to be displayed.

In step S29, the application executor 25 deletes the display object indicating the position of the terminal holder from the display on the mobile display 24. After that, the processing returns to step S21.

Summary of Embodiment 2

In the rendezvous assistance apparatus 11 according to Embodiment 2 of the present invention as described above, the vehicle controller 14a of the subject vehicle 1a performs control to cause the vehicle display 19a to display the relationship between the relative positions of the subject vehicle 1a and the mobile terminal 2a on the basis of the position of the subject vehicle 1a and the position of the mobile terminal 2a. This configuration provides a display of the mutual positional relationship as illustrated in FIGS. 4 to 6. Accordingly, the user in the vehicle is able to determine whether the subject vehicle 1a and the mobile terminal 2a are located close enough to each other and accordingly whether it is appropriate to perform operations from step S6 onward, such as the transmission of the vehicle transmit information.

According to Embodiment 2 of the present invention, upon receipt of the vehicle transmit information from the subject vehicle 1a, the mobile terminal 2a displays the vehicle peripheral image included in the vehicle transmit information on the mobile display 24 and determines the position of the terminal holder in the vehicle peripheral image on the basis of the positioning operation made through the vehicle peripheral image. This configuration enables the terminal holder himself/herself to determine the position of the terminal holder in the vehicle peripheral image and accordingly to inform the subject vehicle 1a about the accurate position of the terminal holder.

Variation 1 of Embodiment 2

In step S1 in FIG. 3 according to Embodiment 2, upon receipt of an operation from a user in the vehicle, the subject vehicle 1a transmits a request to transmit the position of the mobile terminal 2a to the mobile terminal 2a, but the present embodiment is not limited to this example. For example, when the mobile terminal 2a is configured to automatically transmit the position of the mobile terminal 2a to the subject vehicle 1a at regular or irregular intervals in step S21 in FIG. 9, the operation in step S1 in FIG. 3 may be unnecessary. As another alternative, for example, irrespective of the presence or absence of an operation from a user in the vehicle, the subject vehicle 1a may automatically transmit a request to transmit the position of the mobile terminal 2a to the mobile terminal 2a at regular intervals in step S1 in FIG. 3. At this time, the mobile terminal 2a that has received one transmission request from the subject vehicle 1a may transmit the position of the mobile terminal 2a twice or more in step S21 in FIG. 9.

Variation 2 of Embodiment 2

In step S4 in FIG. 3 according to Embodiment 2, only the relationship between the relative positions of the subject vehicle 1a and the mobile terminal 2a is displayed as illustrated in FIGS. 4 to 6, but the present embodiment is not limited to this example. For example, when the rendezvous assistance apparatus 11 is capable of using map data including, for example, planimetric features, the map data may also be displayed in FIGS. 4 to 6. As another alternative, the map data may be displayed on most part of the screen of the vehicle display 19a, and the mutual positional relationship in FIGS. 4 to 6 may be displayed on part of the screen.

Variation 3 of Embodiment 2

From step S6 onward in FIG. 3 according to Embodiment 2, it is assumed that the relationship between the relative positions of the subject vehicle 1a and the mobile terminal 2a (e.g., FIGS. 4 to 6) in step S4 in FIG. 3 is not displayed, but the mutual positional relationship may be displayed from step S6 onward.

For example, the vehicle peripheral image in steps S9 and S10 illustrated in FIG. 3 may be displayed on most part of the screen of the vehicle display 19a, and the mutual positional relationship in step S4 in FIG. 3 may be displayed on part of the screen.

When the vehicle display 19a is configured to include a main display and a sub-display, the main display may display the vehicle peripheral image in steps S9 and S10 in FIG. 3, and the sub-display may display the mutual positional relationship in step S4 in FIG. 3. Note that the sub-display may be a display or HUD that has a smaller display screen or display region than the main display, but the present embodiment is not limited to this example.

Variation 4 of Embodiment 2

The vehicle peripheral image in steps S6 and S7 in FIG. 3 according to Embodiment 2 may be a moving image such as a live view image, or may be a still image obtained intermittently every second. In step S7, the subject vehicle 1a may regularly transmit vehicle transmit information that includes a still image as a vehicle peripheral image to the mobile terminal 2a, or may transmit such vehicle transmit information to the mobile terminal 2a only when a user in the vehicle has performed a transmission operation.

Variation 5 of Embodiment 2

The vehicle peripheral image in steps S9 and S10 in FIG. 3 according to Embodiment 2 may be a moving image such as a live view image, or may be a still image obtained intermittently every second. For example, the still image of the vehicle peripheral image in steps S9 and S10 may continue to be displayed until new vehicle receive information is received again in step S8. As another alternative, for example, the still image of the vehicle peripheral image may continue to be displayed until a user in the vehicle performs a predetermined operation.

As yet another alternative, for example, when a predetermined condition is satisfied, the vehicle controller 14a may perform control to cause the vehicle display 19a to display the still image of the vehicle peripheral image and the first display object 18 that indicates the position of the terminal holder accompanied with the still image. When the predetermined condition is not satisfied, the vehicle controller 14 may perform control to cause the vehicle display 19a to display not the still image but the moving image of the vehicle peripheral image and the first display object 18 indicating the position of the terminal holder accompanied with the moving image. Note that the predetermined condition may, for example, be execution of a predetermined operation by the user in the vehicle.

Variation 6 of Embodiment 2

According to Embodiment 2, the vehicle receive information transmitted from the mobile terminal 2a includes only the position of the terminal holder in the vehicle peripheral image, but the present embodiment is not limited to this example. For example, the vehicle receive information may also include the vehicle peripheral image, in addition to the position of the terminal holder in the vehicle peripheral image. Then, the vehicle controller 14a may perform control to cause the vehicle display 19a to display the vehicle peripheral image included in the vehicle receive information and the first display object 18 indicating the position of the terminal holder in the vehicle peripheral image.

Variation 7 of Embodiment 2

When having received a voice that indicates the position of, for example, the terminal holder in the vehicle peripheral image, the mobile terminal 2a may transmit vehicle receive information that further includes the voice. That is, the vehicle receive information transmitted from the mobile terminal 2a may further include the voice. This voice may say, for example, "the person who is wearing black clothes is me."

In addition, for example, when the vehicle receive information includes a voice and the rendezvous assistance apparatus 11 is capable of controlling a voice output device (not shown), not only the first display object 18 is displayed, but also the voice included in the vehicle receive information may be outputted in step S9 in FIG. 3.

For example, when the vehicle receive information includes a voice and the rendezvous assistance apparatus 11 is capable of converting a voice into characters, not only the first display object 18 is displayed, but also characters obtained by converting the voice included in the vehicle receive information may be displayed in step S9 in FIG. 3.

For example, when the vehicle receive information includes a voice and the mobile terminal 2a is capable of converting s voice into characters, the vehicle receive information to be transmitted in step S26 in FIG. 9 according to Embodiment 2 may further include characters obtained by converting the voice accepted by the mobile terminal 2a. Then, not only the first display object 18 is displayed, but also the characters included in the vehicle receive information may be displayed in step S9 illustrated in FIG. 3.

Variation 8 of Embodiment 2

The mode of display of a display object displayed on the mobile display 24 and the mode of display of the first display object 18 displayed on the vehicle display 19a according to Embodiment 2 are not limited to the examples described above. Hereinafter, examples of these modes of display (graphics, characters, shapes, colors, presence or absence of animation) will be described.

Figure 10:
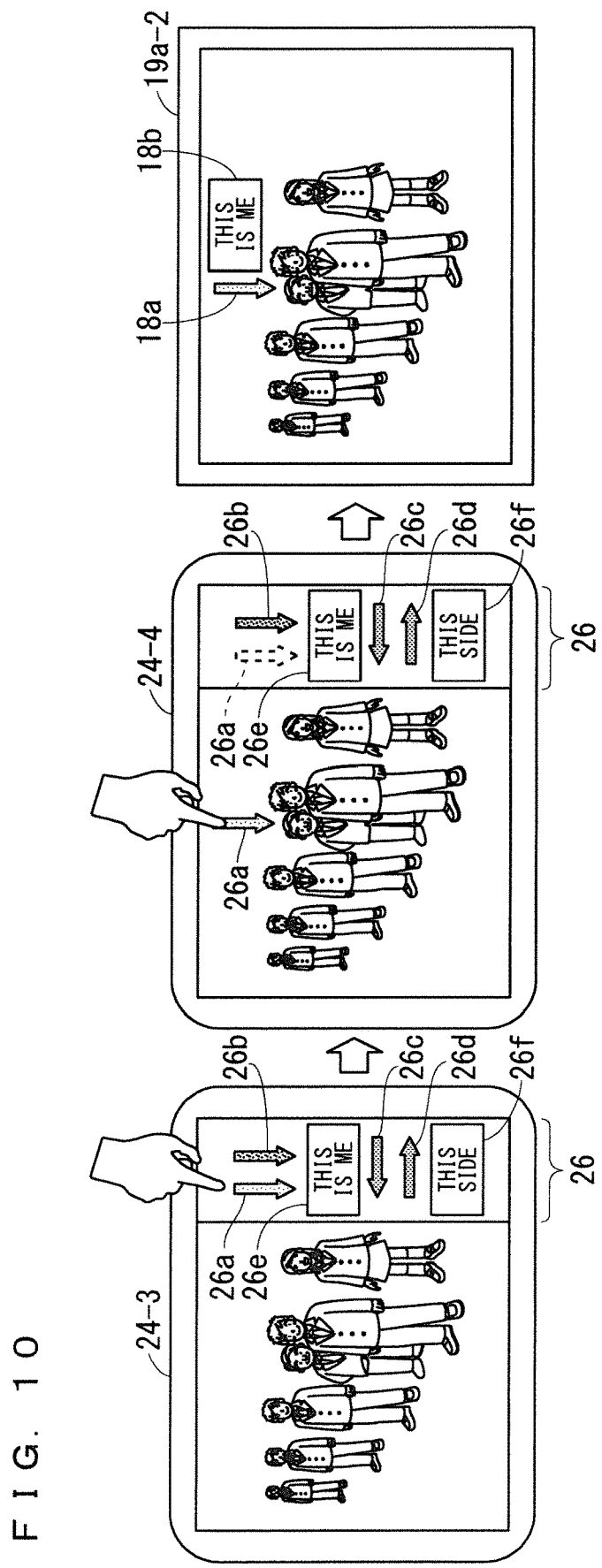
FIG. 10 is a diagram illustrating operations of a rendezvous assistance apparatus according to Variation 8 of Embodiment 2.

The mobile terminal 2a according to Variation 8 of the present embodiment displays a selection area 26 that includes a plurality of display objects 26a to 26f, together with the vehicle peripheral image, in step S23 in FIG. 9, as shown on the mobile display 24-3 in FIG. 10. The number of display objects 26a and 26b indicating down arrows is only two, but the present variation is not limited to this example, and the number of such display objects may be the same as the number of persons in the vehicle peripheral image. In this case, the colors and patterns of the display objects indicating down arrows may be the same as the colors and patterns of persons' clothes in the vehicle peripheral image.

For example, assume the case where the mobile terminal 2a according to Variation 8 of the present embodiment has accepted, as the positioning operation in step S24 in FIG. 9, a dragging operation of adding the display object 26a located within the selection area 26 to the vehicle peripheral image. In this case, the mobile display 24 displays the display object 26a in the vehicle peripheral image in step S27, as shown on the mobile display 24-4 in FIG. 10. As displayed on the mobile display 24-4 in FIG. 10, a display object that is being used, among the display objects in the selection area 26, may be displayed with a broken line or in a semitransparent manner.

When having accepted the aforementioned dragging operation in step S24 in FIG. 9, the mobile terminal 2a transmits, to the subject vehicle 1a, vehicle receive information that includes the position of the display object added to the vehicle peripheral image on the mobile display 24 as the position of the terminal holder in the vehicle peripheral image.

The vehicle display 19a-2 in FIG. 10 illustrates the operation of the vehicle display 19a performed when the subject vehicle 1a has received such vehicle receive information. In this example, upon receipt of an operation of adding the display object 26a within the selection area 26 on the mobile display 24-4 in FIG. 10 in step S24 in FIG. 9, a first display object 18a corresponding to the display object 26a is displayed. Also, upon receipt of an operation of adding a display object 26e within the selection area 26 on the mobile display 24-4 in FIG. 10 in step S24 in FIG. 9, the first display object 18b corresponding to the display object 26e is displayed.

As described above, the configuration in which the mode of display of the first display object 18 is changed by the terminal holder enables the user in the vehicle to easily identify the terminal holder.

Figure 11:
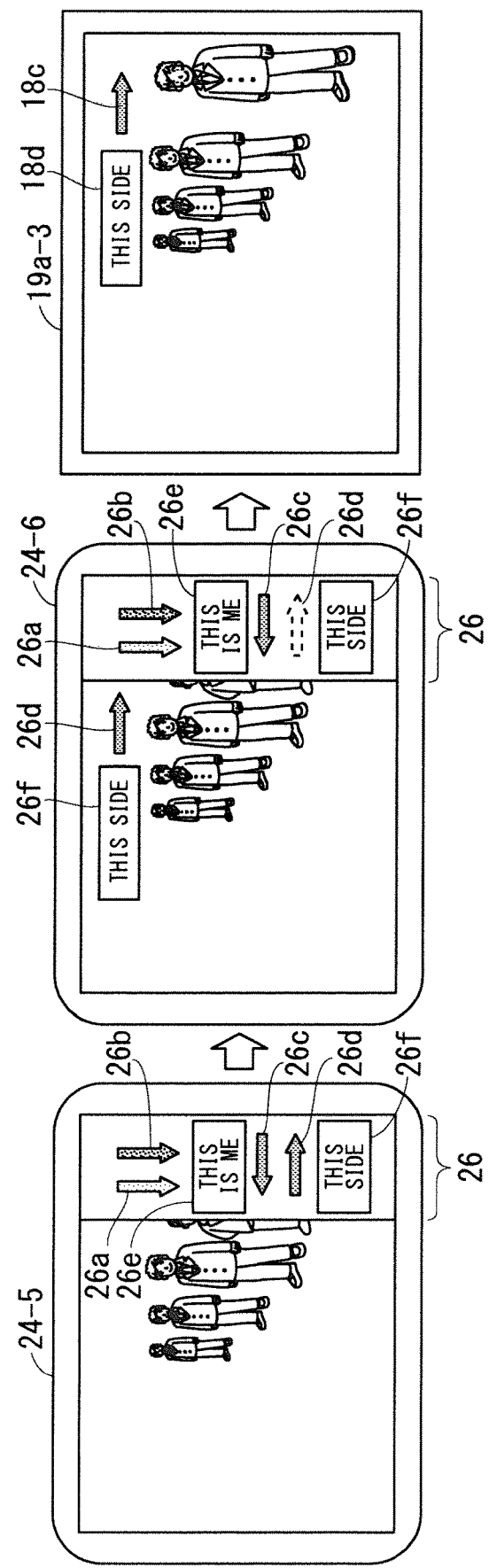
FIG. 11 is a diagram illustrating the operations of the rendezvous assistance apparatus according to Variation 8 of Embodiment 2.

Although, in the descriptions given thus far, the vehicle peripheral image contains the terminal holder, in actual operation there are some cases where the vehicle peripheral image does not contain the terminal holder. As a result, the terminal holder may not be seen in the vehicle peripheral image displayed on the mobile display 24 and may be located, for example, on the right side of the vehicle peripheral image as shown on the mobile display 24-5 in FIG. 11. In this case, as the positioning operation in step S24 in FIG. 9, an operation of adding display objects 26d and 26f to the vehicle peripheral image as shown on the mobile display 24-6 in FIG. 11 may be performed on the mobile terminal 2a. When this operation is performed, a first display object 18c corresponding to the display object 26d and a first display object 18d corresponding to the display object 26f are displayed on the vehicle display 19a, as shown on the vehicle display 19a-3 in FIG. 11.

This configuration according to Variation 8 of the present embodiment enables the user in the vehicle to identify the terminal holder to some extent even if the terminal holder is not seen in the vehicle peripheral image. When the mobile terminal 2a is capable of controlling the direction of image capture of the vehicle image capturing device 16a of the subject vehicle 1a, the terminal holder is able to control the above direction of image capture such that the terminal holder can be seen in the vehicle peripheral image, with reference to the display on the vehicle display 19a-3 in FIG. 11. This will be described in detail in Variation 8 of Embodiment 6.

Figure 12:
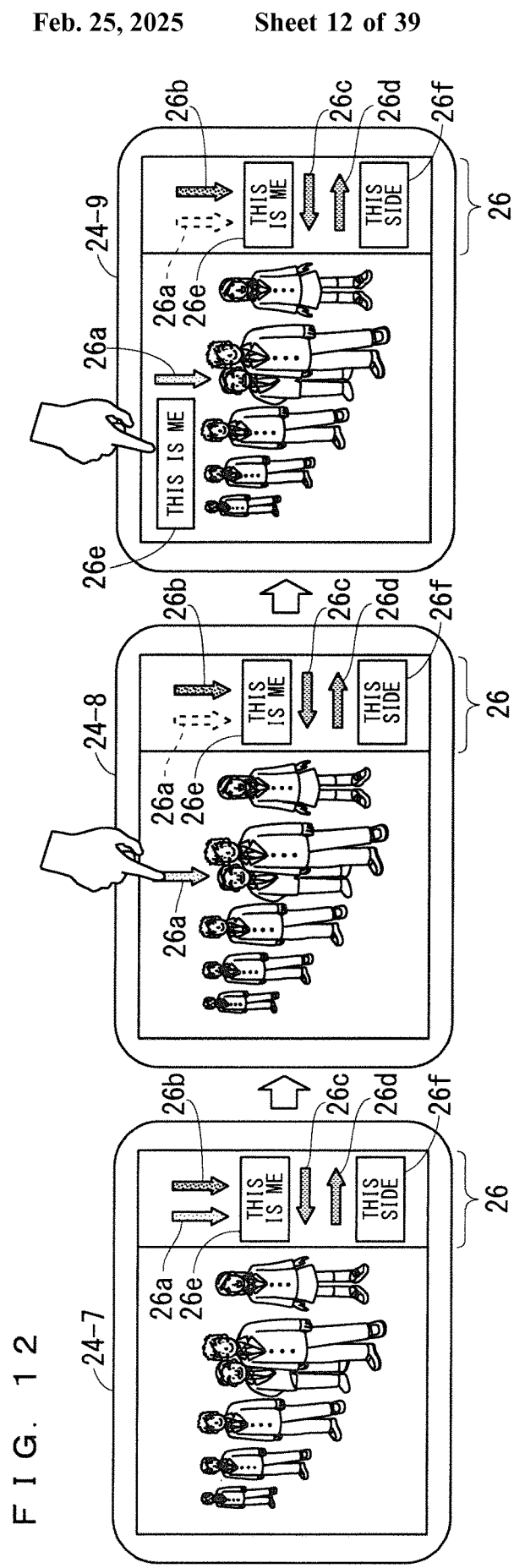
FIG. 12 is a diagram illustrating the operations of the rendezvous assistance apparatus according to Variation 8 of Embodiment 2.
Figure 13:
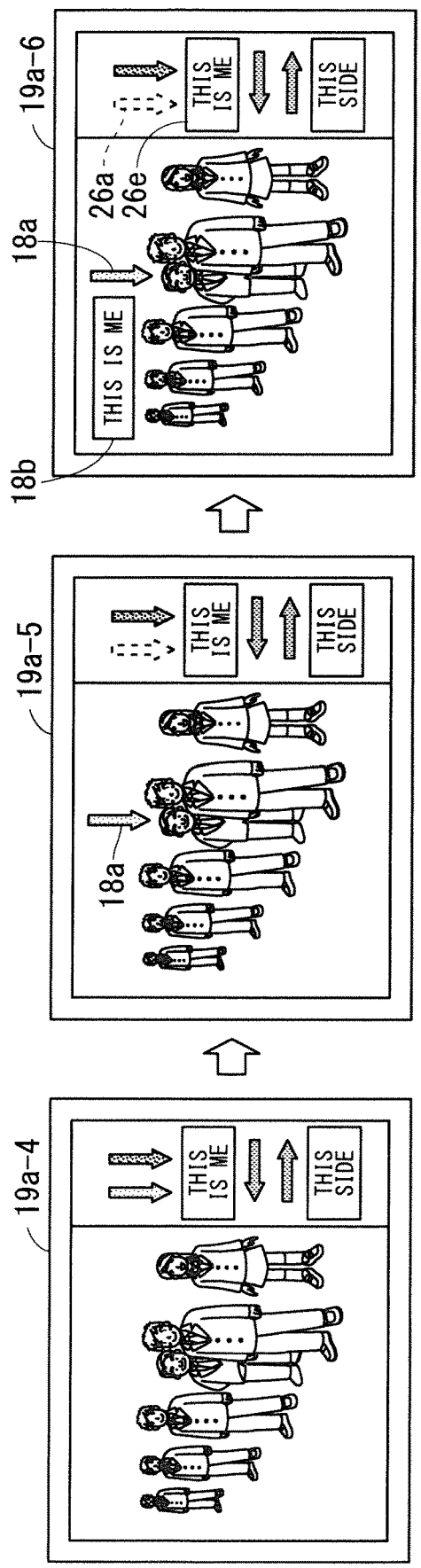
FIG. 13 is a diagram illustrating the operations of the rendezvous assistance apparatus according to Variation 8 of Embodiment 2.

When the display on the mobile displays 24-7, 24-8, and 24-9 in FIG. 12 appears in this order, the display on the vehicle displays 19a-4, 19a-5, and 19a-6 in FIG. 13 may also appear in this order in almost real time. That is, irrespective of the presence or absence of an operation made through the mobile terminal 2a, Mirrorlink control may be performed so that the display on the mobile display 24 of the mobile terminal 2a become substantially the same as the display on the vehicle display 19a of the subject vehicle 1a.

Note that, during Mirrorlink control, the mobile terminal 2a may transmit a positioning operation to the subject vehicle 1a so that an icon of a pseudo finger that indicates the positioning operation is displayed in synchronization on the vehicle display 19a. This configuration enables the user in the vehicle to know that the positioning operation is being performed.

As another alternative, during Mirrorlink control, the subject vehicle 1a may accept an operation of adding or changing display objects displayed on the vehicle display 19a. Then, upon receipt of this operation, the subject vehicle 1a may not only change the display on the vehicle display 19a, but also communicate with the mobile terminal 2a and change the display on the mobile display 24. At this time, the vehicle display 19a may display an area similar to the selection area 26 in FIG. 10.

Variation 9 of Embodiment 2

Figure 14:
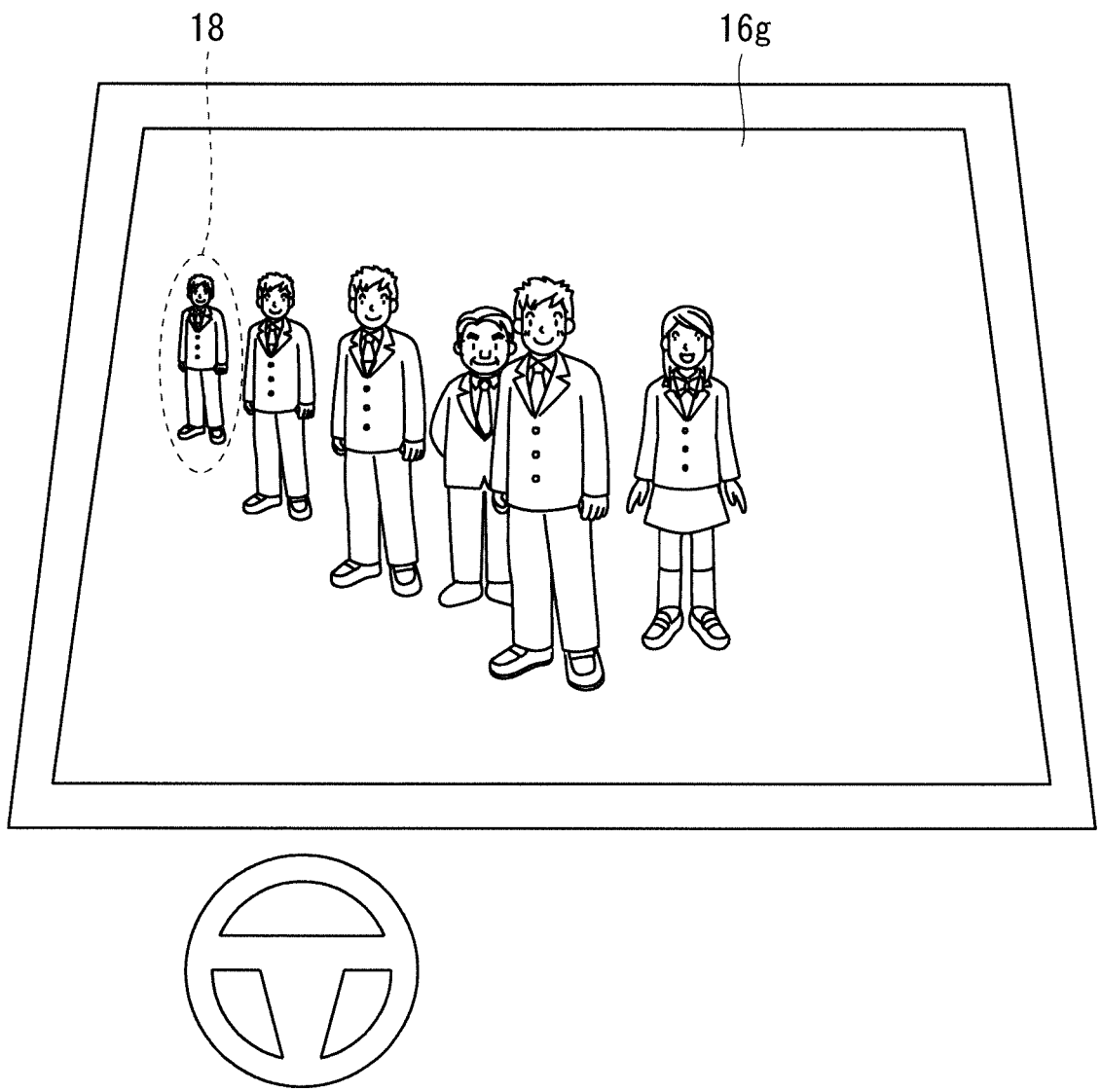
FIG. 14 is a diagram illustrating operations of a rendezvous assistance apparatus according to Variation 9 of Embodiment 2.

According to Embodiment 2, the vehicle display 19a displays various types of information such as display objects on the display screen, but the present embodiment is not limited to this example. For example, as illustrated in FIG. 14, the vehicle display 19a may be an HUD that displays display objects on a windshield 16g of the subject vehicle 1a. The vehicle display 19a may also be a transmission liquid crystal display for use in windows of the subject vehicle 1a that displays display objects overlapping on the windshield 16g of the subject vehicle 1a.

Figure 15:
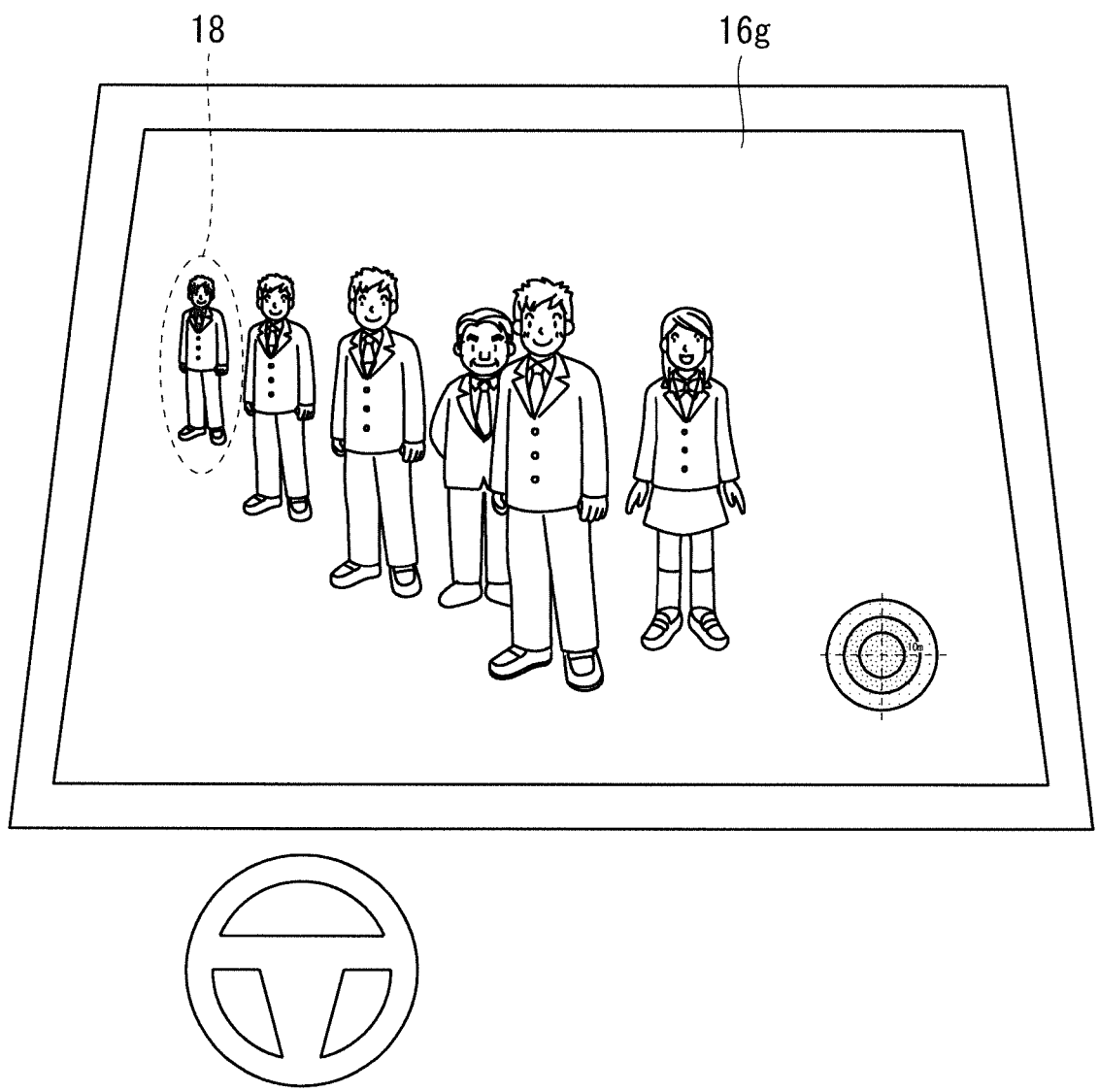
FIG. 15 is a diagram illustrating the operations of the rendezvous assistance apparatus according to Variation 9 of Embodiment 2.

This vehicle display 19a is capable of displaying the first display objects 18 accompanied with a landscape of the outside of the subject vehicle 1a as illustrated in FIG. 14. FIG. 15 is a diagram illustrating, as another example of Variation 9 of the present embodiment, a similar display to the display according to Variation 3 of Embodiment 2.

According to Variation 9 of the present embodiment, the rendezvous assistance apparatus 11 may further include a detector that detects the positions of the eyes of the driver and may be configured to adjust the positions of display objects on the basis of the positions of the eyes. This configuration allows display objects to be displayed at appropriate positions.

Variation 10 of Embodiment 2

According to Embodiment 2, the vehicle transmit information transmitted from the subject vehicle 1a includes only the vehicle peripheral image, but the present embodiment is not limited to this example. For example, the vehicle transmit information may further include at least one of dynamic information and static information about the subject vehicle 1a that are used in display on the mobile display 24 (second display) of the mobile terminal 2a.

Examples of the dynamic information include the position the running state, velocity of the subject vehicle 1a, whether the vehicle 1a is at a stop or not, the control state (e.g., the autonomous operation state, or the lighting states of, for example, a headlamp, a hazard warning lamp, and a turn signal of the subject vehicle 1a), and the direction of image capture. For example, when the vehicle transmit information includes the position of the subject vehicle 1a as the dynamic information, the terminal holder is able to know the relationship between the positions of the subject vehicle 1a and the terminal holder and is thus able to appropriately transmit a request to transmit the vehicle peripheral image to the subject vehicle 1a. For example, when the vehicle transmit information includes information about whether the subject vehicle 1a is at a stop or not as the dynamic information, the terminal holder is able to transmit a request to transmit the vehicle peripheral image while confirming that the subject vehicle 1a is at a stop. This configuration enables the terminal holder to see the vehicle peripheral image that is less blurred because it is captured while the subject vehicle 1a is at a stop.

Examples of the static information include the attribute and profile (outer appearance), specific characters, symbols, images, avatars, and the driver's profile of the subject vehicle 1a. For example, when the vehicle transmit information includes the profile (outer appearance) of the subject vehicle 1a as the static information, the terminal holder is able to know the outer appearance of the subject vehicle 1a and is thus able to easily identify the subject vehicle 1a.

Variation 11 of Embodiment 2

According to Embodiment 2, the vehicle receive information transmitted from the mobile terminal 2a includes only the position of the terminal holder in the vehicle peripheral image, but the present embodiment is not limited to this example. For example, the vehicle receive information may further include at least one of the dynamic information and the static information about the terminal holder and the mobile terminal 2a that are used in display on the vehicle display 19a.

Examples of the dynamic information include the position, velocity of the terminal holder and the mobile terminal 2a, whether the terminal holder and the mobile terminal 2a are moving or at a stop, the control state of the mobile terminal 2a, and the direction of image capture. Examples of the static information include the attribute and profile (outer appearance, age, stature, and clothes), specific characters, symbols, and avatars of the terminal holder. For example, when the vehicle receive information includes the profile (outer appearance) of the terminal holder as the static information, the user in the vehicle is able to know the outer appearance of the terminal holder and is thus able to easily identify the terminal holder.

Variation 12 of Embodiment 2

According to Embodiment 2, when having accepted the operation of transmitting the vehicle transmit information from the user in the vehicle in step S5 in FIG. 3, the subject vehicle 1a transmits the vehicle transmit information in step S6 onward and then performs operations in subsequent steps, but the present embodiment is not limited to this example. When a predetermined condition is satisfied, the subject vehicle 1a may perform control to transmit the vehicle transmit information to the mobile terminal 2a.

Figure 16:
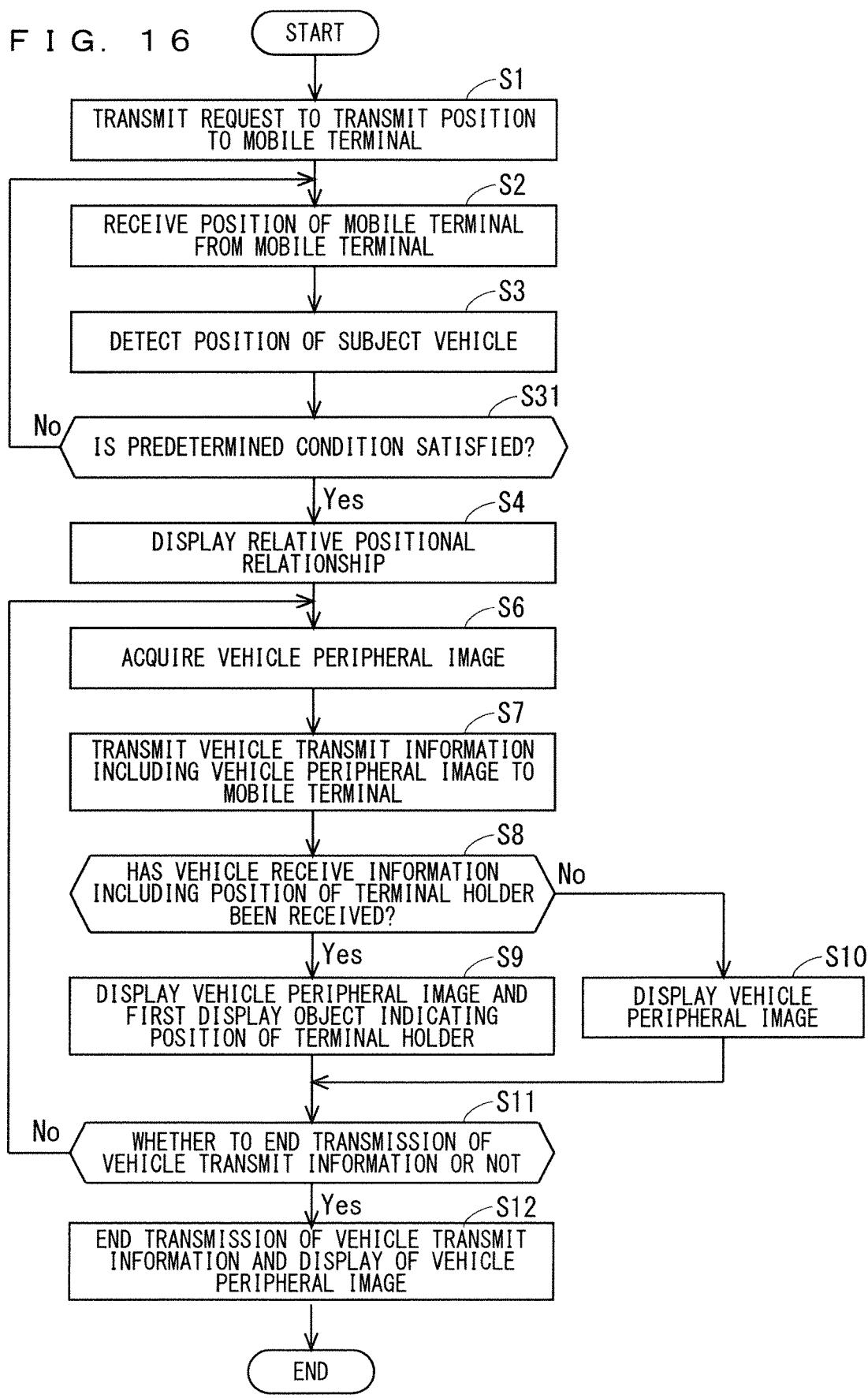
FIG. 16 is a flowchart illustrating operations of subject vehicle according to Variation 12 of Embodiment 2.

FIG. 16 is a flowchart illustrating operations of the subject vehicle 1a according to Variation 12 of the present embodiment. The operations in FIG. 16 are similar to operations to be performed when step S5 is deleted and step S31 is added between steps S3 and S4 in the flowchart in FIG. 3. Therefore, the following description mainly focuses on step S31.

In step S31 performed after step S3, the vehicle controller 14a determines whether a predetermined condition is satisfied. According to Variation 12 of the present embodiment, the predetermined condition corresponds to a condition concerning the position of the subject vehicle 1a detected in step S3 and the position of the mobile terminal 2a received in step S2. One example of this condition is that the distance between the subject vehicle 1a detected in step S3 and the mobile terminal 2a received in step S2 is less than or equal to a predetermined threshold value (e.g., 50 m).

When the predetermined condition is satisfied, (e.g., when the distance between the subject vehicle 1a and the mobile terminal 2a is less than or equal to the threshold value), the processing proceeds through step S4 to step S6 onward, and the subject vehicle 1a performs control to transmit the vehicle transmit information to the mobile terminal 2a. On the other hand, when the predetermined condition is not satisfied (e.g. when the distance between the subject vehicle 1a and the mobile terminal 2a is greater than the threshold value), the processing returns to step S2.

With the configuration according to Variation 12 as described above, when the predetermined condition is satisfied, the subject vehicle 1a automatically transmits the vehicle transmit information to the mobile terminal 2a. Therefore, the subject vehicle 1a is capable of transmitting the vehicle transmit information to the mobile terminal 2a at appropriate times.

Note that the predetermined condition is not limited to the condition described above. For example, the predetermined condition may be the condition that the user in the vehicle is able to visually recognize the terminal holder from the actual landscape of the outside of the subject vehicle 1a. Here, the vehicle controller 14a may determine the relationship between the positions of buildings and the user in the vehicle on the basis of 3D map data (not shown) to determine whether the user in the vehicle is able to visually recognize the terminal holder from the actual landscape of the outside of the subject vehicle 1a.

The predetermined condition may also be a condition concerning travel information about the subject vehicle 1a. Examples of the travel information about the subject vehicle 1a include the position of the subject vehicle 1a, the state indicating whether the subject vehicle 1a is running or at a stop, and the autonomous operation state. Hereinafter, several cases each using a combination of some pieces of travel information have been described, but other combinations may also be used.

For example, a configuration is described in which the travel information includes the state indicating whether the subject vehicle 1a is running or at a stop. With this configuration, when it is determined, on the basis of the travel information, that the subject vehicle 1a is at a stop, the vehicle controller 14a may determine that the predetermined condition is satisfied.

For example, a configuration is described in which the travel information includes the position of the subject vehicle 1a and the state indicating whether the subject vehicle 1a is running or at a stop. With this configuration, when it is determined, on the basis of the travel information, that the subject vehicle 1a is at a stop and located at a distance that is less than or equal to the threshold value from the mobile terminal 2a, the vehicle controller 14a may determine that the predetermined condition is satisfied.

For example, a configuration is described in which the travel information includes the position of the subject vehicle 1a and the autonomous operation state. With this configuration, when it is determined, on the basis of the travel information, that the subject vehicle 1a is being autonomously operated and located at a distance that is less than or equal to the threshold value from the mobile terminal 2a, the vehicle controller 14a may determine that the predetermined condition is satisfied.

Variation 13 of Embodiment 2

According to Variation 12 of Embodiment 2, the vehicle communication device 16d performs control to cause the subject vehicle 1a to transmit the vehicle transmit information to the mobile terminal 2a when the predetermined condition is satisfied, but the present embodiment is not limited to this variation. For example, when a predetermined condition other than the acceptance of an operation of transmitting the vehicle transmit information operation is satisfied in step S31 in FIG. 16 according to Variation 12, the vehicle communication device 16d may cause the vehicle display 19a to display information indicating that a specific condition is satisfied. Then, when, after this display, the subject vehicle 1a has accepted an operating of transmitting the vehicle transmit information from the user in the vehicle, the vehicle controller 14a may determine that the predetermined condition is satisfied and may transmit the vehicle transmit information in step S6 onward and perform operations in subsequent steps.

Variation 14 of Embodiment 2

According to Embodiment 2, the subject vehicle 1a and the mobile terminal 2a may share a point of rendezvous of the subject vehicle 1a and the mobile terminal 2a. The rendezvous point may be obtained by the subject vehicle 1a and the mobile terminal 2a, or may be obtained by a rendezvous assistance server, which will be described later.

When a condition concerning the position of the subject vehicle 1a and the rendezvous point is satisfied in step S1 in FIG. 3 according to Embodiment 2, the subject vehicle 1a may transmit a request to transmit the position of the mobile terminal 2a to the mobile terminal 2a. The condition concerning the position of the subject vehicle 1a and the rendezvous point may be a condition that the distance between the subject vehicle 1a and the rendezvous point is less than or equal to a predetermined threshold value (e.g., 1 km), or may be a condition that the expected amount of time until the subject vehicle 1a arrives at the rendezvous point is less or equal to a predetermined amount of time (e.g., 20 minutes).

When the condition concerning the position of the subject vehicle 1a and the rendezvous point is satisfied in step S5 in FIG. 3 according to Embodiment 2, the subject vehicle 1a may transmit the vehicle transmit information in step S6 onward and perform operations in subsequent steps.

Instead of the condition concerning the position of the subject vehicle 1a and the rendezvous point, a condition concerning the position of the mobile terminal 2a and the rendezvous point may be used. That is, when the condition concerning the position of the mobile terminal 2a and the rendezvous point is satisfied in step S5 in FIG. 3 according to Embodiment 2, the subject vehicle 1a may transmit the vehicle transmit information in step S6 onward and perform operations in subsequent steps. The condition concerning the position of the mobile terminal 2a and the rendezvous point may, for example, be a condition that the distance between the mobile terminal 2a and the rendezvous point is less than or equal to a predetermined threshold value (e.g., 500 m), or may be a condition that the expected amount of time until the mobile terminal 2a arrives at the rendezvous point is less than or equal to a predetermined amount of time (e.g., 20 minutes).

Moreover, a display object indicating the rendezvous point may be added to the display in step S4 (displays in FIGS. 4 to 6).

Variation 15 of Embodiment 2

According to Embodiment 2, the second mobile unit 2 is the terminal holder with the mobile terminal 2a, but the second mobile unit 2 may be non-subject vehicle different from the subject vehicle 1a. When the second mobile unit 2 is non-subject vehicle, the other vehicle may include a configuration similar to that of the subject vehicle 1a in FIG. 2, i.e., a configuration obtained by omitting the video input unit 12a and the vehicle image capturing device 16a from the configuration of the subject vehicle 1a, and may perform operations according to the operations illustrated in FIG. 9.

Variation 16 of Embodiment 2

In steps S24 and S25 in FIG. 9 according to Embodiment 2, the mobile terminal 2a determines the position of the terminal holder in the vehicle peripheral image on the basis of the positioning operation made through the vehicle peripheral image, but the present embodiment is not limited to this example. For example, upon receipt of the vehicle transmit information from the subject vehicle 1a, the mobile terminal 2a may perform image recognition on the vehicle peripheral image included in the vehicle transmit information and may automatically determine, on the basis of the result of the image recognition, the position of the terminal holder in the vehicle peripheral image. The image recognition may, for example, be detecting a face image of the terminal holder that is stored in advance from the vehicle peripheral image. This configuration enables the terminal holder to save effort to perform a positioning operation.

Embodiment 3

Figure 17:
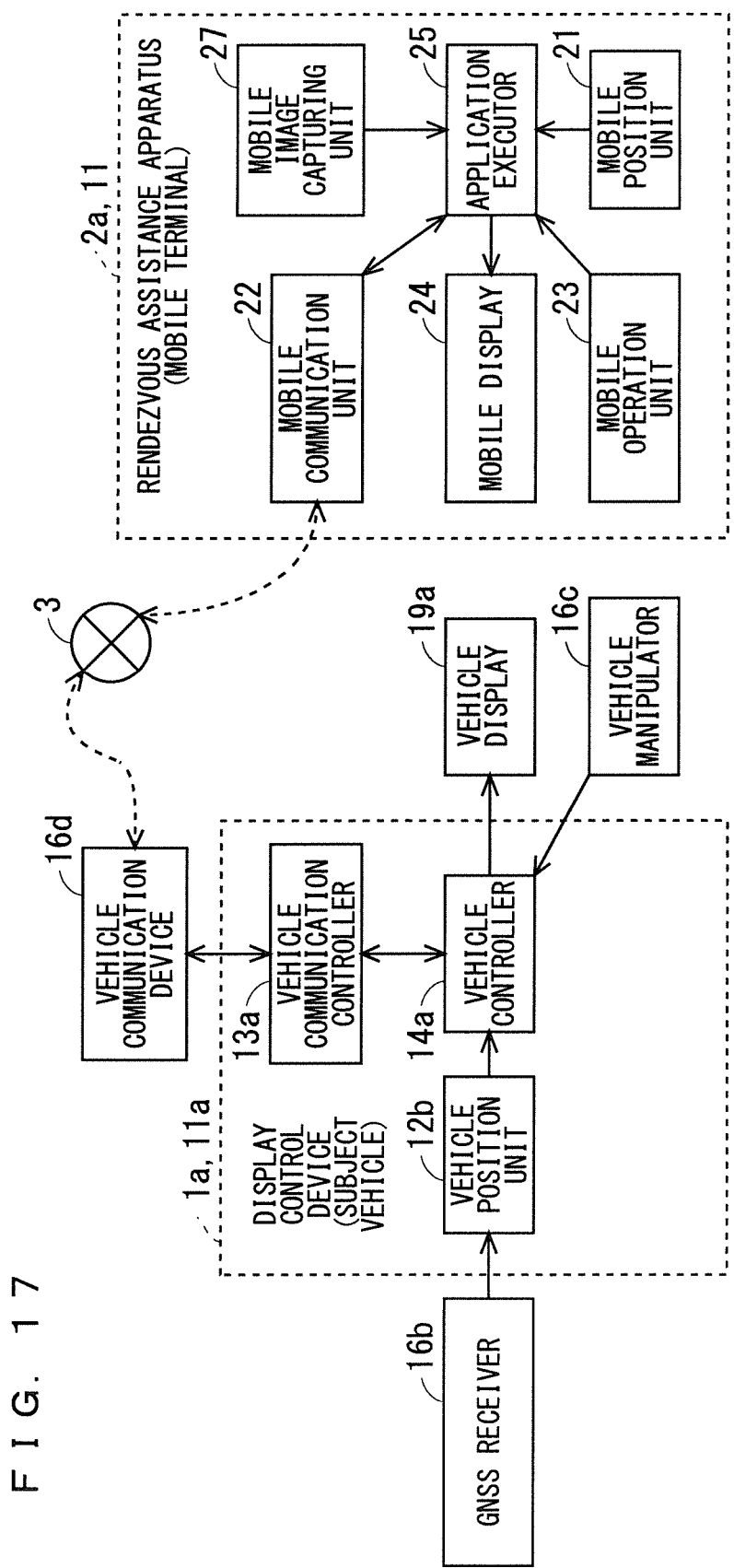
FIG. 17 is a block diagram illustrating a configuration of a rendezvous assistance apparatus according to Embodiment 3.

FIG. 17 is a block diagram illustrating a configuration of a rendezvous assistance apparatus 11 according to Embodiment 3 of the present invention. Among constituent elements according to Embodiment 3 of the present invention, those that are identical or similar to constituent elements described above are hereinafter given identical or similar reference signs, and the following description mainly focuses on different constituent elements.

Although the rendezvous assistance apparatus 11 according to Embodiment 2 is mounted on the subject vehicle 1a, in Embodiment 3 of the present invention, a display control device 11a is mounted on the subject vehicle 1a, and the mobile terminal 2a serves as a rendezvous assistance apparatus. That is, although in Embodiment 2, the first mobile unit 1 is the subject vehicle 1a, and the second mobile unit 2 is the mobile terminal 2a, in Embodiment 3 of the present invention, the first mobile unit 1 is the mobile terminal 2a, and the second mobile unit 2 is the subject vehicle 1a.

Note that an image capturing unit 27 and the mobile position unit 21 in FIG. 17 are included in the concept of the first acquisition unit 12 in FIG. 1, and the mobile communication unit 22 and the application executor 25 in FIG. 17 are respectively included in the concepts of the first communication controller 13 and the first controller 14 in FIG. 1.

The display control device 11a of the subject vehicle 1a according to Embodiment 3 of the present invention is not connected to the vehicle image capturing device 16a among the constituent elements of the subject vehicle 1a described in Embodiment 2. The configuration of the display control device 11a is similar to a configuration obtained by omitting the video input unit 12a from the configuration of the subject vehicle 1a described in Embodiment 2.

The configuration of the mobile terminal 2a, which serves as the rendezvous assistance apparatus according to Embodiment 3 of the present invention, is similar to a configuration obtained by adding the image capturing unit 27 to the configuration of the mobile terminal 2a described in Embodiment 2. The image capturing unit 27 captures a first image of the outside of the mobile terminal 2a. Hereinafter, the first image of the outside of the mobile terminal 2a is referred to as the "terminal peripheral image," first transmit information including the terminal peripheral image is referred to as "terminal transmit information," and first receive information including the position of the subject vehicle 1a in the terminal peripheral image is referred to as "terminal receive information."

The image capturing unit 27, the mobile position unit 21, the mobile communication unit 22, and the application executor 25 according to Embodiment 3 of the present invention respectively perform similar operations to the video input unit 12a, the vehicle position unit 12b, the vehicle communication controller 13a, and the vehicle controller 14a described in Embodiment 2.

Operations

Hereinafter, operations of the mobile terminal 2a (rendezvous assistance apparatus 11) and operations of the subject vehicle 1a (display control device 11a) will be described. It is assumed in the following operations that the mobile terminal 2a has already activated a rendezvous assistance application. Then, the subject vehicle 1a and the terminal holder have already been determined as parties that are to rendezvous with each other through a predetermined procedure, and each of them is capable of recognizing and communicating with the party at the other end.

Operations of Mobile Terminal 2a

Figure 18:
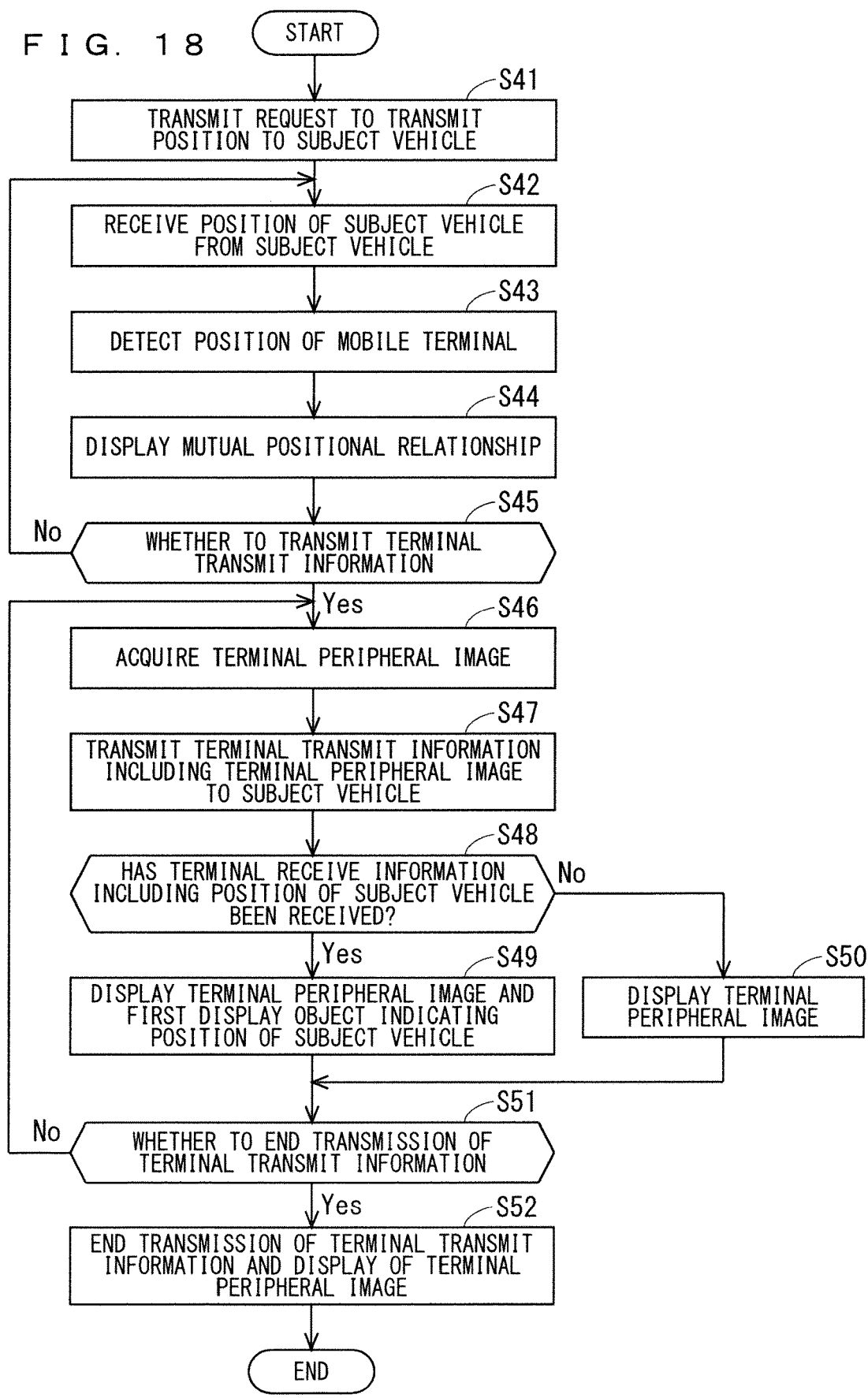
FIG. 18 is a flowchart illustrating operations of the mobile terminal according to Embodiment 3.

FIG. 18 is a flowchart illustrating the operations of the mobile terminal 2a according to Embodiment 3 of the present invention. The operations of the mobile terminal 2a in FIG. 18 are almost the same as the operations of the subject vehicle 1a in FIG. 3 according to Embodiment 2.

First, in step S41, when the mobile operation unit 23 has accepted an operation from the terminal holder, the mobile communication unit 22 transmits a request to transmit the position of the subject vehicle 1a to the subject vehicle 1a. As will be described later, when the vehicle communication device 16d has received the transmission request, the display control device 11a of the subject vehicle 1a transmits the position of the subject vehicle 1a detected by the vehicle position unit 12b from the vehicle communication device 16d to the mobile terminal 2a.

In step S42, the mobile communication unit 22 receives the position of the subject vehicle 1a from the vehicle communication device 16d.

In step S43, the mobile position unit 21 detects the position of the mobile terminal 2a.

In step S44, the application executor 25 performs control to cause the mobile display 24 to display the relationship between the relative positions of the subject vehicle 1a and the mobile terminal 2a, on the basis of the position of the mobile terminal 2a detected by the mobile position unit 21 and the position of the subject vehicle 1a received by the mobile communication unit 22. This provides a display similar to that illustrated in FIGS. 4 to 6. Note that the intervals between the circle scales displayed on the mobile display 24 may be shorter than that intervals between the circle scales displayed in Embodiment 2.

In step S45, the application executor 25 determines whether or not to transmit terminal transmit information that includes the terminal peripheral image. According to Embodiment 3 of the present invention, when the mobile operation unit 23 has accepted an operation of transmitting the terminal transmit information from the terminal holder, the application executor 25 determines to transmit the terminal transmit information, and the processing proceeds to step S46. On the other hand, when the mobile operation unit 23 has not accepted an operation of transmitting the terminal transmit information from the terminal holder, the application executor 25 determines not to transmit the terminal transmit information, and the processing returns to step S42.

Figure 19:
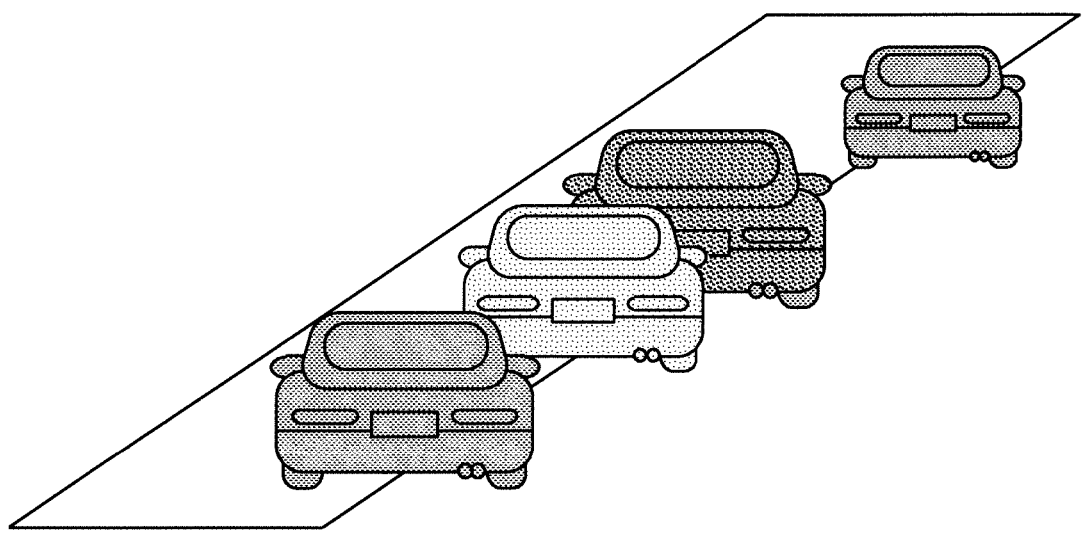
FIG. 19 is a diagram showing one example of a terminal peripheral image according to Embodiment 3.

When the processing proceeds from step S45 to step S46, the image capturing unit 27 captures a terminal peripheral image. FIG. 19 shows one example of the terminal peripheral image. When the terminal peripheral image contains a large number of vehicles as illustrated in FIG. 19, it is difficult for the terminal holder to identify the subject vehicle 1a that is to rendezvous with the terminal holder.

In step S47, the mobile communication unit 22 performs transmission control. Accordingly, the mobile communication unit 22 transmits the terminal transmit information including the terminal peripheral image to the subject vehicle 1a.

Figure 20:
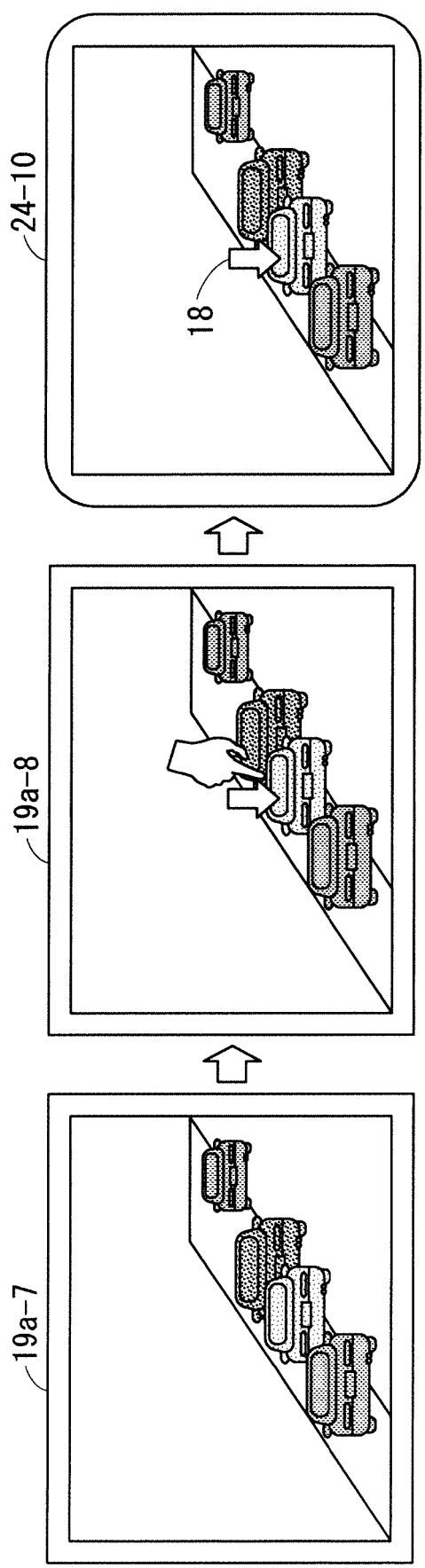
FIG. 20 is a diagram illustrating operations of the rendezvous assistance apparatus according to Embodiment 3.

Although the details of the operations of the subject vehicle 1a will be described later, upon receipt of the terminal transmit information, the subject vehicle 1a displays the terminal peripheral image included in the terminal transmit information on the vehicle display 19a (vehicle display 19a-7 in FIG. 20).

When having accepted a positioning operation made through the terminal peripheral image that is being displayed from the user in the vehicle, the display control device 11a of the subject vehicle 1a determines the position of the subject vehicle 1a in the terminal peripheral image on the basis of the positioning operation. Then, the display control device 11a transmits terminal receive information that includes the determined position of the subject vehicle 1a from the vehicle communication device 16d and displays the terminal receive information on the vehicle display 19a (vehicle display 19a-8 in FIG. 20). The operation in FIG. 20 shows an example in which the position of the subject vehicle 1a in the terminal peripheral image is determined by a touch operation, and a display object indicating an arrow that indicates the position of the subject vehicle 1a is displayed on the vehicle display 19a.

After step S47 in FIG. 18, in step S48, the application executor 25 determines whether the mobile communication unit 22 has performed reception control. That is, the application executor 25 determines whether the mobile communication unit 22 has received the terminal receive information including the position of the subject vehicle 1a in the terminal peripheral image from the vehicle communication device 16d. When it is determined that the terminal receive information has been received, the processing proceeds to step S49, and when it is determined that the terminal receive information has not been received, the processing proceeds to step S50.

In step S49, the application executor 25 performs control to cause the mobile display 24 to display a first display object that indicates the position of the subject vehicle 1a accompanied with the terminal peripheral image displayed on the mobile display 24, on the basis of the terminal receive information. The operation at this time is displayed on the mobile display 24-10 in FIG. 20, and the first display object 18 indicating an arrow that indicates the position of the subject vehicle 1a is displayed. After that, the processing proceeds to step S51.

In step S50, the application executor 25 performs control to cause the mobile display 24 to display the terminal peripheral image. After that, the processing proceeds to step S51.

In step S51, the application executor 25 determines whether or not to end the transmission of the terminal transmit information. According to Embodiment 3 of the present invention, when the mobile operation unit 23 has accepted an operation of ending the transmission of the terminal transmit information from the terminal holder, it is determined to end the transmission of the terminal transmit information, and the processing proceeds to step S52. On the other hand, when the mobile operation unit 23 has not accepted an operation of ending the transmission of the terminal transmit information from the terminal holder, it is determined not to end the transmission of the terminal transmit information, and the processing returns to step S46.

In step S52, the application executor 25 ends the transmission of the terminal transmit information, and ends the display of the terminal peripheral image on the mobile display 2. After that, the operations in FIG. 18 end.

Operations of Subject Vehicle 1a

Figure 21:
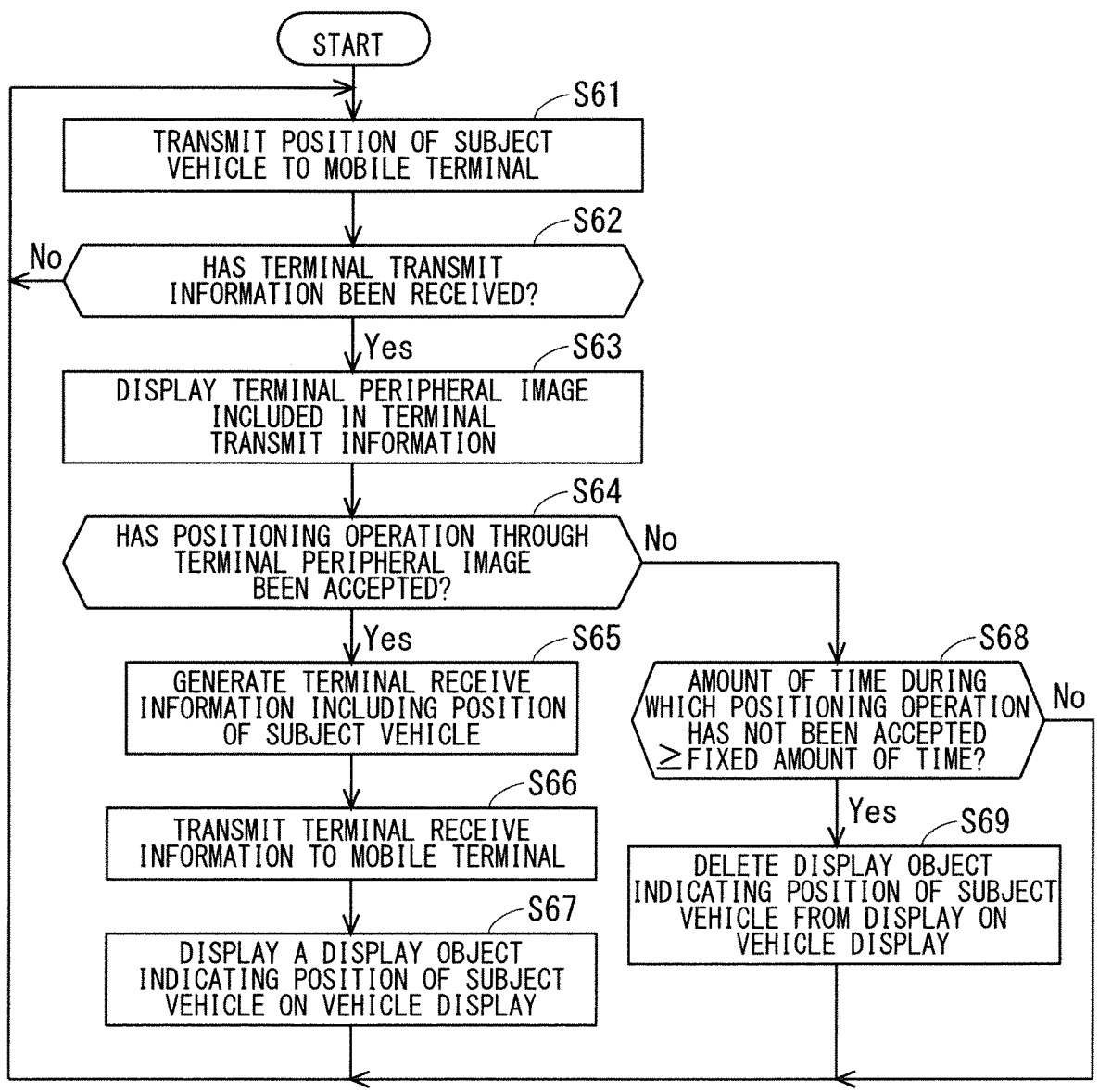
FIG. 21 is a flowchart illustrating operations of subject vehicle according to Embodiment 3.

FIG. 21 is a flowchart illustrating operations of the subject vehicle 1a according to Embodiment 3 of the present invention. The operations of the subject vehicle 1a in FIG. 21 are almost the same as the operations of the mobile terminal 2a in FIG. 9 according to Embodiment 2. These operations may be performed, for example, when the vehicle communication device 16d has received a transmission request transmitted in step S41 in FIG. 18.

First, in step S61, the vehicle communication device 16d transmits the position of the subject vehicle 1a detected by the vehicle position unit 12b to the mobile terminal 2a that has transmitted the transmission request.

In step S62, the vehicle controller 14a determines whether the vehicle communication device 16d has received the terminal transmit information including the terminal peripheral image. When it is determined that the terminal transmit information has been received, the processing proceeds to step S63, and when it is determined that the terminal transmit information has not been received, the processing returns to step S61.

In step S63, the vehicle controller 14a performs control to cause the vehicle display 19a to display the terminal peripheral image included in the terminal transmit information. This provides a display as shown on the vehicle display 19a-7 in FIG. 20.

In step S64, the vehicle controller 14a determines whether the vehicle manipulator 16c has accepted a positioning operation made through the terminal peripheral image. When it is determined that the positioning operation has been accepted, the processing proceeds to step S65, and when it is determined that the positioning operation has not been accepted, the processing proceeds to step S68.

In step S65, the vehicle controller 14a determines the position of the subject vehicle 1a in the terminal peripheral image on the basis of the positioning operation and generates the terminal receive information including the position of the subject vehicle 1a.

In step S66, the vehicle communication device 16d transmits the terminal receive information generated by the vehicle controller 14a to the mobile terminal 2a.

In step S67, the vehicle controller 14a performs control to cause the vehicle display 19a to display a display object indicating the position of the subject vehicle 1a, on the basis of the positioning operation of the terminal receive information. This provides a display as shown on the vehicle display 19a-8 in FIG. 20. After that, the processing returns to step S61.

In step S68, the vehicle controller 14a determines whether the amount of time during which the vehicle manipulator 16c has not accepted a positioning operation made through the terminal peripheral image is greater than or equal to a fixed amount of time. When it is determined that this amount of time is greater than or equal to the fixed amount of time, the processing proceeds to step S69, and when it is determined that the amount of time is less than the fixed amount of time, the processing returns to step S61. Accordingly, when the display object has already been displayed on the vehicle display 19a and the amount of time during which the positioning operation has not been accepted is less than the fixed period of time (e.g. five seconds), the display object continues to be displayed.

In step S69, the vehicle controller 14a deletes the display object indicating the position of the subject vehicle 1a from the display on the vehicle display 19a. After that, the processing returns to step S61.

Summary of Embodiment 3

The rendezvous assistance apparatus 11 according to Embodiment 3 of the present invention as described above displays the first display object 18 indicating the position of the subject vehicle 1a accompanied with the terminal peripheral image. With this configuration, the position of the subject vehicle 1a is indicated in the image that can be seen by the terminal holder, and therefore the terminal holder is able to easily identify the subject vehicle 1a. That is, the mobile terminal 2a is capable of providing an appropriate display that enables easy identification of the subject vehicle 1a.

Variation of Embodiment 3

According to Embodiment 3, the second mobile unit 2 is the subject vehicle 1a, but the second mobile unit 2 may be another terminal different from the mobile terminal 2a. When the second mobile unit 2 is another mobile terminal, this different mobile terminal may have a configuration similar to the configuration of the mobile terminal 2a in FIG. 2 and may perform operations according to the operations in FIG. 21.

Embodiment 4

Figure 22:
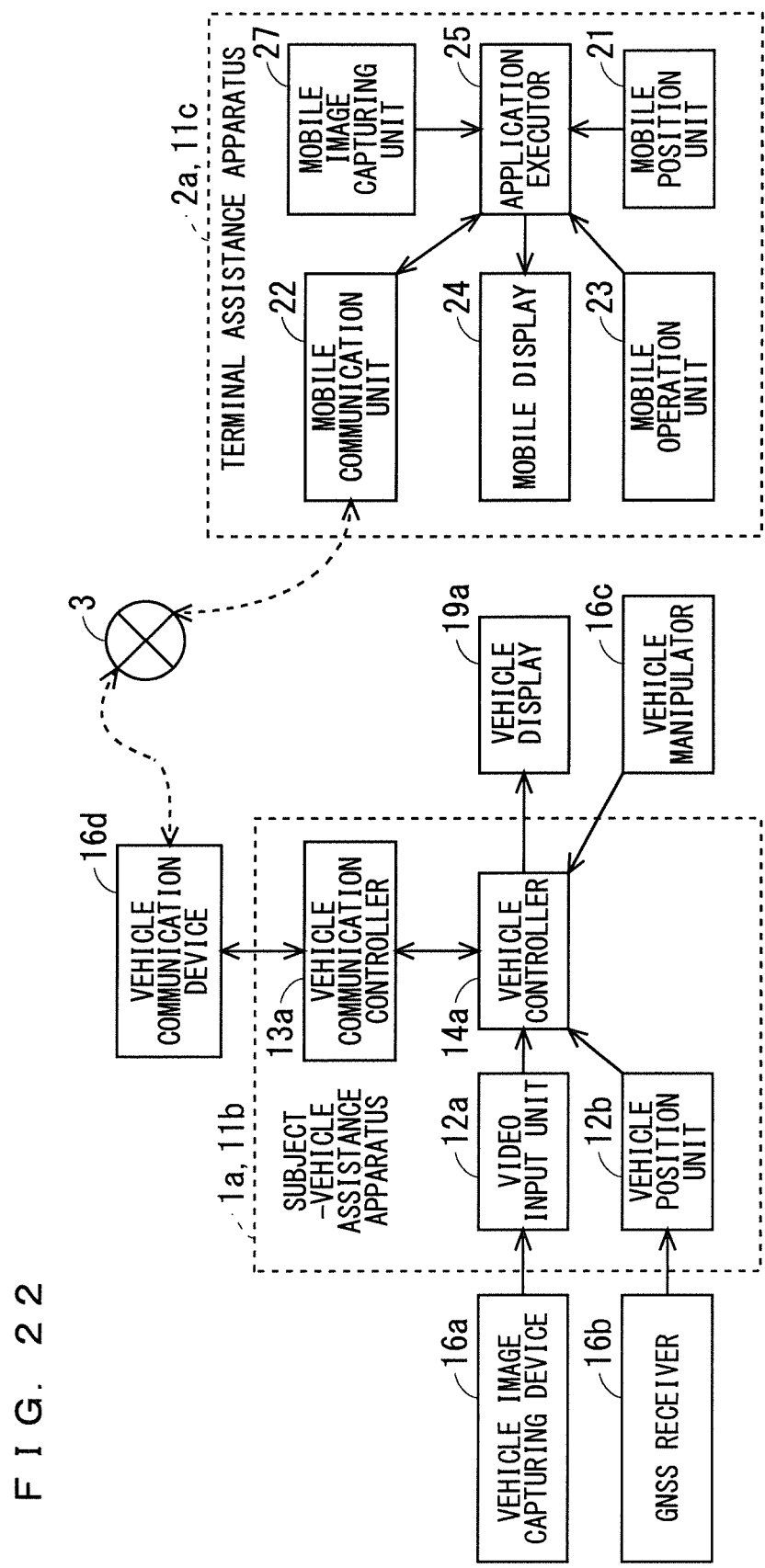
FIG. 22 is a block diagram illustrating a configuration of a rendezvous assistance apparatus according to Embodiment 4.

FIG. 22 is a block diagram illustrating a configuration of a rendezvous assistance apparatus according to Embodiment 4 of the present invention. Among constituent elements according to Embodiment 4 of the present invention, those that are identical or similar to constituent elements described above are hereinafter given identical or similar reference signs, and the following description focuses mainly on different constituent elements.

The rendezvous assistance apparatus according to Embodiment 4 of the present invention substantially corresponds to a rendezvous assistance system and includes the rendezvous assistance apparatus 11 of the subject vehicle 1a described in Embodiment 2 (hereinafter, also referred to as the "subject-vehicle assistance apparatus 11b") and the rendezvous assistance apparatus 11 of the mobile terminal 2a described in Embodiment 3 (hereinafter, also referred to as the "terminal assistance apparatus 11c"). Note that each of the subject-vehicle assistance apparatus 11b and the terminal assistance apparatus 11c includes constituent elements that are included in the concepts of the first acquisition unit 12, the first communication controller 13, and the first controller 14, which are illustrated in FIG. 1.

A first acquisition unit, a first communication controller, a first controller, a first image, first transmit information, first receive information, and a first display object of one of the subject-vehicle assistance apparatus 11b and the terminal assistance apparatus 11c are respectively interchangeable with a second acquisition unit, a second communication controller, a second controller, a second image, second transmit information, second receive information, and a second display object. In the following description, the first acquisition unit, the first communication controller, the first controller, the first image, the first transmit information, the first receive information, and the first display object of the terminal assistance apparatus 11c are respectively interchanged with the second acquisition unit, the second communication controller, the second controller, the second image, the second transmit information, and the second receive information.

The subject-vehicle assistance apparatus 11b performs not only operations similar to the operations of the rendezvous assistance apparatus 11 described in Embodiment 2, but also operations similar to the operations of the display control device 11a described in Embodiment 3. The terminal assistance apparatus 11c performs not only operations similar to the operations of the rendezvous assistance apparatus 11 described in Embodiment 3, but also operations similar to the operations of the mobile terminal 2a described in Embodiment 2.

Figure 23:
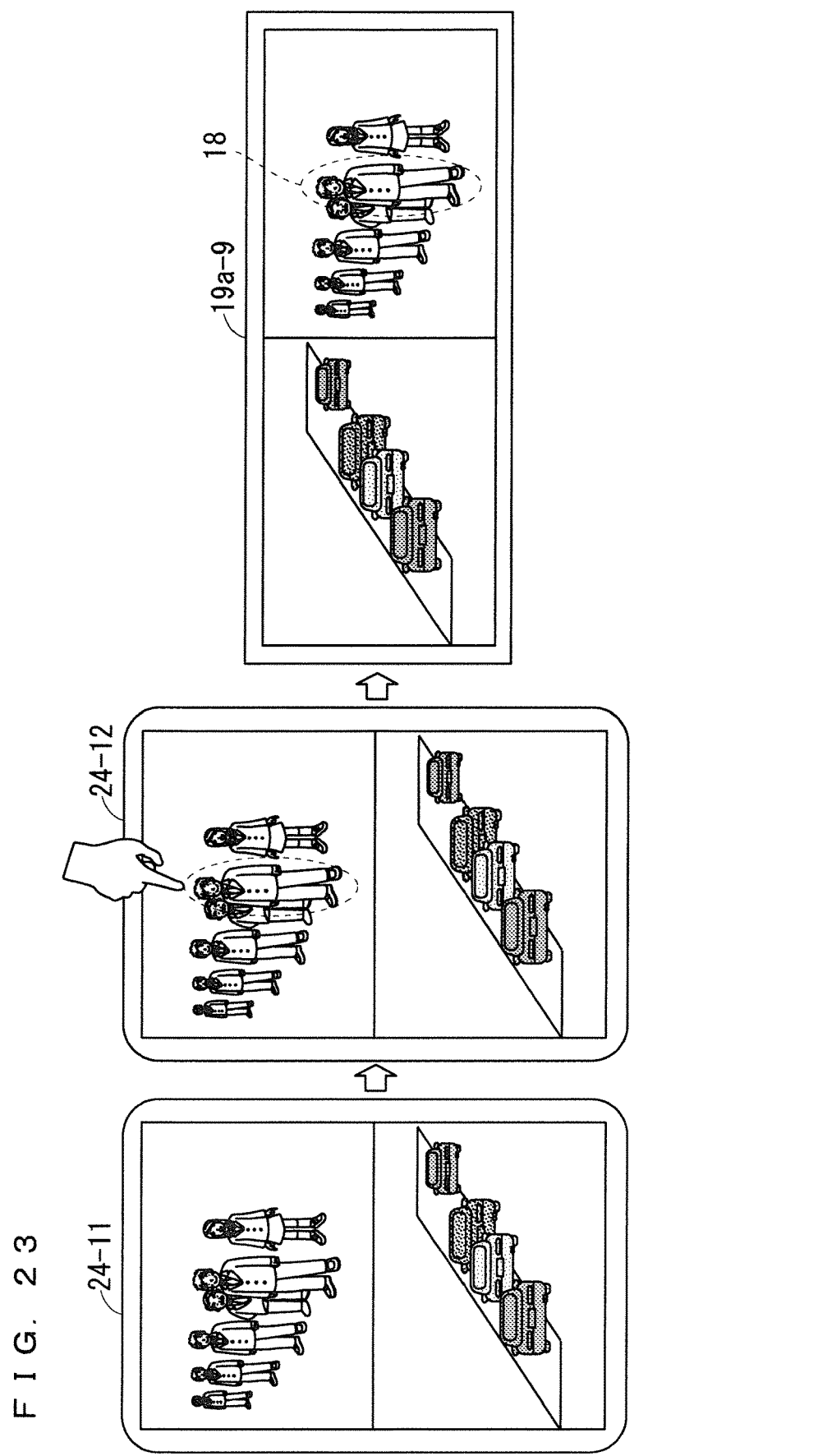
FIG. 23 is a diagram illustrating operations of the rendezvous assistance apparatus according to Embodiment 4.
Figure 24:
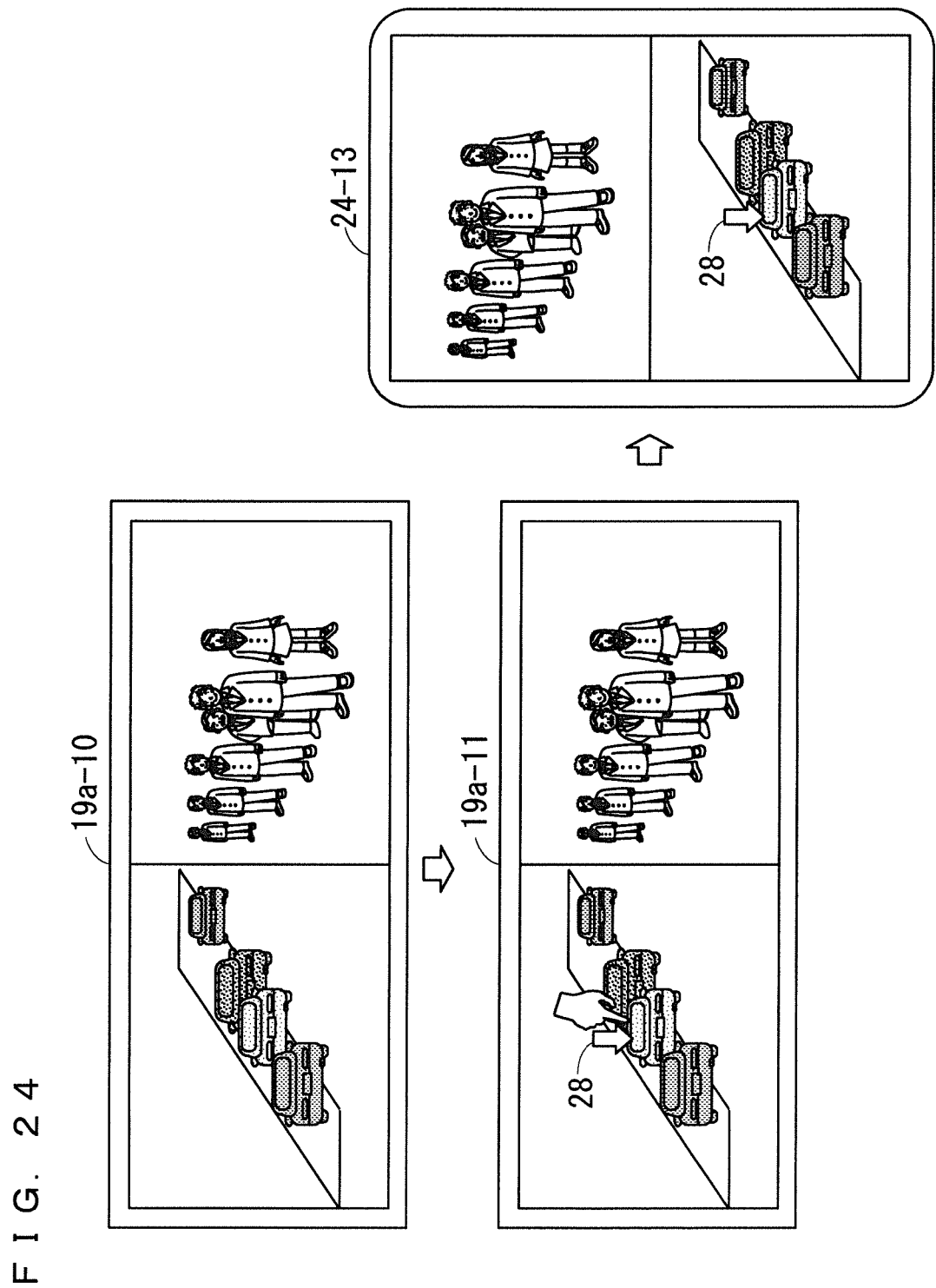
FIG. 24 is a diagram illustrating the operations of the rendezvous assistance apparatus according to Embodiment 4.

According to Embodiment 4 of the present invention, the operations described in Embodiment 2 with reference to FIGS. 3 and 9 and the operations described in Embodiment 3 with reference to FIGS. 18 and 21 are performed independently of each other. FIGS. 23 and 24 are diagrams illustrating the operations of the subject-vehicle assistance apparatus 11b and the terminal assistance apparatus 11c according to Embodiment 4 of the present invention.

As shown on the mobile display 24-11 in FIG. 23, the vehicle peripheral image is displayed on the upper side of the mobile display 24, and the terminal peripheral image is displayed on the lower side of the mobile display 24. Similarly, as shown on the vehicle display 19a-10 in FIG. 24, the vehicle peripheral image is displayed on the right side of the vehicle display 19a, and the terminal peripheral image is displayed on the left side of the vehicle display 19a.

When a positioning operation has been made through the vehicle peripheral image displayed on the mobile display 24 as shown on the mobile display 24-12 in FIG. 23, display objects are displayed on the mobile display 24. In this case, the subject vehicle 1a and the mobile terminal 2a communicate with each other, so that a first display object 18 is displayed in the vehicle peripheral image on the vehicle display 19a as shown on the vehicle display 19a-9 in FIG. 23.

When a positioning operation has been made through the terminal peripheral image on the vehicle display 19a as shown on the vehicle display 19a-11 in FIG. 24, display objects are displayed on the vehicle display 19a. In this case, the subject vehicle 1a and the mobile terminal 2a communicate with each other, so that a second display object 28 is displayed in the terminal peripheral image on the mobile display 24 as shown on the mobile display 24-13 in FIG. 24.

When the positioning operation through the vehicle peripheral image on the mobile display 24 and the positioning operation through the terminal peripheral image on the vehicle display 19a have been made almost at the same time, the first display object 18 and the second display object 28 are displayed almost at the same time.

Summary of Embodiment 4

In the rendezvous assistance apparatus (the subject-vehicle assistance apparatus 11b and the terminal assistance apparatus 11c) according to Embodiment 4 of the present invention as described above, the first display object 18 is displayed on the vehicle display 19a, and the second display object 28 is displayed on the mobile display 24. This configuration enables the user in the vehicle to easily identify the terminal holder and enables the terminal holder to easily identify the subject vehicle 1a.

Variation 1 of Embodiment 4

According to Embodiment 4, the vehicle peripheral image and the terminal peripheral image are both displayed on the vehicle display 19a and the mobile display 24, but the present embodiment is not limited to this example. For example, the subject-vehicle assistance apparatus 11b and the terminal assistance apparatus 11c may communicate with each other to determine one of the vehicle peripheral image and the terminal peripheral image and causes only the determined one of the vehicle peripheral image and the terminal peripheral image to be displayed on the vehicle display 19a and the mobile display 24.

As another alternative, for example, when the vehicle peripheral image has been transmitted earlier than the terminal peripheral image, only the vehicle peripheral image may be displayed on the vehicle display 19a and the mobile display 24. When the terminal peripheral image has been transmitted earlier than the vehicle peripheral image, only the terminal peripheral image may be displayed on the vehicle display 19a and the mobile display 24.

Variation 2 of Embodiment 4

According to Embodiment 4, both of the vehicle peripheral image and the terminal peripheral image are displayed on fixed ranges of the vehicle display 19a and the mobile display 24, but the present embodiment is not limited to this example. For example, when the vehicle peripheral image is transmitted earlier than the terminal peripheral image, the vehicle peripheral image may be displayed on a larger range than the terminal peripheral image. When the terminal peripheral image has been transmitted earlier than the vehicle peripheral image, the terminal peripheral image may be displayed on a larger range than the vehicle peripheral image.

For example, each of the ranges of the vehicle display 19a and the mobile display 24 on which the vehicle peripheral image and the terminal peripheral image are to be displayed may be changed by an operation from the user in the vehicle or from the terminal holder.

Embodiment 5

Figure 25:
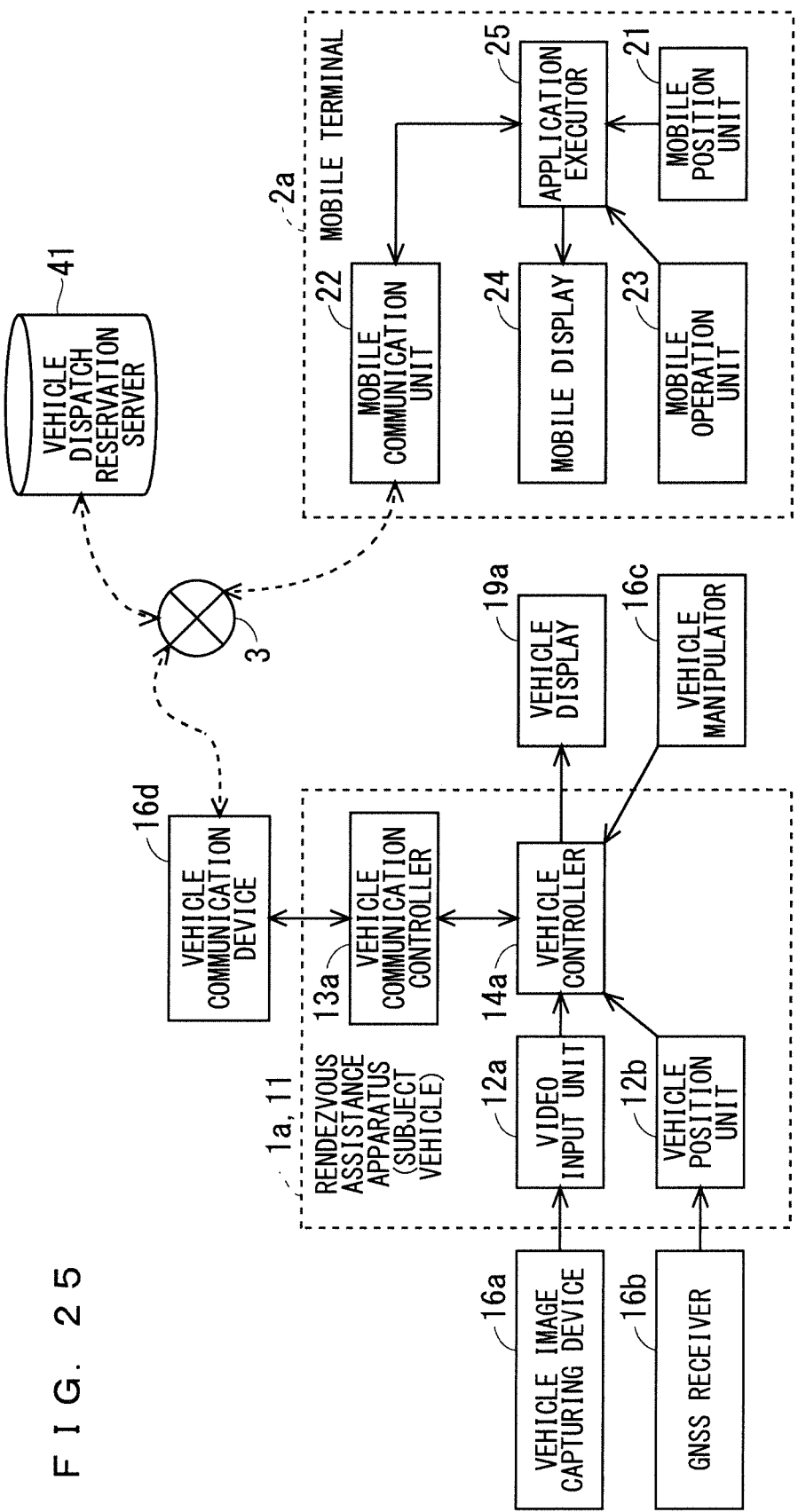
FIG. 25 is a block diagram illustrating a configuration of a rendezvous assistance apparatus according to Embodiment 5.

FIG. 25 is a block diagram illustrating a configuration of a rendezvous assistance apparatus according to Embodiment 5 of the present invention. Among constituent elements according to Embodiment 5 of the present invention, those that are identical or similar to constituent elements described above are hereinafter given identical or similar reference signs, and the following description mainly focuses on different constituent elements.

The rendezvous assistance apparatus according to Embodiment 5 substantially corresponds to a rendezvous assistance system and has a configuration similar to that obtained by adding a vehicle dispatch reservation server 41 serving as a rendezvous assistance server to the configuration described in Embodiment 2.

The vehicle dispatch reservation server 41 is capable of communication with the subject vehicle 1a and the mobile terminal 2a and assists a rendezvous of the subject vehicle 1a and the terminal holder carrying the mobile terminal 2a on the basis of information received from the subject vehicle 1a and information received from the terminal holder and the mobile terminal 2a.

Operations

Figure 26:
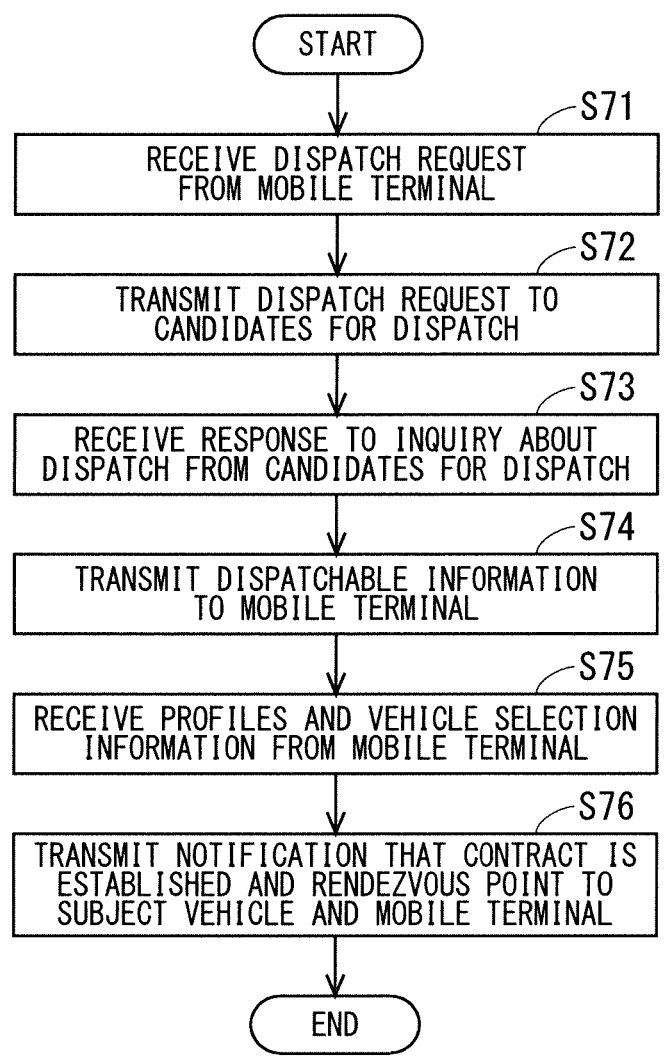
FIG. 26 is a flowchart illustrating operations of a vehicle dispatch reservation server according to Embodiment 5.

FIG. 26 is a flowchart illustrating operations of the vehicle dispatch reservation server 41.

First, in step S71, the vehicle dispatch reservation server 41 receives a dispatch request from the mobile terminal 2a. The dispatch request includes a rendezvous point requested by the terminal holder. Note that the dispatch request may further include the vehicle type requested by the terminal holder.

In step S72, the vehicle dispatch reservation server 41 transmits the dispatch request including the rendezvous point to candidates for dispatch registered in advance, in response to the dispatch request.

In step S73, the vehicle dispatch reservation server 41 receives a response to an inquiry of whether it is possible to dispatch any candidate for dispatch.

In step S74, the vehicle dispatch reservation server 41 transmits dispatchable information to the mobile terminal 2a, the dispatchable information indicating dispatchable candidates for dispatch as a response to the inquiry of whether it is possible to dispatch any candidate for dispatch. For example, the dispatchable information includes a list of expected arrival times and the profiles of dispatchable candidates for dispatch as a response to the inquiry of whether it is possible to dispatch any candidate for dispatch.

In step S75, the vehicle dispatch reservation server 41 receives, from the mobile terminal 2a, the profile of the terminal holder and vehicle selection information that indicates the vehicle selected from among the candidates for dispatch by the mobile terminal 2a.

In step S76, the vehicle dispatch reservation server 41 determines the vehicle indicated by the vehicle selection information as the subject vehicle 1a described thus far and transmits a notification that the contract is established, the rendezvous point, and the profile of the terminal holder to the subject vehicle 1a. The vehicle dispatch reservation server 41 also transmits the notification that the contract is established and the rendezvous point to the mobile terminal 2a.

Summary of Embodiment 5

The rendezvous assistance apparatus according to Embodiment 5 of the present invention as described above makes a vehicle dispatch reservation for the vehicle serving as the subject vehicle 1a. Thus, it is possible for the terminal holder to determine the subject vehicle 1a capable to rendezvous.

Variation 1 of Embodiment 5

According to Embodiment 5, the vehicle dispatch reservation server is added to the configuration described in Embodiment 2, but the vehicle dispatch reservation server may be added to the configuration described in Embodiment 3 or to the configuration described in Embodiment 4.

Variation 2 of Embodiment 5

According to Embodiment 5, the vehicle dispatch reservation server 41 receives a dispatch request including the rendezvous point in step S71 and transmits the dispatch request to candidates for dispatch in step S72, but the present embodiment is not limited to this example. For example, upon receipt of a dispatch request including the position of the mobile terminal 2a in step S71, the vehicle dispatch reservation server 41 may transmit this dispatch request to candidates for dispatch in step S72. Then, the vehicle dispatch reservation server 41 may obtain a rendezvous point on the basis of the positions of the received candidates for dispatch and the position of the mobile terminal 2a.

When a predetermined condition is satisfied, the vehicle dispatch reservation server 41 may transmit the position of either the candidates for dispatch or the mobile terminal 2a to the other of the candidates for dispatch and the mobile terminal 2a. Similarly, when a predetermined condition is satisfied, the vehicle dispatch reservation server 41 may transmit information such as the vehicle transmit information including the vehicle peripheral image in step S7 in FIG. 3 and the terminal transmit information including the terminal peripheral image in step S47 in FIG. 18. Examples of the predetermined condition as used herein include conditions concerning the time of rendezvous, the position of the vehicle, the position of the terminal, and the rendezvous point.

In the operations in FIG. 26 according to Embodiment 5, starting from the transmission of a dispatch request from the mobile terminal 2a to the vehicle dispatch reservation server 41, the subject vehicle 1a that is to rendezvous with the terminal holder of the mobile terminal 2a is determined, but the present embodiment is not limited to this example. For example, the mobile terminal 2a and the subject vehicle 1a may be interchanged in the operations in FIG. 26. That is, starting from the transmission of a request to allocate the terminal holder from the subject vehicle 1a to the vehicle dispatch reservation server 41, the terminal holder who is to rendezvous with the subject vehicle 1a may be determined.

Embodiment 6

Figure 27:
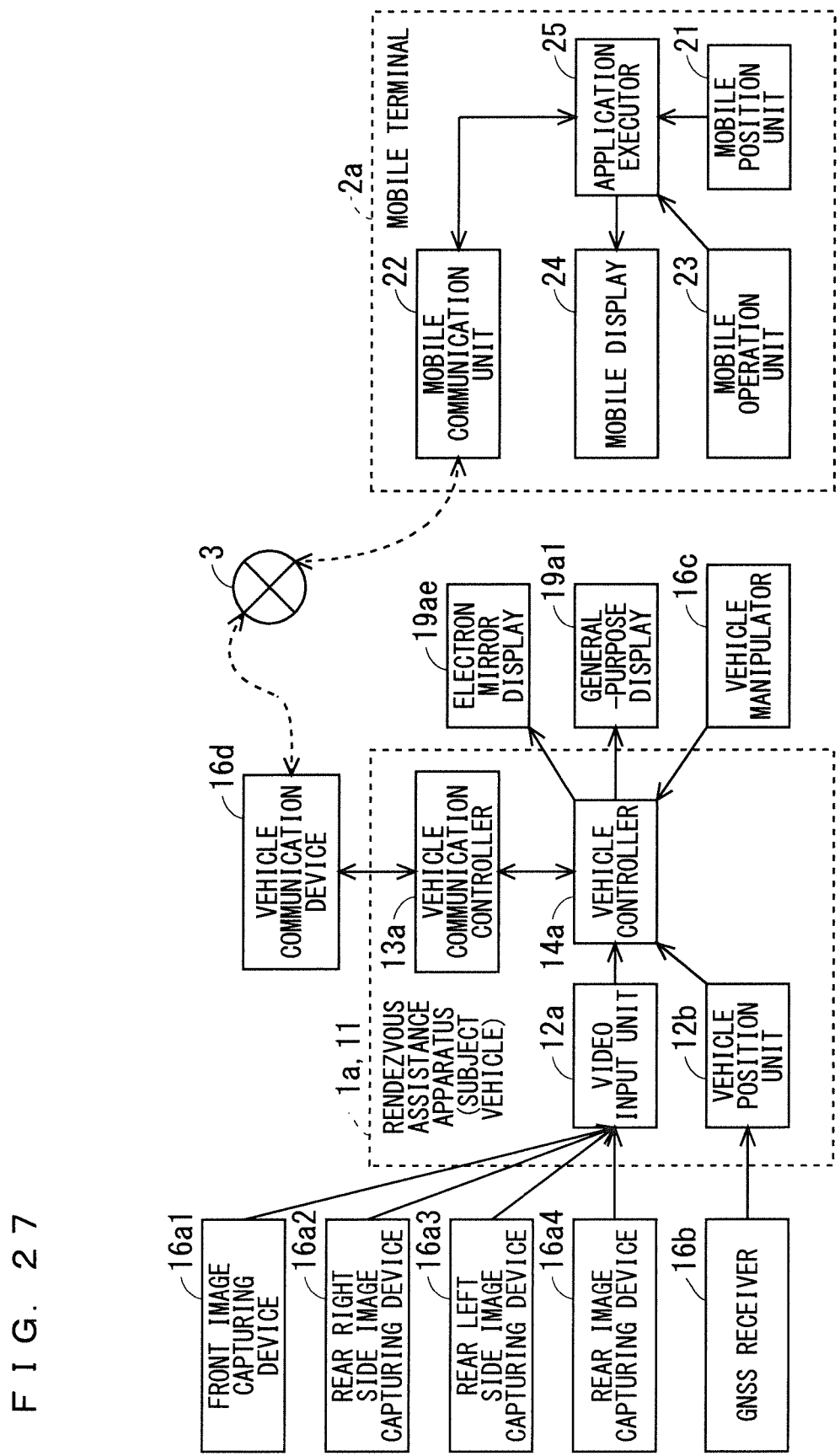
FIG. 27 is a block diagram illustrating a configuration of a rendezvous assistance apparatus according to Embodiment 6.

FIG. 27 is a block diagram illustrating a configuration of a rendezvous assistance apparatus according to Embodiment 6 of the present invention. Among constituent elements according to Embodiment 6, those that are identical or similar to constituent elements described above are hereinafter given identical or similar reference signs, and the following description focuses mainly on different constituent elements.

One or more image capturing devices (a front image capturing device 16a1, a rear right side image capturing device 16a2, a rear left side image capturing device 16a3, and a rear image capturing device 16a4) of the rendezvous assistance apparatus 11 according to Embodiment 6 correspond to the vehicle image capturing device 16a of the rendezvous assistance apparatus according to Embodiment 2 (FIG. 2). A general-purpose display 19a1 and an electron mirror display 19ae of the rendezvous assistance apparatus 11 according to Embodiment 6 correspond to the vehicle display 19a of the rendezvous assistance apparatus according to Embodiment 2 (FIG. 2).

Figure 28:
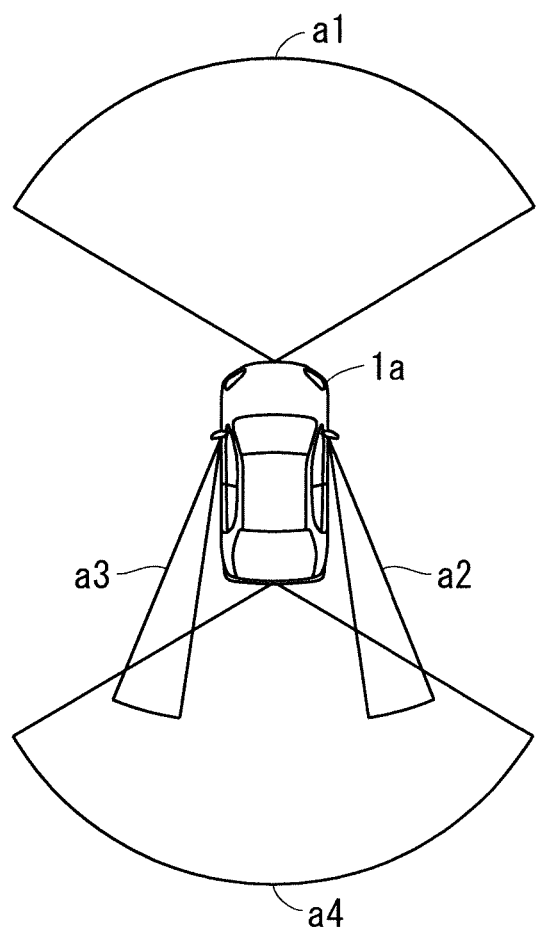
FIG. 28 is a diagram illustrating an image capturing region of the rendezvous assistance apparatus according to Embodiment 6.

FIG. 28 is a diagram illustrating image capturing regions of the front image capturing device 16a1, the rear right side image capturing device 16a2, the rear left side image capturing device 16a3, and the rear image capturing device 16a4. The front image capturing device 16a1 captures a front image that is an image within an image capturing region a1. The rear right side image capturing device 16a2 captures a rear right side image that is an image within an image capturing region a2. The rear left side image capturing device 16a3 captures a rear left side image that is an image within an image capturing region a3. The rear image capturing device 16a4 captures a rear image that is an image within an image capturing region a4. Note that the rear right side image capturing device 16a2 is arranged at a position similar to a position of the ordinary right side door mirror, and the rear left side image capturing device 16a3 is arranged at a position similar to a position of the ordinary left side door mirror.

In the following description, images that are captured by a plurality of image capturing devices each having a different direction of image capture, such as a front image, a rear right side image, a rear left side image, and a rear image, may be collectively referred to as "multi-directional images." According to Embodiment 6 of the present invention, such multi-directional images are used as vehicle peripheral images described above.

Figure 29:
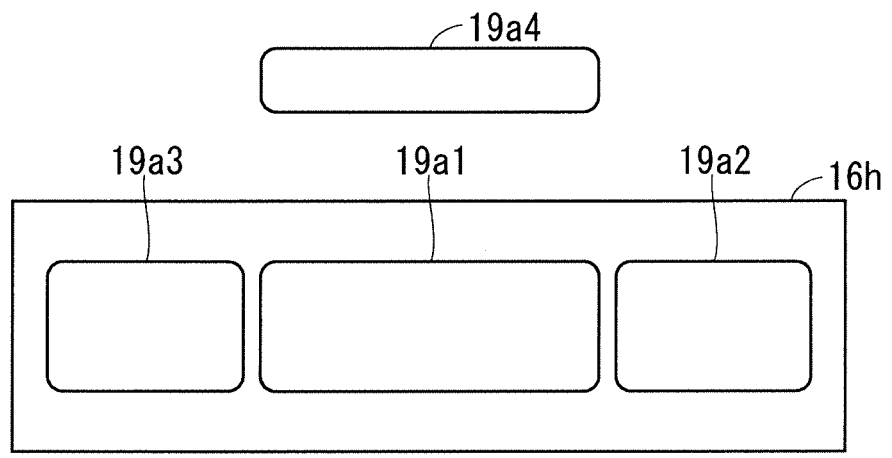
FIG. 29 is a diagram showing an example of arrangement of the rendezvous assistance apparatus according to Embodiment 6.

FIG. 29 is a diagram showing an example of arrangement of the general-purpose display 19a1 and the electron mirror display 19ae in the interior of the subject vehicle 1a. The electron mirror display 19ae in FIG. 27 includes a rear right side display 19a2, a rear left side display 19a3, and a rear display 19a4, which are illustrated in FIG. 29.

The general-purpose display 19a1 is arranged in the center of an instrument panel 16h and displays a front image captured by the front image capturing device 16a1. The rear right side display 19a2 is arranged on the right side of the instrument panel 16h and displays a rear right side image captured by the rear right side image capturing device 16a2 while inverting the rear right side image from side to side. The rear left side display 19a3 is arranged on the left side of the instrument panel 16h and displays a rear left side image captured by the rear left side image capturing device 16a3 while inverting the rear left side image from side to side. The configuration described above achieves the function of a so-called electron mirror because the rear right side display 19a2 and the rear left side display 19a3 display images similar to those seen on the ordinary door mirrors. The rear display 19a4 is arranged at a position similar to a position of the ordinary rearview mirror of the subject vehicle 1a and displays a rear image captured by the rear image capturing device 16a4 while inverting the rear image from side to side. The configuration described above achieves the function of a so-called electron mirror because the rear display 19a4 displays an image similar to the image seen in the ordinary rearview mirror.

Note that FIG. 29 shows only one example of the arrangement of a plurality of displays, and the arrangement of a plurality of displays is not limited to this example. For example, a single oblong display may be arranged, instead of a plurality of displays.

Operations

Figure 30:
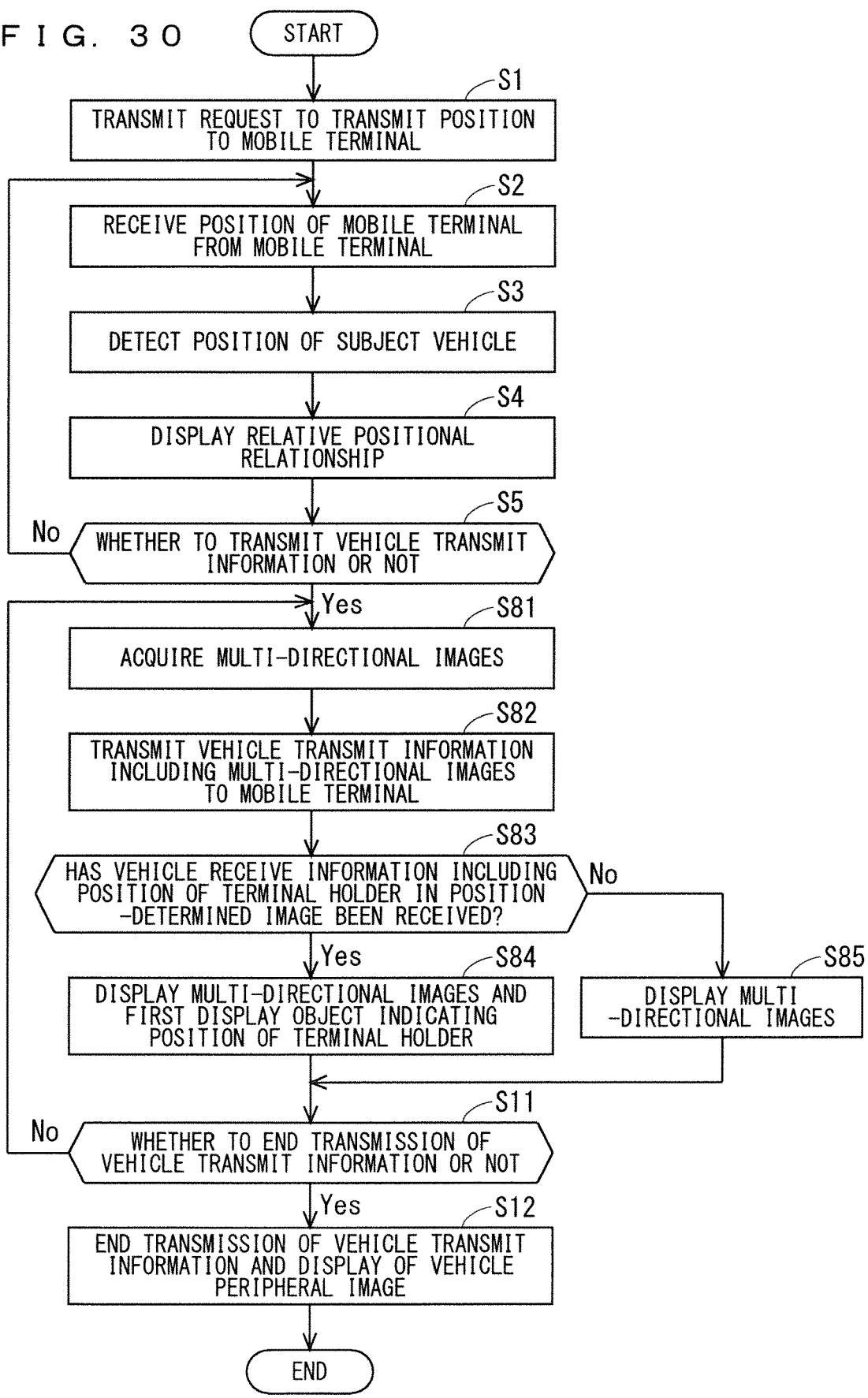
FIG. 30 is a flowchart illustrating operations of subject vehicle according to Embodiment 6.

FIG. 30 is a flowchart illustrating operations of the subject vehicle 1a according to Embodiment 6. The operations in FIG. 30 are similar to the operations in the flowchart in FIG. 3, except that steps S6 to S10 are replaced with steps S81 to S85. Therefore, the following description focuses mainly on steps S81 to S85. Operations of the mobile terminal 2a according to Embodiment 6 are almost the same as the operations in FIG. 9, and therefore detailed descriptions thereof shall be omitted.

When the processing proceeds from step S5 to step S81, the front image capturing device 16a1, the rear right side image capturing device 16a2, the rear left side image capturing device 16a3, and the rear image capturing device 16a4 capture multi-directional images, and the video input unit 12a acquires the multi-directional images captured by the vehicle image capturing device 16a.

In step S82, the vehicle communication controller 13a performs transmission control. That is, the vehicle communication device 16d transmits vehicle transmit information including the multi-directional images (vehicle peripheral images) to the mobile terminal 2a.

Upon receipt of the vehicle transmit information, the mobile terminal 2a displays the multi-directional images included in the vehicle transmit information on the mobile display 24. When having accepted a positioning operation made through the multi-directional images that are being displayed from the terminal holder, the mobile terminal 2a determines the position of the terminal holder in one of the multi-directional images on the basis of the positioning operation. The mobile terminal 2a transmits vehicle receive information including the determined position of the terminal holder from the mobile communication unit 22 and displays the vehicle receive information on the mobile display 24.

In the following description, the image in which the position of the terminal holder has been determined, among the multi-directional images, may also be referred to as the "position-determined image."

In step S83, the vehicle controller 14a determines whether the vehicle communication controller 13a has performed reception control. That is, the vehicle controller 14a determines whether the vehicle communication device 16d has received, from the mobile terminal 2a, the vehicle receive information including the position of the terminal holder in the position-determined image (vehicle peripheral image) from the mobile terminal 2a. When it is determined that the vehicle receive information has been received, the processing proceeds to step S84, and when it is determined that the vehicle receive information has not been received, the processing proceeds to step S85.

In step S84, the vehicle controller 14a performs control to cause one of the general-purpose display 19a1 and the electron mirror display 19ae to display a first display object that indicates the position of the terminal holder accompanied with the position-determined image, on the basis of the vehicle receive information. The vehicle controller 14a also performs control to cause the other one of the general-purpose display 19a1 and the electron mirror display 19ae to display the multi-directional images other than the position-determined image. After that, the processing proceeds to step S11.

In step S85, the vehicle controller 14a performs control to cause the general-purpose display 19a1 and the electron mirror display 19ae to display the multi-directional images. The multi-directional images displayed at this time may be the same as the multi-directional images transmitted in step S82, or may be multi-directional images captured after step S82. After that, the processing proceeds to step S11.

Summary of Embodiment 6

The rendezvous assistance apparatus 11 according to Embodiment 6 of the present invention as described above uses images captured in a plurality of directions as vehicle peripheral images. This configuration reduces the likelihood that the terminal holder is not seen in the vehicle peripheral images.

Variation 1 of Embodiment 6

According to Embodiment 6, the general-purpose display 19a1 and the electron mirror display 19ae are displays that display various types of information such as display objects on the display screen, but the present embodiment is not limited to this example. For example, as in Variation 9 of Embodiment 2, the general-purpose display 19a1 and the electron mirror display 19ae may be HUDs, or may be transmission liquid crystal displays for use in windows of the subject vehicle 1a. Then, a display object such as the first display object may be displayed not only on the windshield of the subject vehicle 1a but also on the right-, left-, and rear-side windows.

According to Variation 1 of the present embodiment, the rendezvous assistance apparatus 11 may include a detector that detects the positions of the eyes of the driver and may be configured to adjust the positions of display objects on the basis of the positions of the eyes. This configuration allows display objects to be displayed at appropriate positions.

Variation 2 of Embodiment 6

In step S82 in FIG. 30 according to Embodiment 6, all multi-directional images are transmitted to the mobile terminal 2a, but the present embodiment is not limited to this example. For example, the subject vehicle 1a may select any of the front image, the rear right side image, the rear left side image, and the rear image manually or automatically and transmit the selected image(s) to the mobile terminal 2a.

One example of such a configuration of automatically selecting images will be described. The vehicle controller 14a may obtain the direction in which the mobile terminal 2a is positioned as viewed from the subject vehicle 1a, namely a terminal position direction, on the basis of the position of the mobile terminal 2a received in step S2 and the position of the subject vehicle 1a detected in step S3. Then, in step S82, the vehicle controller 14a may automatically select one of the multi-direction images whose image capturing region is close to the terminal position direction, and the vehicle communication device 16d may transmit vehicle transmit information including the selected image to the mobile terminal 2a. When there are a plurality of images whose image capturing regions are close to the terminal position direction, the vehicle communication device 16d may transmit vehicle transmit information including these images to the mobile terminal 2a.

Variation 3 of Embodiment 6

In step S84 in FIG. 30 according to Embodiment 6, the position-determined image is displayed accompanied with the first display object, and the multi-directional images other than the position-determined image is displayed without being accompanied with any display object, but the present embodiment is not limited to this example. For example, in step S84, the position-determined image may be displayed accompanied with the first display object, and the multi-directional images other than the position-determined image may be displayed accompanied with a display object indicating that the first display object is displayed in the position-determined image.

Variation 4 of Embodiment 6

In step S84 in FIG. 30 according to Embodiment 6, not only the position-determined image but also the multi-directional images other than the position-determined image are displayed, but the present embodiment is not limited to this example. For example, when there are ordinary door mirrors and rearview mirror, only the position-determined image may be displayed without display of the multi-directional images other than the position-determined image. This configuration enables the user in the vehicle to easily identify the position-determined image that accompanies the first display object.

Variation 5 of Embodiment 6

Figure 32:
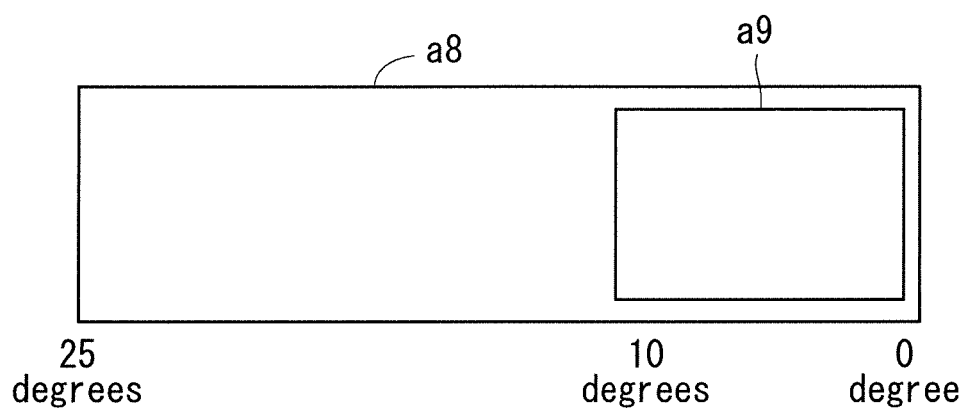
FIG. 32 is a diagram illustrating the operations of the rendezvous assistance apparatus according to Variation 5 of Embodiment 6.

FIGS. 31 and 32 are diagrams illustrating a wide-angle image capturing region a8 of an image capturing device for use in ordinary electron mirrors and a partial image capturing region a9 that is part of the wide-angle image capturing region a8. Note that the wide-angle image capturing region a8 has an angle of view of, for example, 25 degrees, and the partial image capturing region a9 has an angle of view of, for example, 10 degrees.

An ordinary electron mirror does not display the entire wide-angle image capturing region a8 and displays the partial image capturing region a9. When the mirror surface of an ordinary door mirror is adjusted in the top, bottom, right, and left directions by an operation from a user in the vehicle, the partial image capturing region a9 can also correspondingly move in the top, bottom, right, and left directions by an operation from the user in the vehicle.

Here, the multi-directional images (vehicle peripheral images) according to Embodiment 6, in which the function of an electron mirror is achieved, are preferably not the images of the partial image capturing region a9 but the images of the wide-angle image capturing region a8. This configuration reduces the likelihood that the terminal holder is not seen in the vehicle peripheral images.

As in Variation 2 of Embodiment 6, the vehicle controller 14a may obtain the direction in which the mobile terminal 2a is positioned as viewed from the subject vehicle 1a, i.e., the terminal position direction, on the basis of the position of the mobile terminal 2a received in step S2 and the position of the subject vehicle 1a detected in step S3. Then, the vehicle controller 14a may cut an image of an image capturing region that is located in the terminal position direction and that is approximately the same in size as the partial image capturing region a9 out of the image of the wide-angle image capturing region a8, and the vehicle communication device 16d may transmit vehicle transmit information including the cut image the to the mobile terminal 2a.

Variation 6 of Embodiment 6

According to Embodiment 6, the front image capturing device 16a 1, the rear right side image capturing device 16a2, the rear left side image capturing device 16a3, and the rear image capturing device 16a4 are used assuming an electron mirror, but the present embodiment is not limited to this example. For example, as illustrated in FIG. 33, the subject vehicle 1a may use one or more image capturing devices having image capturing regions (a front image capturing region a11, a right-side image capturing region a12, a left side image capturing region a13, a rear image capturing region a14) that capture all directions around the subject vehicle 1a.

Variation 7 of Embodiment 6

The vehicle transmit information transmitted in step S82 in FIG. 30 according to Embodiment 6 may include an image capturing profile that indicates the direction of image capture of each image capturing device, such as an image capturing region. For example, in the case of using the image capturing regions illustrated in FIG. 33 according to Variation 6 of Embodiment 6, image capturing profiles that indicate the front image capturing region a11, the right-side image capturing region a12, the left-side image capturing region a13, and the rear image capturing region a14 may be transmitted.

Figure 34:
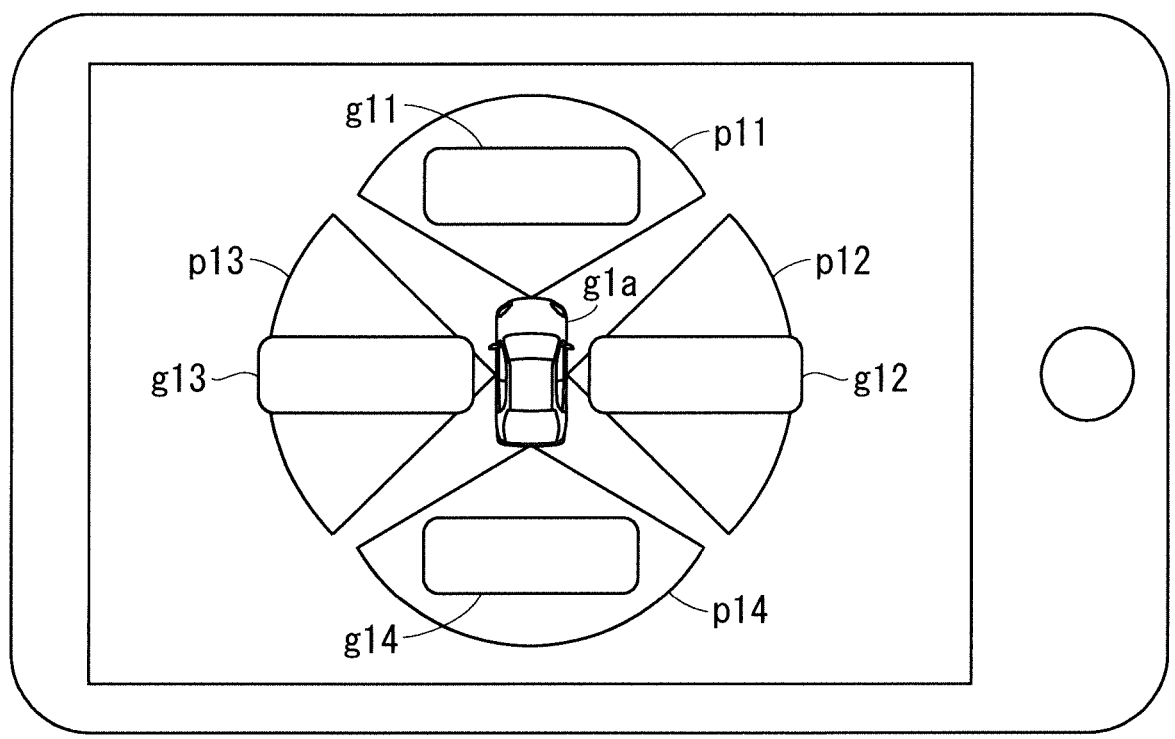
FIG. 34 is a diagram illustrating operations of a mobile terminal according to Variation 7 of Embodiment 6.

FIG. 34 is a diagram illustrating operations of the mobile display 24 of the mobile terminal 2a performed upon transmission of the vehicle transmit information that includes the image capturing profiles indicating the front image capturing region a11, the right-side image capturing region a12, the left-side image capturing region a13, and the rear image capturing region a14 in FIG. 33. In FIG. 34, the mobile display 24 displays image capturing profiles p11, p12, p13, and p14 that indicate the front image capturing region a11, the right-side image capturing region a12, the left-side image capturing region a13, and the rear image capturing region a14, respectively. Then, the mobile display 24 displays, as icons g11, g12, g13, and g14, thumbnails of the multi-directional images corresponding to the image capturing profiles p11, p12, p13, and p14.

FIG. 35 is a diagram illustrating operations of the mobile display 24 when an operation is made through the icon g12 that corresponds to the image capturing profile p12 of the right-side image capturing region a12 in FIG. 34. In FIG. 35, the mobile display 24 displays the image capturing profile p12 and an image g22 of the right-side image capturing region a12. For example, when an operation is made through an icon g1a of the subject vehicle in FIG. 35, the display in FIG. 35 may return to the display in FIG. 34.

Figure 36:
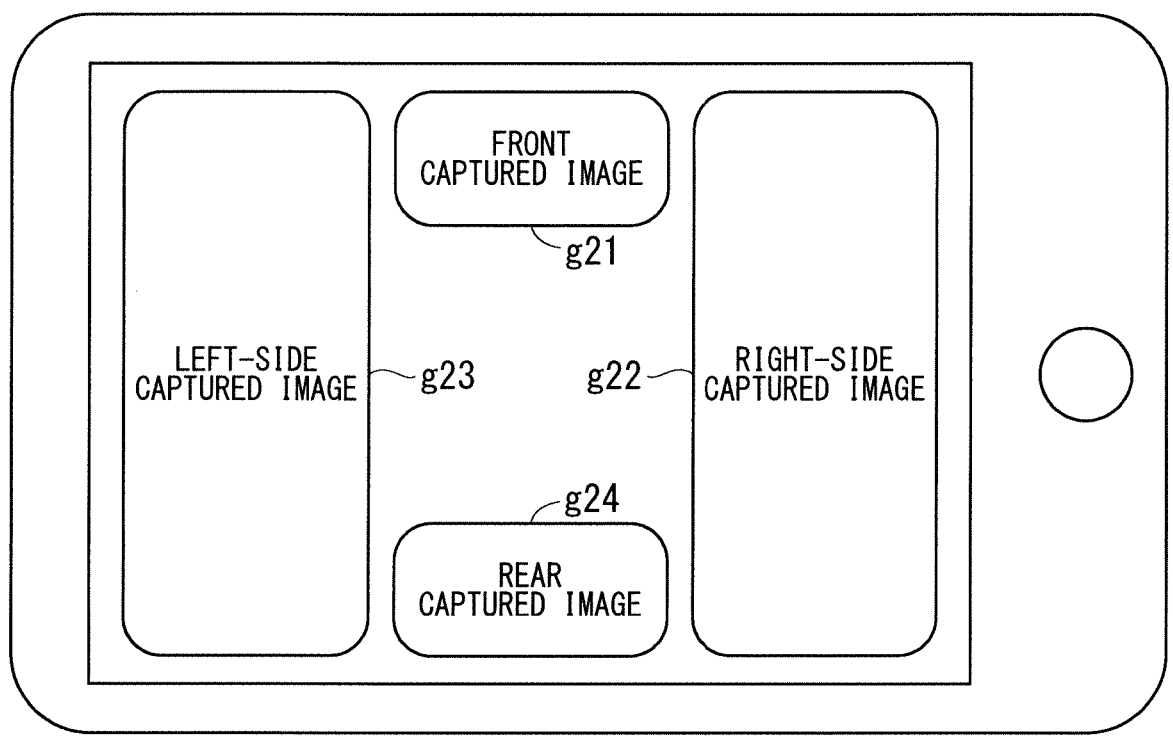
FIG. 36 is a diagram illustrating the operations of the mobile terminal according to Variation 7 of Embodiment 6.
Figure 37:
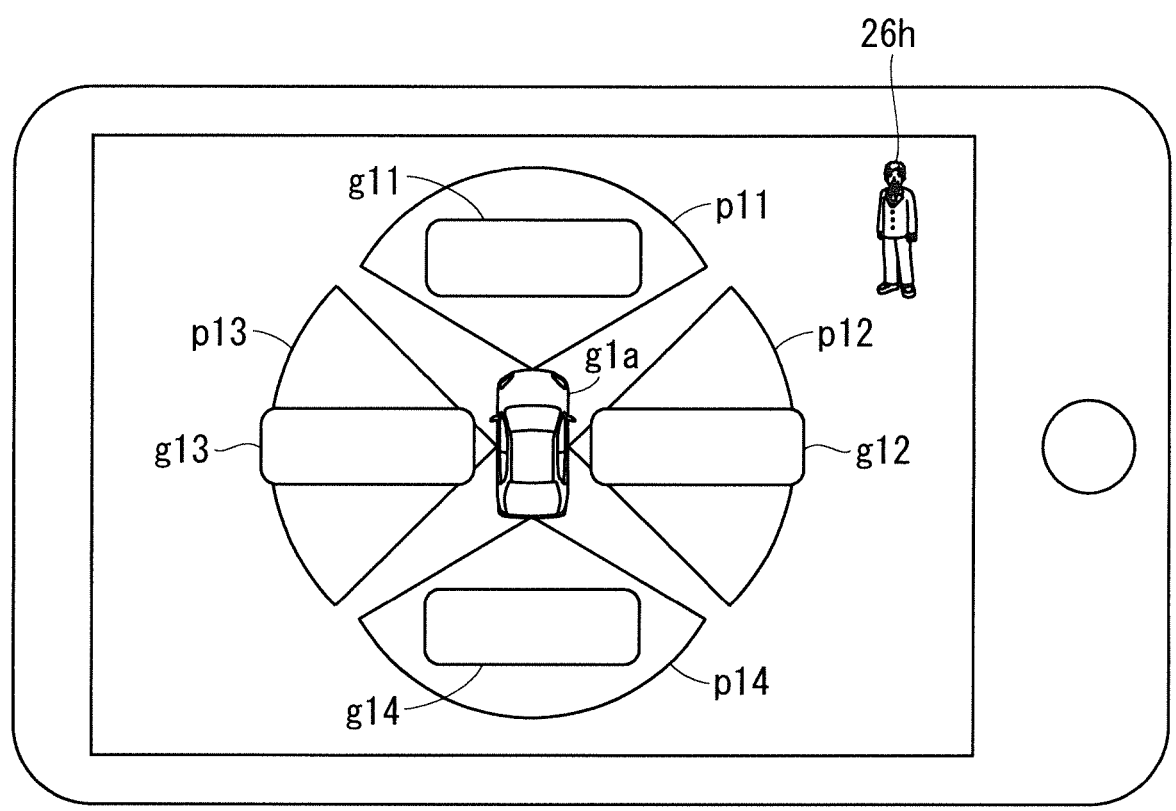
FIG. 37 is a diagram illustrating the operations of the mobile terminal according to Variation 7 of Embodiment 6.

Note that the display on the mobile terminal 2a is not limited to the display in FIG. 34. For example, as illustrated in FIG. 36, the mobile display 24 may display images g21, g22, g23, and g24 of the front image capturing region a11, the right-side image capturing region a12, the left-side image capturing region a13, and the rear image capturing region a14 and characters indicating the image capturing profiles. As another alternative, for example as illustrated in FIG. 37, the mobile display 24 may also display a display object 26h that indicates the terminal position direction described above, in addition to, for example, the display in FIG. 34.

Variation 8 of Embodiment 6

During the transmission of the vehicle transmit information in step S82 in FIG. 30 according to Embodiment 6, the vehicle communication controller 13a may perform control to transmit, to the mobile terminal 2a, controllable information for controlling one or more image capturing devices such as the front image capturing device 16a1, the rear right side image capturing device 16a2, the rear left side image capturing device 16a3, and the rear image capturing device 16a4.

Then, upon receipt of the controllable information, the mobile terminal 2a may perform control to cause the mobile display 24 to display a notification that one or more image capturing devices of the subject vehicle 1a are controllable, and may transmit a control request to control the one or more image capturing devices described above to the subject vehicle 1a on the basis of an operation from the terminal holder. For example, the control request may include a request to scale up or down the images to be captured by the image capturing devices or a request to control the directions of image capture of the image capturing devices.

Then, the vehicle communication controller 13a may perform control to cause the subject vehicle 1a to receive, from the mobile terminal 2a, a control request issued to the one or more image capturing devices described above. Then, the vehicle controller 14a may control the one or more image capturing devices described above on the basis of the control request received by the subject vehicle 1a. For example when the terminal holder is not seen in the vehicle peripheral images, this configuration enables the terminal holder to change the directions of image capture of the image capturing devices in the subject vehicle 1a so that the terminal holder can be seen in the vehicle peripheral images.

Other Variations

The first acquisition unit 12, the first communication controller 13, and the first controller 14, which are described above with reference to FIG. 1, are hereinafter referred to as the "first acquisition unit 12 and so on." The first acquisition unit 12 and so on are implemented by a processing circuit 81 illustrated in FIG. 38. That is, the processing circuit 81 includes the first acquisition unit 12 that acquires the first image of the outside of the first mobile unit, the first communication controller 13 that performs control to cause the first mobile unit to transmit the first transmit information including the first image acquired by the first acquisition unit 12 to the second mobile unit and performs control to cause the first mobile unit to receive the first receive information including the position of at least part of the second mobile unit in the first image from the second mobile unit, and the first controller 14 that performs control to cause the first display of the first mobile unit to display the first display object indicating the position of at least part of the second mobile unit accompanied with the first image or the landscape of the outside of the first mobile unit corresponding to the first image, on the basis of the first receive information received by the first mobile unit. The processing circuit 81 may be dedicated hardware, or may be a processor that executes programs stored in a memory. Examples of the processor include a central processing unit, a processing unit, an arithmetic-logic unit, a microprocessor, a microcomputer, and a digital signal processor (DSP).

When the processing circuit 81 is dedicated hardware, the processing circuit 81 corresponds to, for example, a single circuit, a composite circuit, a programmed processor, a parallel-programmed processor, an application specific integrated circuit (ASIC), a field programmable gate array (FPGA), or any combination of these circuits. The function of each constituent element, such as the first acquisition unit 12 and so on, may be implemented as a circuit including distributed processing circuits, or may be implemented as a single processing circuit that collectively achieve the function of each constituent element.

When the processing circuit 81 is a processor, the functions of the first acquisition unit 12 and so on are implemented by a combination with software and so on. The software and so on as used herein correspond to, for example, software, firmware, or a combination of software and firmware. Software and so on are described as programs and stored in the memory. As illustrated in FIG. 39, the processor 82 applied to the processing circuit 81 achieves the function of each constituent element by reading out and executing programs stored in the memory 83. That is, the rendezvous assistance apparatus implemented by the processing circuit 81 includes the memory 83 that stores programs for causing the processing circuit 81 to eventually execute the following steps: the step of acquiring the first image of the outside of the first mobile unit, the step of performing control to cause the first mobile unit to transmit the first transmit information including the acquired first image to the second mobile unit and performing control to cause the first mobile unit to receive the first receive information including the position of at least part of the second mobile unit in the first image from the second mobile unit, and the step of performing control to cause the first display of the first mobile unit to display the first display object that indicates the position of at least part of the second mobile unit accompanied with the first image or the landscape of the outside of the first mobile unit corresponding to the first image, on the basis of the first receive information received by the first mobile unit. In other words, it can be said that this program causes a computer to execute the procedure or method performed by the first acquisition unit 12 and so on. The memory 83 may, for example, be a nonvolatile or volatile semiconductor memory such as a random access memory (RAM), a read only memory (ROM), a flash memory, an erasable programmable read only memory (EPROM), and an electrically erasable programmable read only memory (EEPROM), or may be any kind of recording medium such as a hard disk drive (HDD), a magnetic disk, a flexible disk, an optical disk, a compact disk, a minidisk, a digital versatile disc (DVD), a drive device for such a disk, or any device that will be used in the future.

The above description has been given of the configuration in which the function of each constituent element such as the first acquisition unit 12 and so on is implemented by either hardware or software and so on. However, the present invention is not intended to be limited to the examples described above, and a configuration is also possible in which some constituent elements such as the first acquisition unit 12 and so on are implemented by dedicated hardware, and other some constituent elements are implemented by software or the like. For example, the function of the first acquisition unit 12 may be implemented by the processing circuit 81 serving as dedicated hardware, an interface, and a receiver, and the other constituent elements may be implemented by the processing circuit 81 serving as the processor 82 and reading out and executing programs stored in the memory 83.

As described above, the processing circuit 81 can achieve the function of each constituent element described above by hardware, software and so on, or a combination of hardware and software.

The rendezvous assistance apparatuses described thus far are also applicable to a rendezvous assistance system that is constructed as a system by appropriately combining a server, a vehicle device such as a portable navigation device (PND) or a navigation device, a communication terminal including a mobile terminal, and the function of applications installed in at least one of the vehicle device and the communication device. In this case, each function or each constituent element of the rendezvous assistance apparatus described above may be distributed and arranged in each equipment that constructs the system described above, or may be centralized in any equipment.

It should be noted that the present invention can be implemented by freely combining the above embodiments or by making a modification or omission to the embodiments as appropriate without departing from the scope of the present invention.

While the invention has been shown and described in detail, the foregoing description is in all aspects illustrative and not restrictive. It is therefore to be understood that numerous modifications and variations can be devised without departing from the scope of the invention.

EXPLANATION OF REFERENCE SIGNS

1 First mobile unit
1a Subject vehicle
2 Second mobile unit
2a Mobile terminal
11 Rendezvous assistance apparatus
12 First acquisition unit
13 First communication controller
14 First controller
18 First display object
19 First display
28 Second display object
41 Dispatch reservation server

The invention claimed is:

1. A rendezvous assistance apparatus that assists a rendezvous of a first mobile unit and a second mobile unit, the rendezvous assistance apparatus comprising:
   a first acquisition circuitry that acquires a first image of an outside of the first mobile unit;
   a first communication controller that performs control to cause the first mobile unit to transmit first transmit information to the second mobile unit, the first transmit information including the first image acquired by the first acquisition circuitry, and performs control to cause the first mobile unit to receive first receive information transmitted by the second mobile unit that received the first transmit information, the first receive information including a position of at least part of the second mobile unit in the first image, the position decided by a user of the second mobile unit; and
   a first controller that performs control to cause a first display of the first mobile unit to display a first display object on the basis of the first receive information received by the first mobile unit, the first display object indicating the position of at least part of the second mobile unit accompanied with the first image or a landscape of the outside of the first mobile unit corresponding to the first image; wherein the first acquisition circuitry acquires, as the first image that is a peripheral image, an image captured by one or more image capturing devices provided on the first mobile unit.

2. The rendezvous assistance apparatus according to claim 1, wherein each of the first mobile unit and the second mobile unit is a person and a mobile terminal moving together or a vehicle.

3. The rendezvous assistance apparatus according to claim 1, further comprising:

a second acquisition circuitry that acquires a second images of an outside of the second mobile unit;

a second communication controller that performs control to cause the second mobile unit to transmit second transmit information to the first mobile unit, the second transmit information including the second image acquired by the second acquisition circuitry, and performs control to cause the second mobile unit to receive second receive information from the first mobile unit, the second receive information including a position of at least part of the first mobile unit in the second images; and a second controller that performs control to cause a second display of the second mobile unit to display a second display object on the basis of the second receive information received by the second mobile unit, the second display object indicating a position of at least part of the first mobile unit accompanied with the second image or a landscape of the outside of the second mobile unit corresponding to the second image.

4. The rendezvous assistance apparatus according to claim 1, wherein the first transmit information further includes at least one of dynamic information and static information about the first mobile unit, the dynamic information and the static information being information for use in display on a second display of the second mobile unit.

5. The rendezvous assistance apparatus according to claim 1, wherein the first receive information further includes at least one of dynamic information and static information about the second mobile unit, the dynamic information and the static information being information for use in display on the first display.

6. The rendezvous assistance apparatus according to claim 1, wherein the first receive information further includes a voice or a character indicating a position of the second mobile unit in the first image and being for use in display on the first display.

7. The rendezvous assistance apparatus according to claim 1, wherein the first mobile unit is a vehicle, and when the first communication controller performs control to cause the first mobile unit to transmit controllable information about the one or more image capturing devices to the second mobile unit and performs control to cause the first mobile unit to receive a control request to the one or more image capturing devices from the second mobile unit, the first controller controls the one or more image capturing devices on the basis of the control request received by the first mobile unit.

8. The rendezvous assistance apparatus according to claim 1, wherein the first display is a head up display that displays the first display object accompanied with the landscape of the outside of the first mobile unit, or a transmission liquid crystal display for use in windows of the first mobile unit.

9. The rendezvous assistance apparatus according to claim 1, wherein when a predetermined condition is satisfied, the first controller performs control to cause the first display to display a still image of the first image and the first display object accompanied with the first image; and when the predetermined condition is not satisfied, the first controller performs control to cause the first display to display a moving image of the first image and the first display object accompanied with the first image.

10. The rendezvous assistance apparatus according to claim 1, wherein the first acquisition circuitry further acquires a position of the first mobile unit, the first communication controller performs control to cause the first mobile unit to receive the position of the second mobile unit from the second mobile unit, and the first controller performs control to cause the first display to display a relationship between relative positions of the first mobile unit and the second mobile unit, on the basis of the position of the first mobile unit and the position of the second mobile unit.

11. The rendezvous assistance apparatus according to claim 1, wherein when the first transmit information is received, the second mobile unit displays the first image included in the first transmit information and determines a position of at least part of the second mobile unit in the first image on the basis of a predetermined operation made through the first image.

12. The rendezvous assistance apparatus according to claim 1, wherein when the first transmit information is received, the second mobile unit performs image recognition of the first image included in the first transmit information and determines a position of at least part of the second mobile unit in the first image on the basis of a result of the image recognition.

13. The rendezvous assistance apparatus according to claim 1, wherein when a predetermined condition is satisfied, the first communication controller performs control to cause the first mobile unit to transmit the first transmit information to the second mobile unit.

14. The rendezvous assistance apparatus according to claim 13, wherein the first acquisition circuitry further acquires a position of the first mobile unit, the first communication controller performs control to cause the first mobile unit to receive a position of the second mobile unit from the second mobile unit, and the predetermined condition is a condition concerning the position of the first mobile unit and the position of the second mobile unit.

15. The rendezvous assistance apparatus according to claim 13, wherein the first acquisition circuitry further acquires a position of the first mobile unit, and the predetermined condition is a condition concerning the position of the first mobile unit and a rendezvous point of the first mobile unit and the second mobile unit.

16. The rendezvous assistance apparatus according to claim 13, wherein
the first communication controller performs control to cause the first mobile unit to receive a position of the second mobile unit from the second mobile unit, and
the predetermined condition is a condition concerning the position of the second mobile unit and a rendezvous point of the first mobile unit and the second mobile unit.

17. The rendezvous assistance apparatus according to claim 13, wherein
the predetermined condition is a condition concerning travel information about the first mobile unit.

18. The rendezvous assistance apparatus according to claim 1, wherein
the first communication controller performs the control when the second mobile unit is within an image capturing region of the first acquisition circuitry.

19. A rendezvous assistance system comprising:
the rendezvous assistance apparatus according to claim 1; and
a rendezvous assistance server that assists a rendezvous of the first mobile unit and the second mobile unit on the basis of information from the first mobile unit and information from the second mobile unit.

20. A rendezvous assistance method of assisting a rendezvous of a first mobile unit and a second mobile unit, the rendezvous assistance method comprising:

acquiring a first image of an outside of the first mobile unit;

performing control to cause the first mobile unit to transmit first transmit information to the second mobile unit, the first transmit information including the first image that has been acquired, and performing control to cause the first mobile unit to receive first receive information transmitted by the second mobile unit that received the first transmit information, the first receive information including a position of at least part of the second mobile unit in the first image, the position decided by a user of the second mobile unit;

performing control to cause a first display of the first mobile unit to display a first display object on the basis of the first receive information received by the first mobile unit, the first display object indicating the position of at least part of the second mobile unit accompanied with the first image or a landscape of the outside of the first mobile unit corresponding to the first image; and wherein the acquiring step acquires, as the first image that is a peripheral image, an image captured by one or more image capturing devices provided on the first mobile unit.

* * * * *